(12) United States Patent
Bearson et al.

(10) Patent No.: US 12,539,633 B2
(45) Date of Patent: Feb. 3, 2026

(54) METHOD AND APPARATUS FOR SLICING AND PROCESSING WHOLE MUSCLE

(71) Applicant: Tyson Foods, Inc., Springdale, AR (US)

(72) Inventors: Kent Michael Bearson, Naperville, IL (US); Dejing Fu, Lisle, IL (US); Kazimierz Jachym, Springdale, AR (US)

(73) Assignee: Tyson Foods, Inc., Springdale, AR (US)

( * ) Notice: Subject to any disclaimer, the term of this patent is extended or adjusted under 35 U.S.C. 154(b) by 747 days.

(21) Appl. No.: 17/738,144

(22) Filed: May 6, 2022

(65) Prior Publication Data

US 2022/0258368 A1 Aug. 18, 2022

Related U.S. Application Data

(63) Continuation-in-part of application No. 16/944,871, filed on Jul. 31, 2020.

(51) Int. Cl.
```
A22C 17/00    (2006.01)
A47J 44/00    (2006.01)
B26D 1/147    (2006.01)
```

(52) U.S. Cl.
CPC .......... *B26D 1/147* (2013.01); *A22C 17/0033* (2013.01); *A47J 44/00* (2013.01); *B26D 2210/02* (2013.01)

(58) Field of Classification Search
CPC ...... A22C 17/0033; B26D 1/14; B26D 1/147; B26D 2210/02
USPC .................................................. 452/155, 156
See application file for complete search history.

(56) References Cited

U.S. PATENT DOCUMENTS

| | | | | |
|---|---|---|---|---|
| 1,185,896 | A * | 6/1916 | Fleming | B26D 1/09 83/466.1 |
| 4,308,778 | A * | 1/1982 | Takahashi | B26D 1/11 83/751 |
| 4,344,341 | A * | 8/1982 | Lotz | B26D 5/20 83/241 |
| 4,506,131 | A * | 3/1985 | Boehm | H05B 6/06 323/329 |
| 4,625,364 | A * | 12/1986 | Adams | B26D 7/0641 30/304 |
| 7,377,201 | B2 * | 5/2008 | Chen | B26D 7/06 83/425.2 |
| 8,679,560 | B2 * | 3/2014 | Juravic | A23K 10/30 426/465 |
| 11,278,910 | B2 * | 3/2022 | Brinkman | B02C 18/22 |
| 2017/0231264 | A1 * | 8/2017 | Christie | B29C 48/06 426/516 |

* cited by examiner

*Primary Examiner* — David J Parsley
(74) *Attorney, Agent, or Firm* — UB Greensfelder LLP; Mark E. Stallion

(57) ABSTRACT

A method and apparatus for improving processing whole muscle for a thinly slice meat item, such as a meat item for Philly Cheese Steaks. One implementation of the method and apparatus as disclosed and claimed herein includes grounding whole muscle and pumping the ground whole muscle through an in-line rotary multi-blade slicer and further extruding the product from the in-line slicer and pumping the product through a cooking horn. For one implementation of the method and apparatus, the product is pumped through and in-line sheeter before pumping the product through the cooking horn.

3 Claims, 77 Drawing Sheets

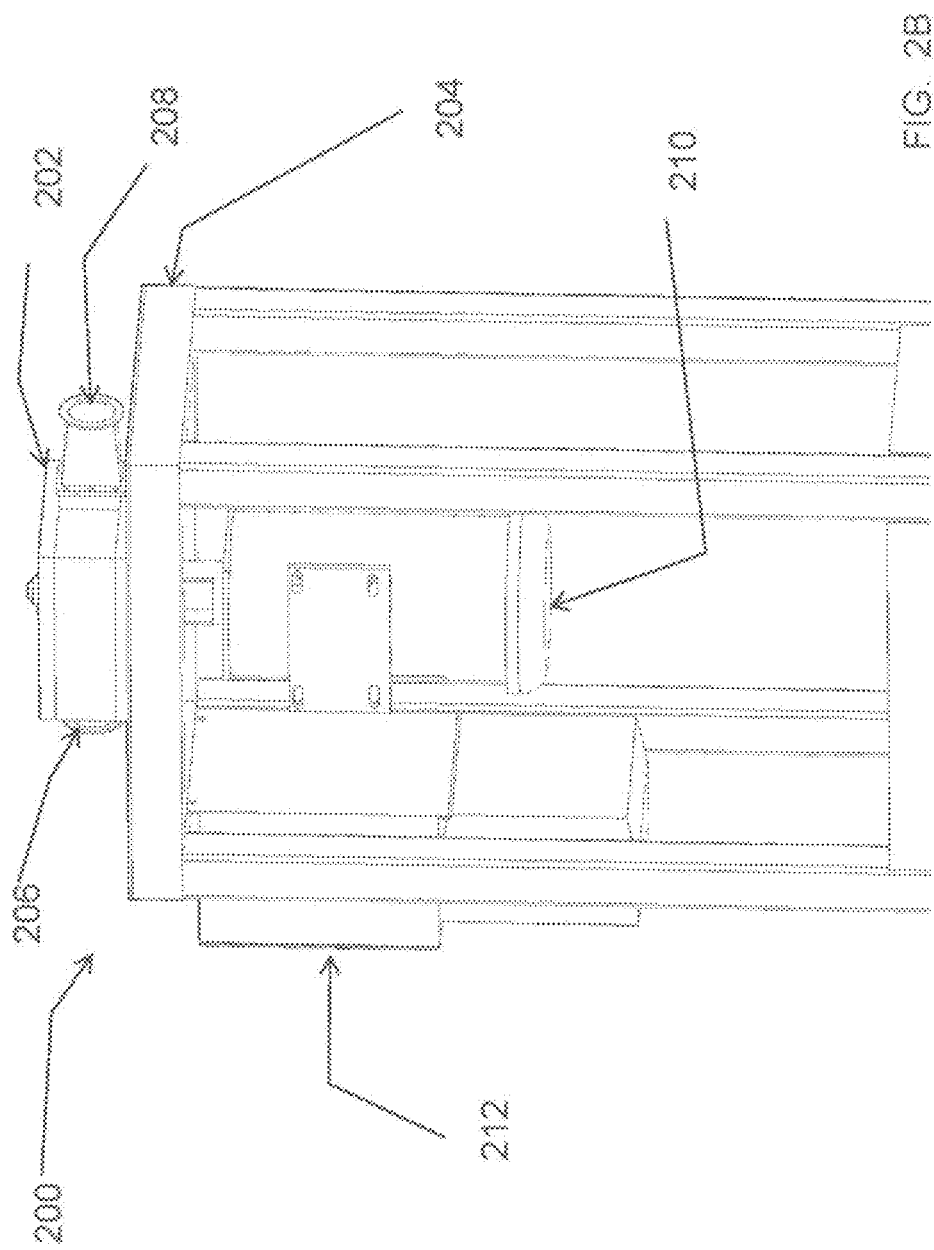

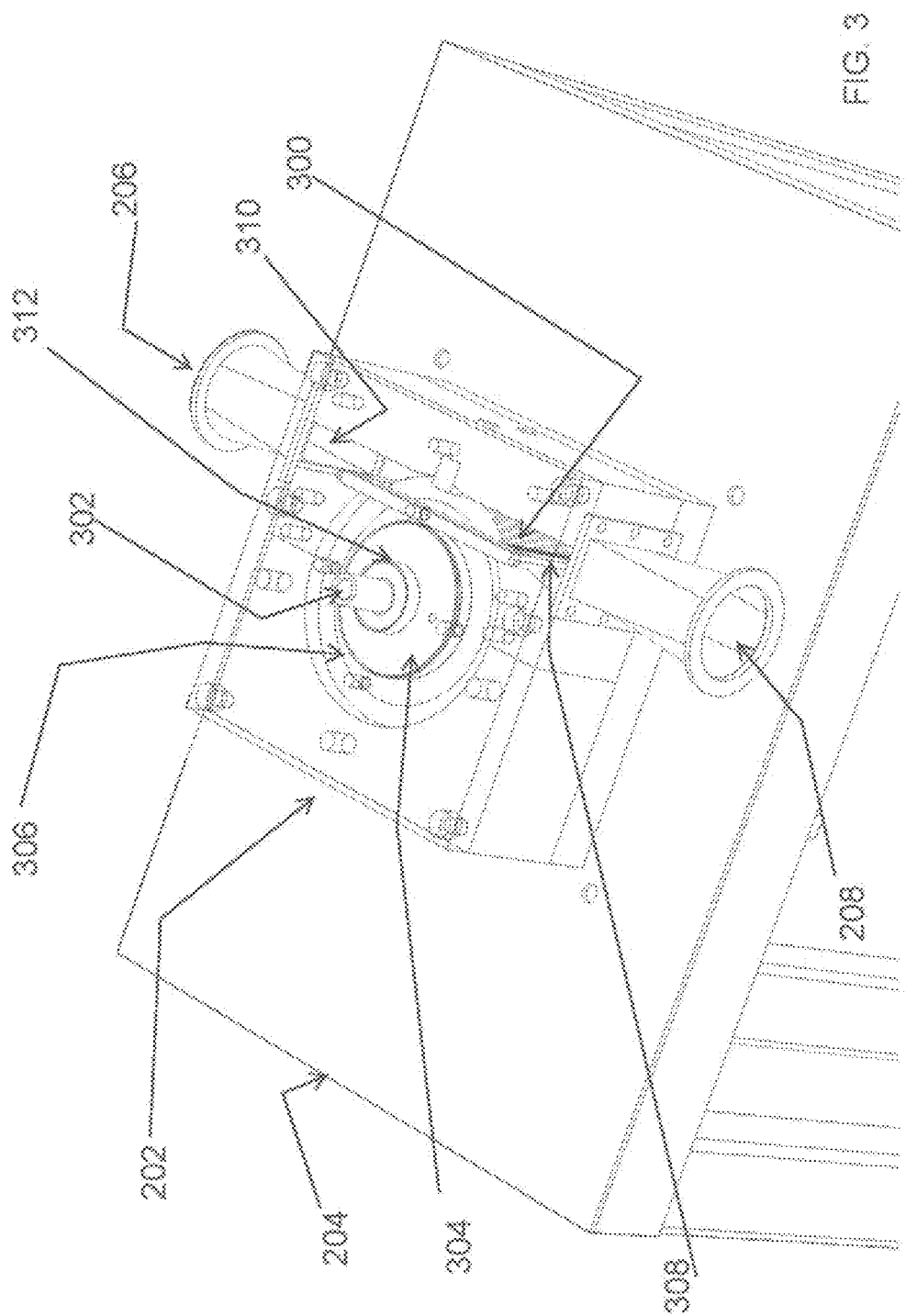

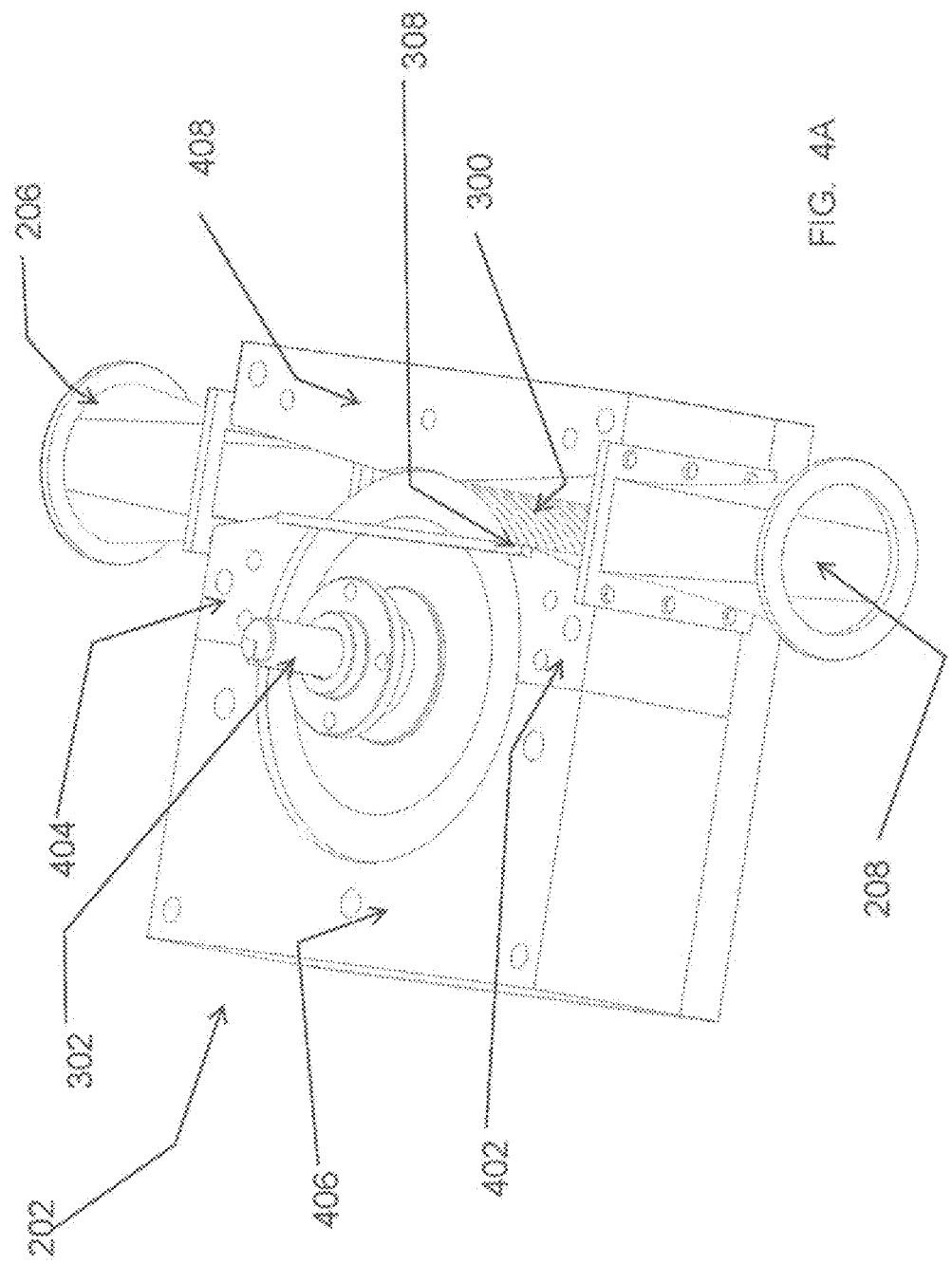

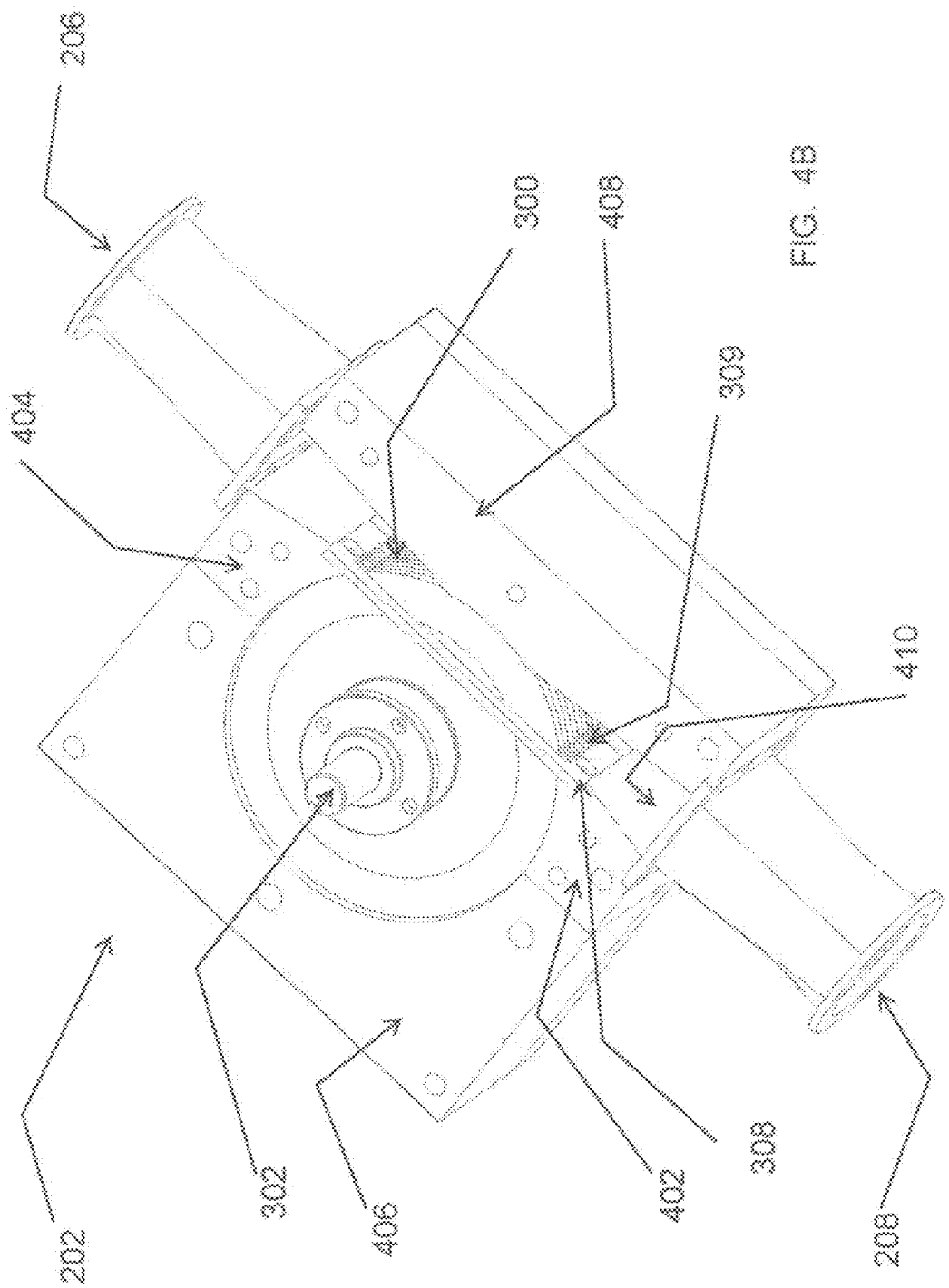

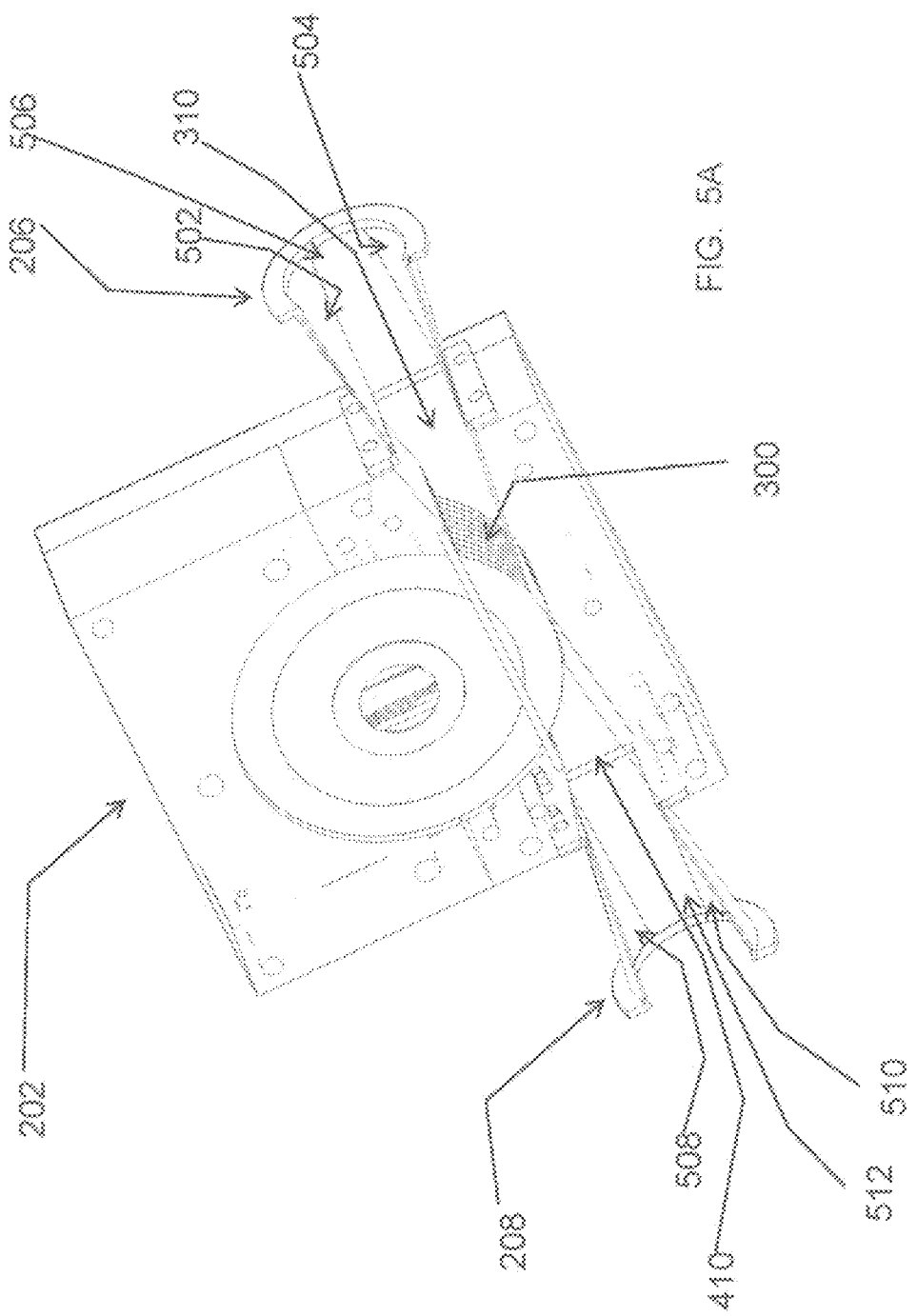

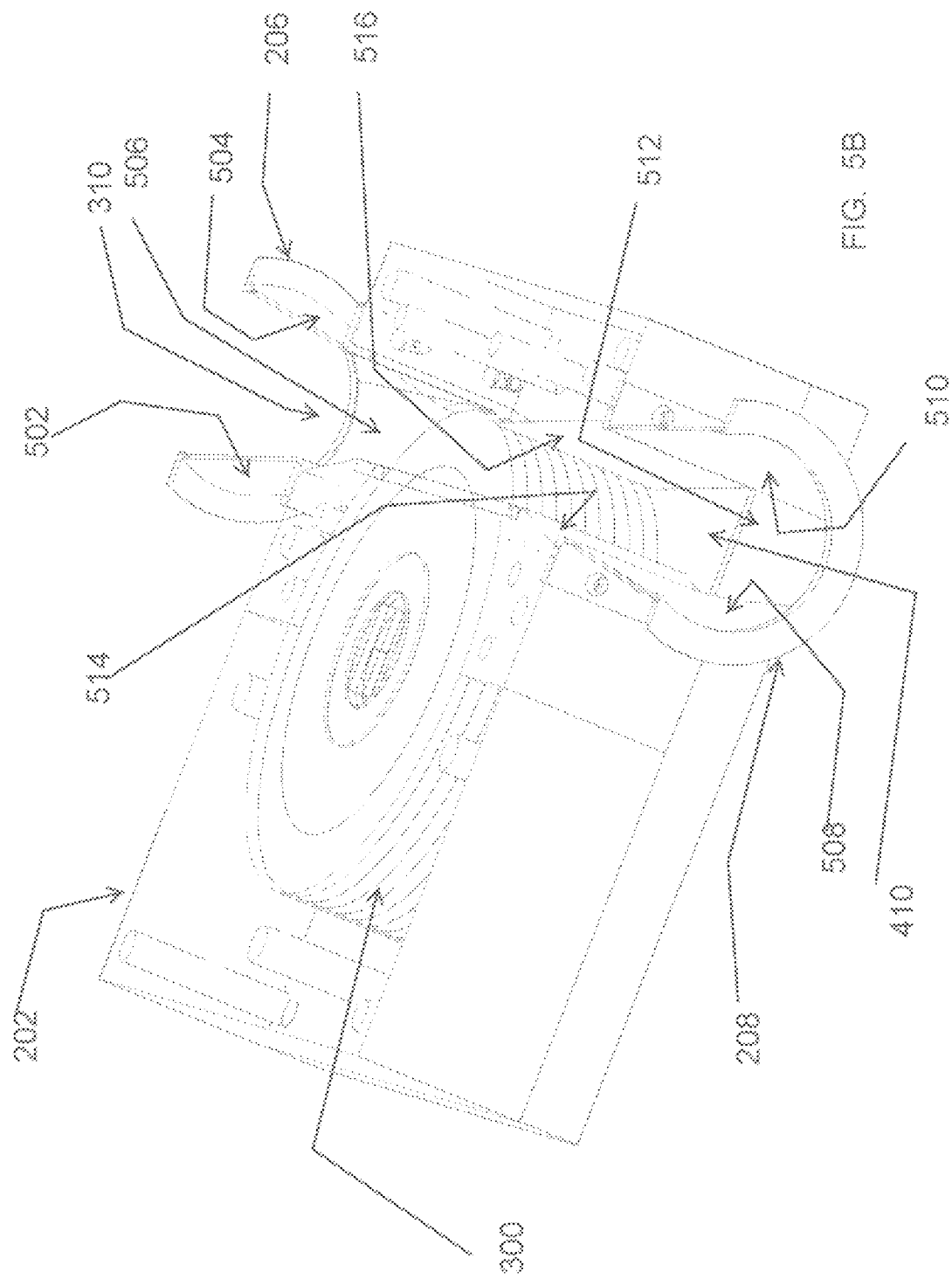

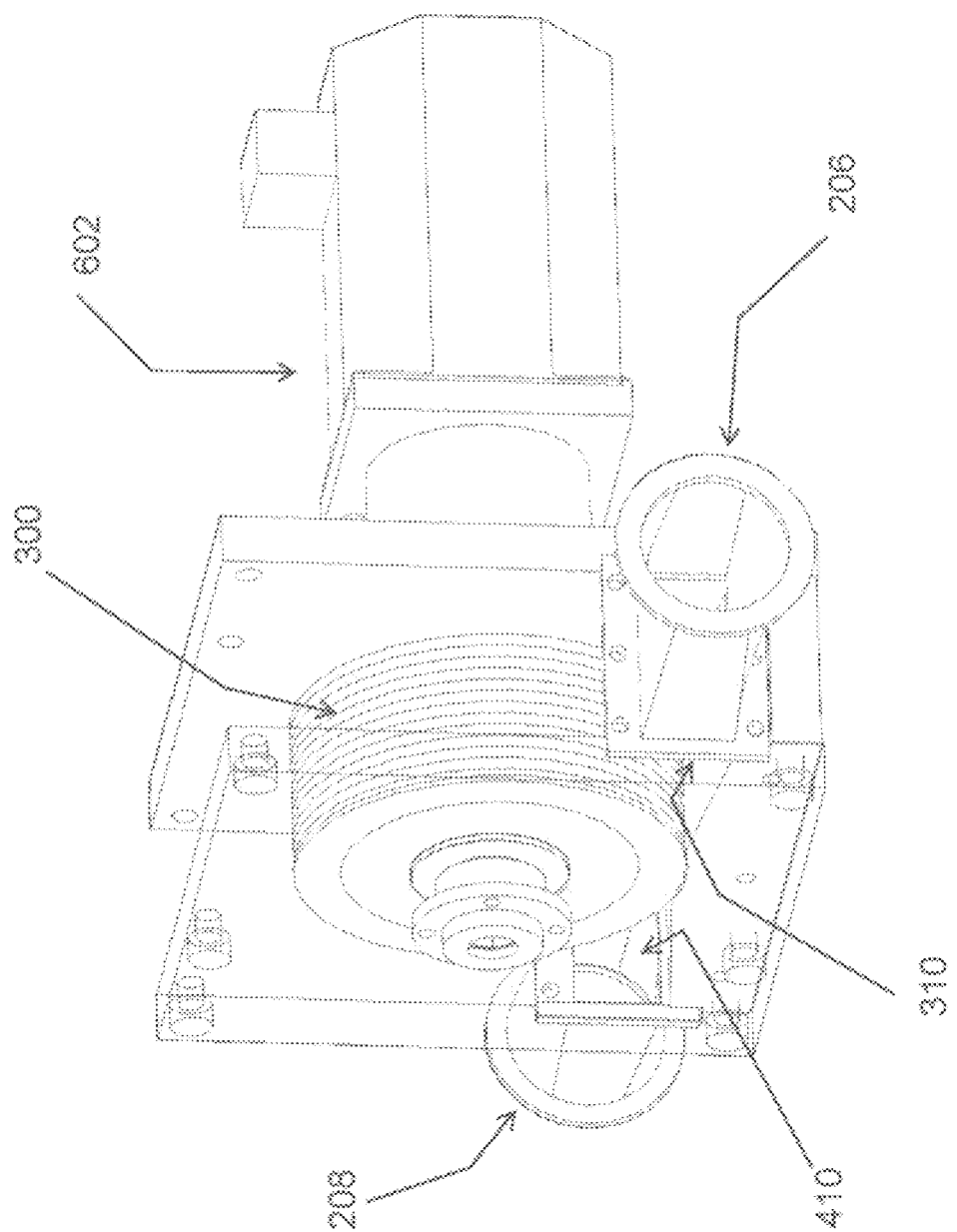

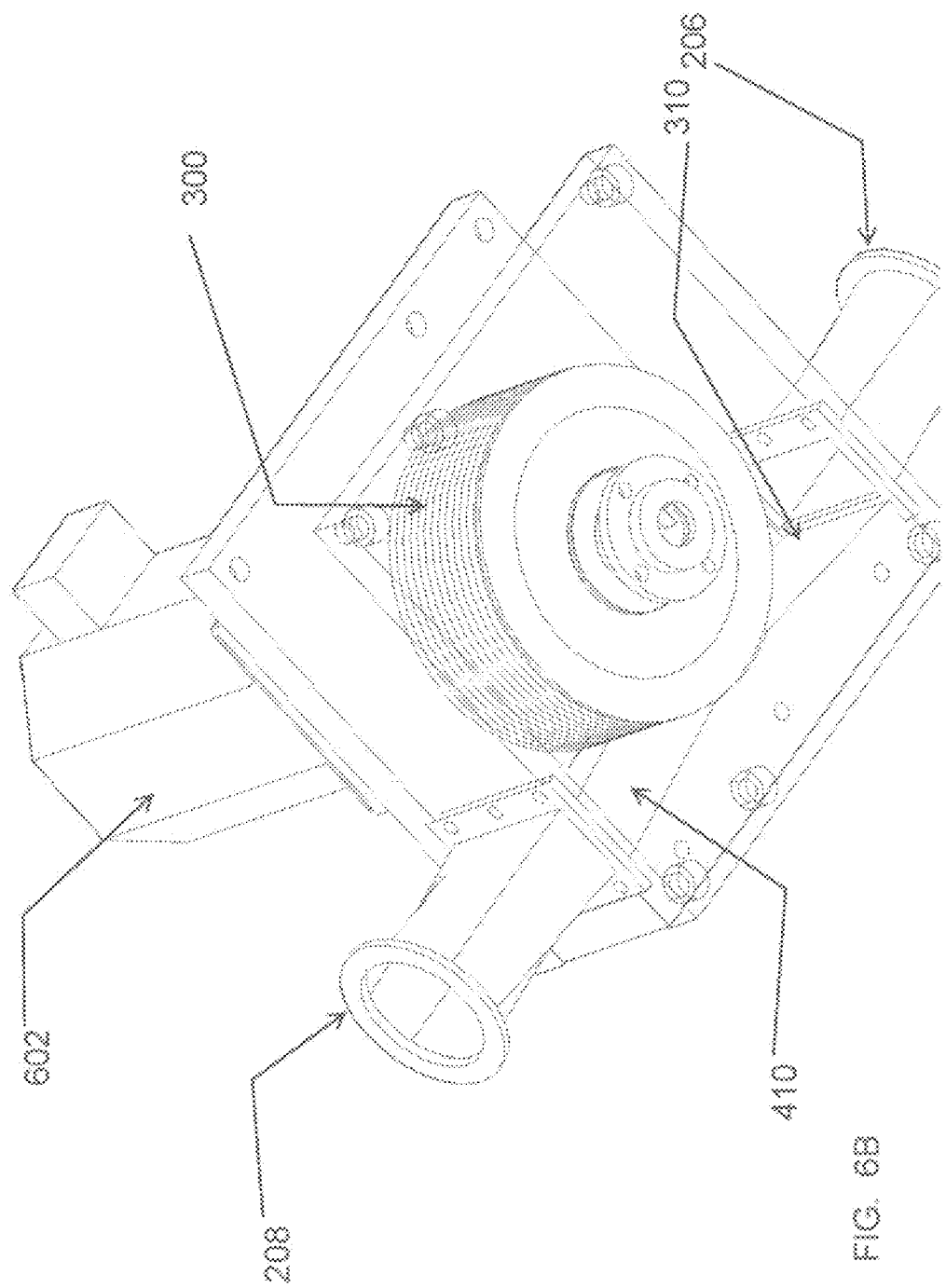

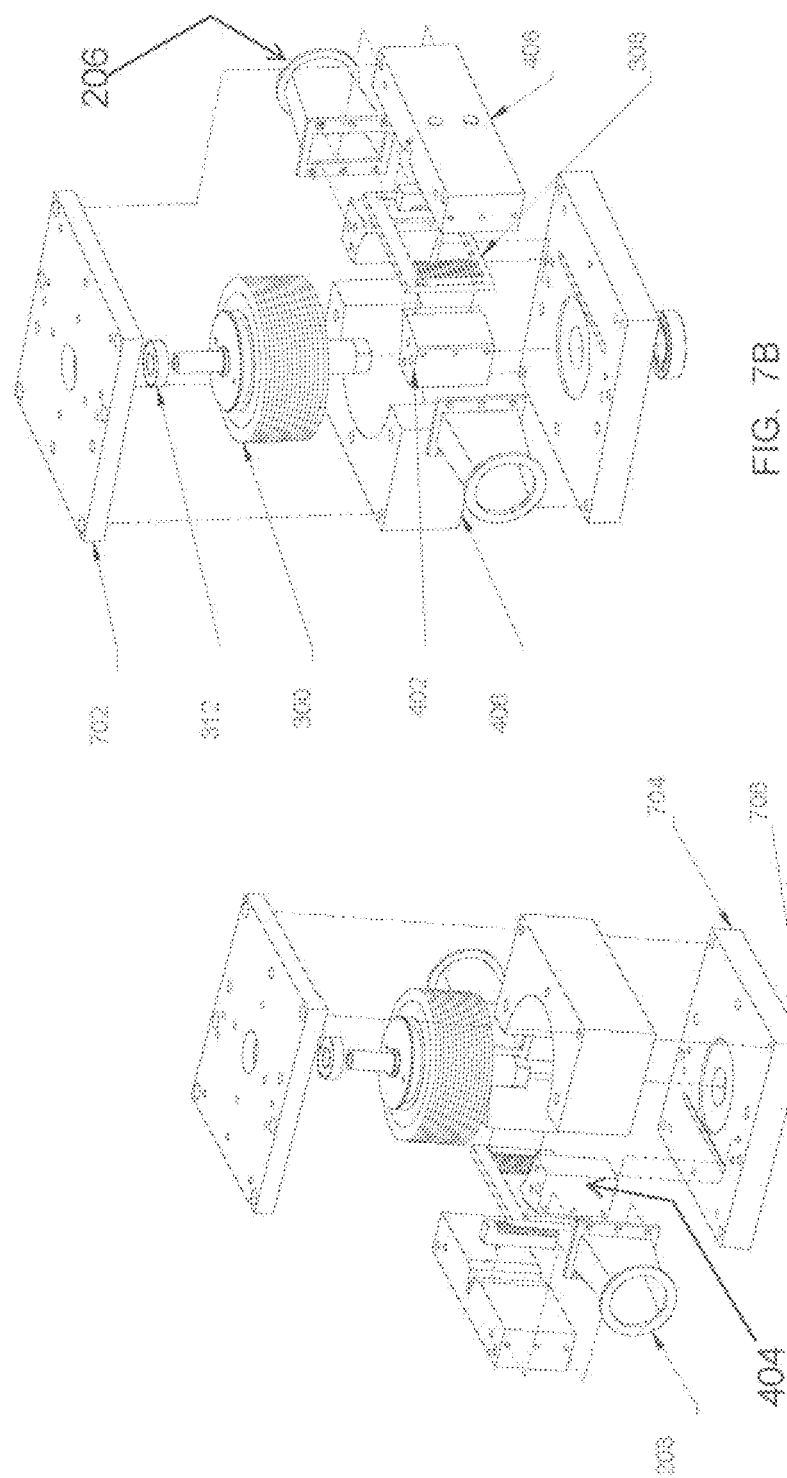

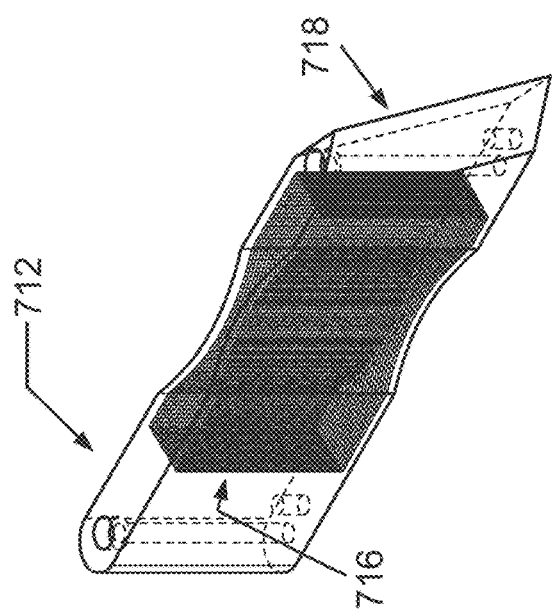
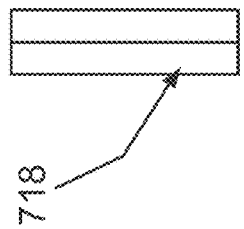
FIG. 7H
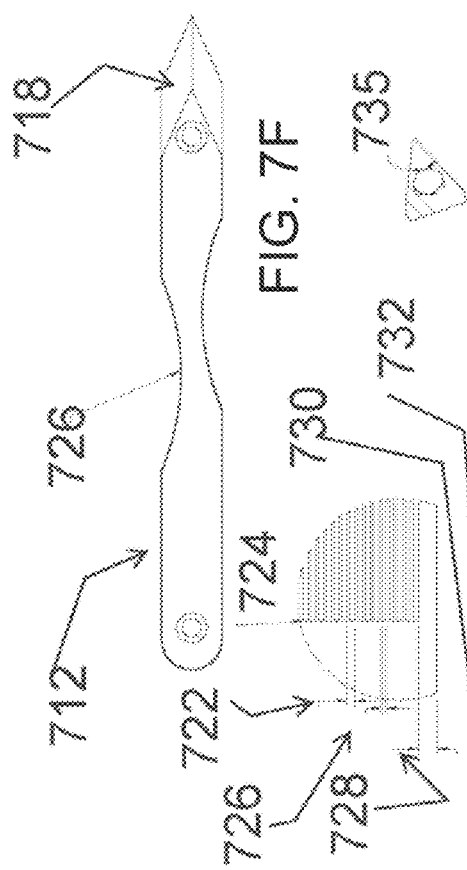
FIG. 7F
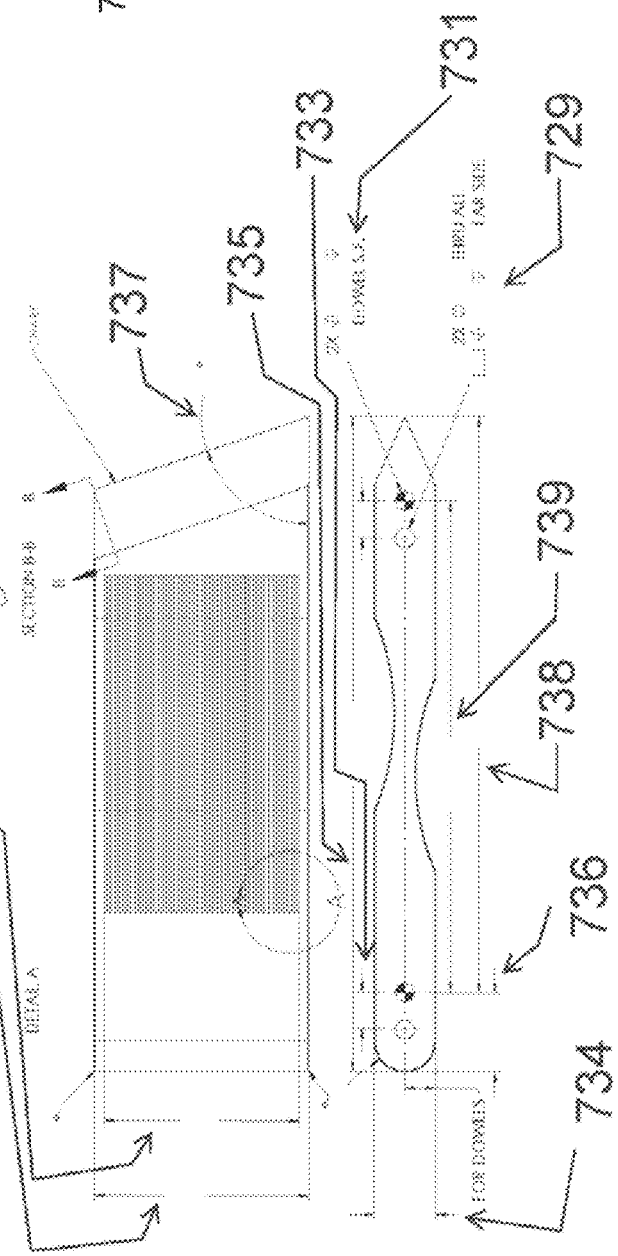
FIG. 7G

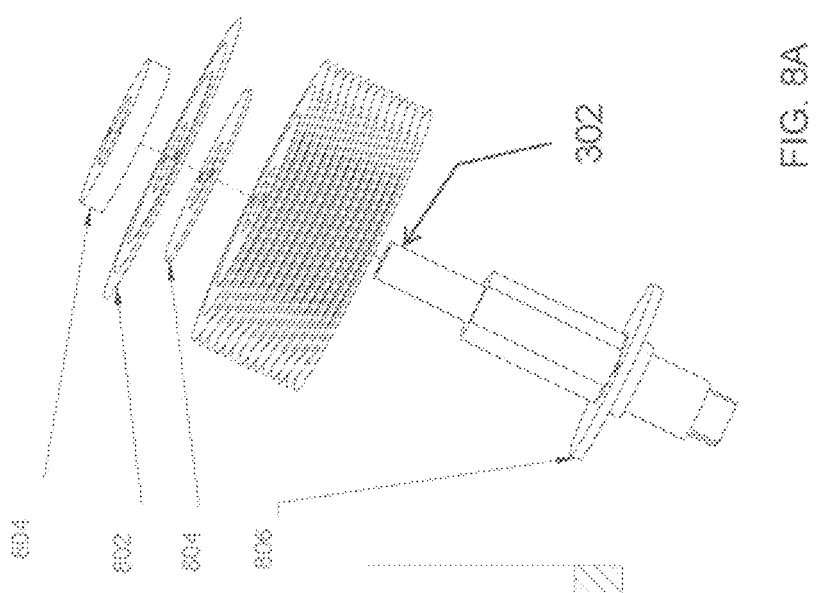
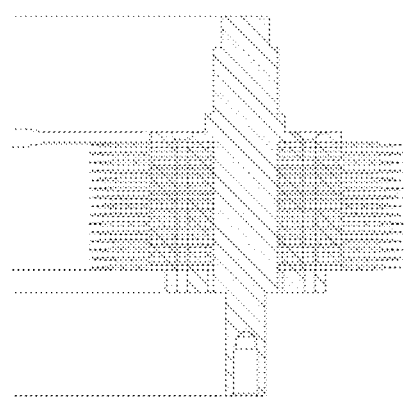
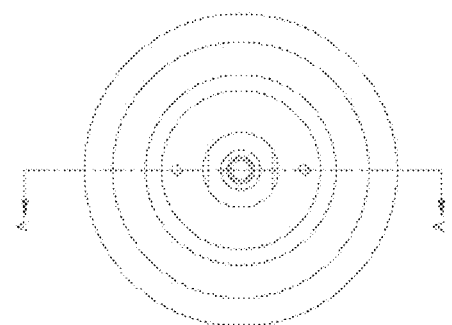

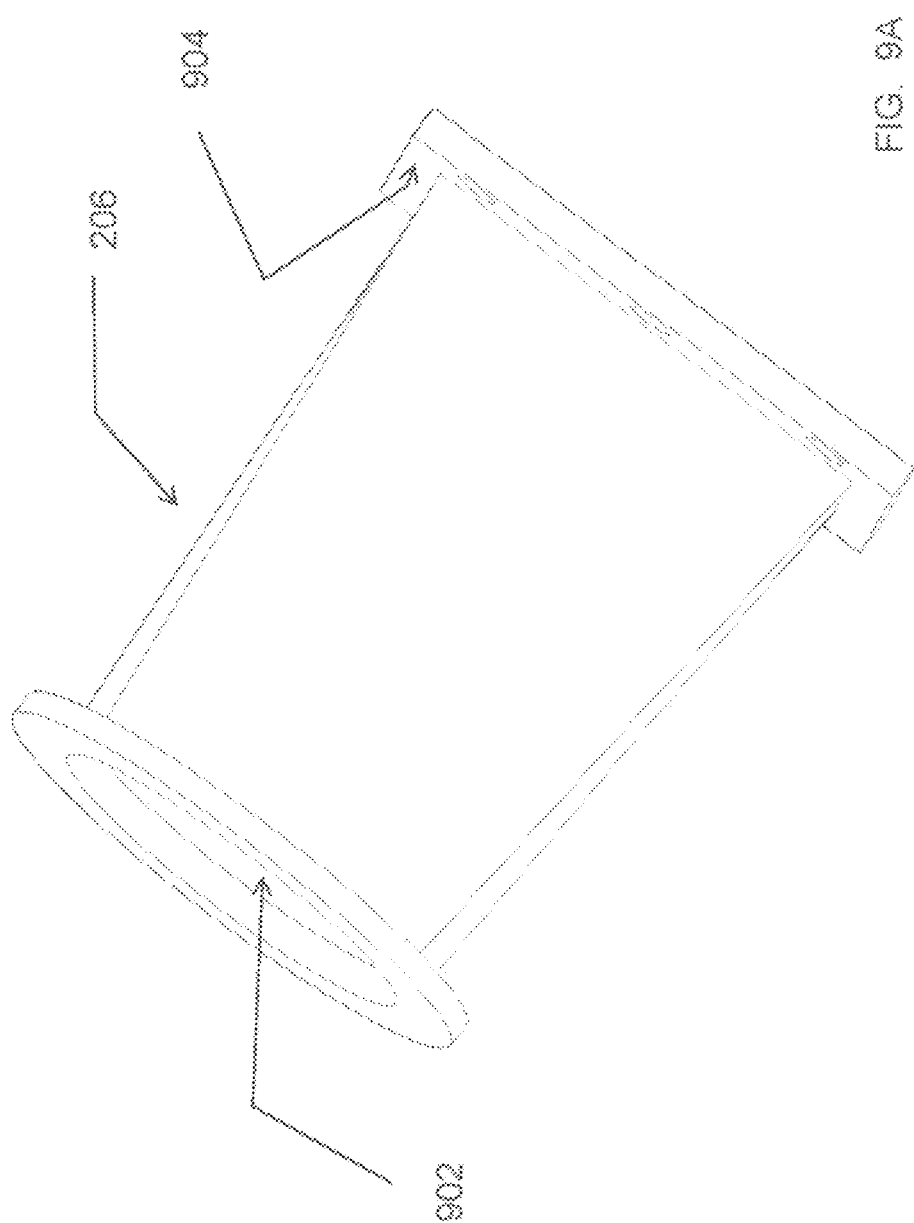

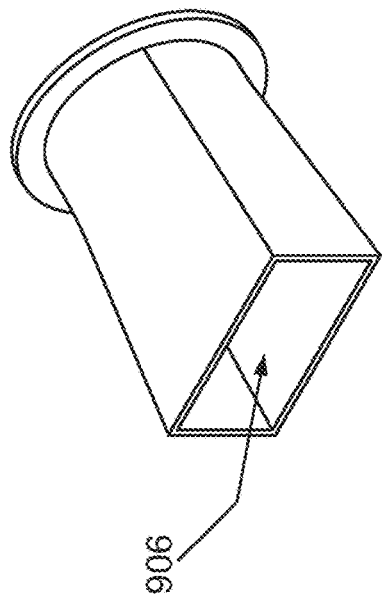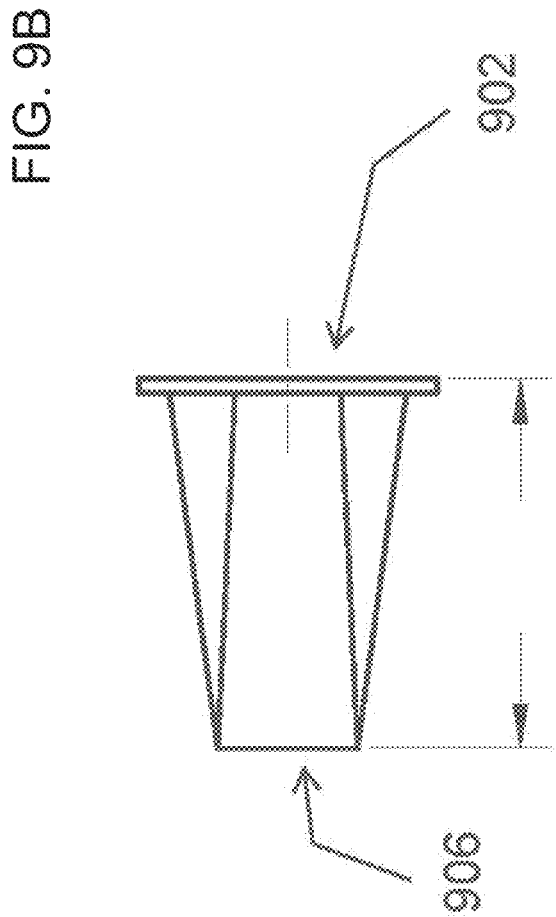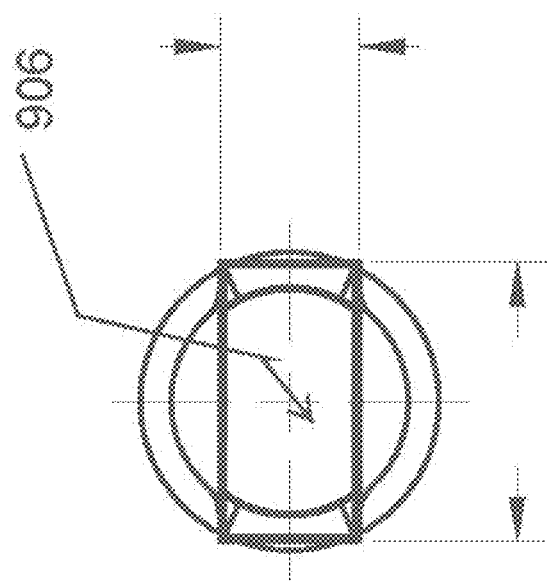

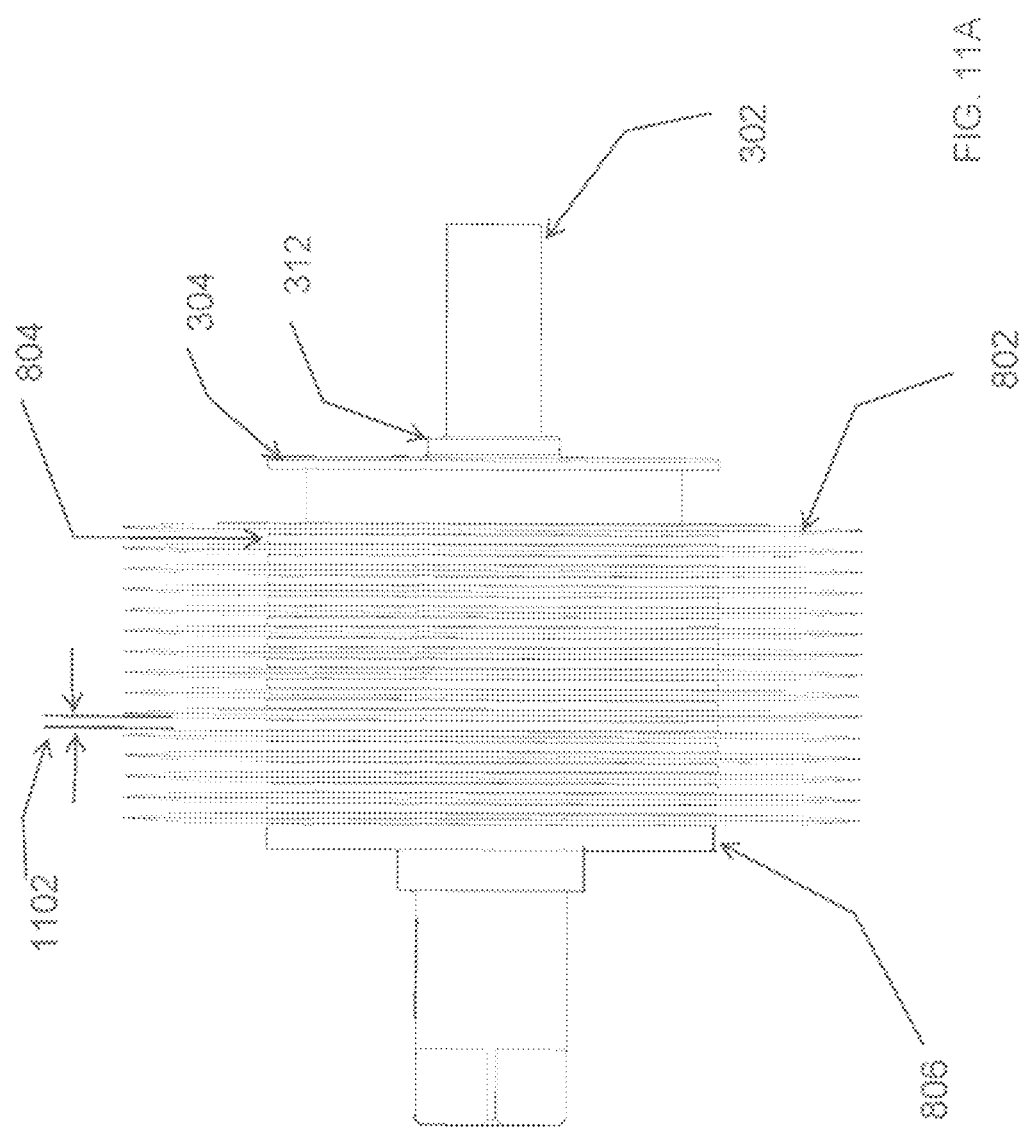

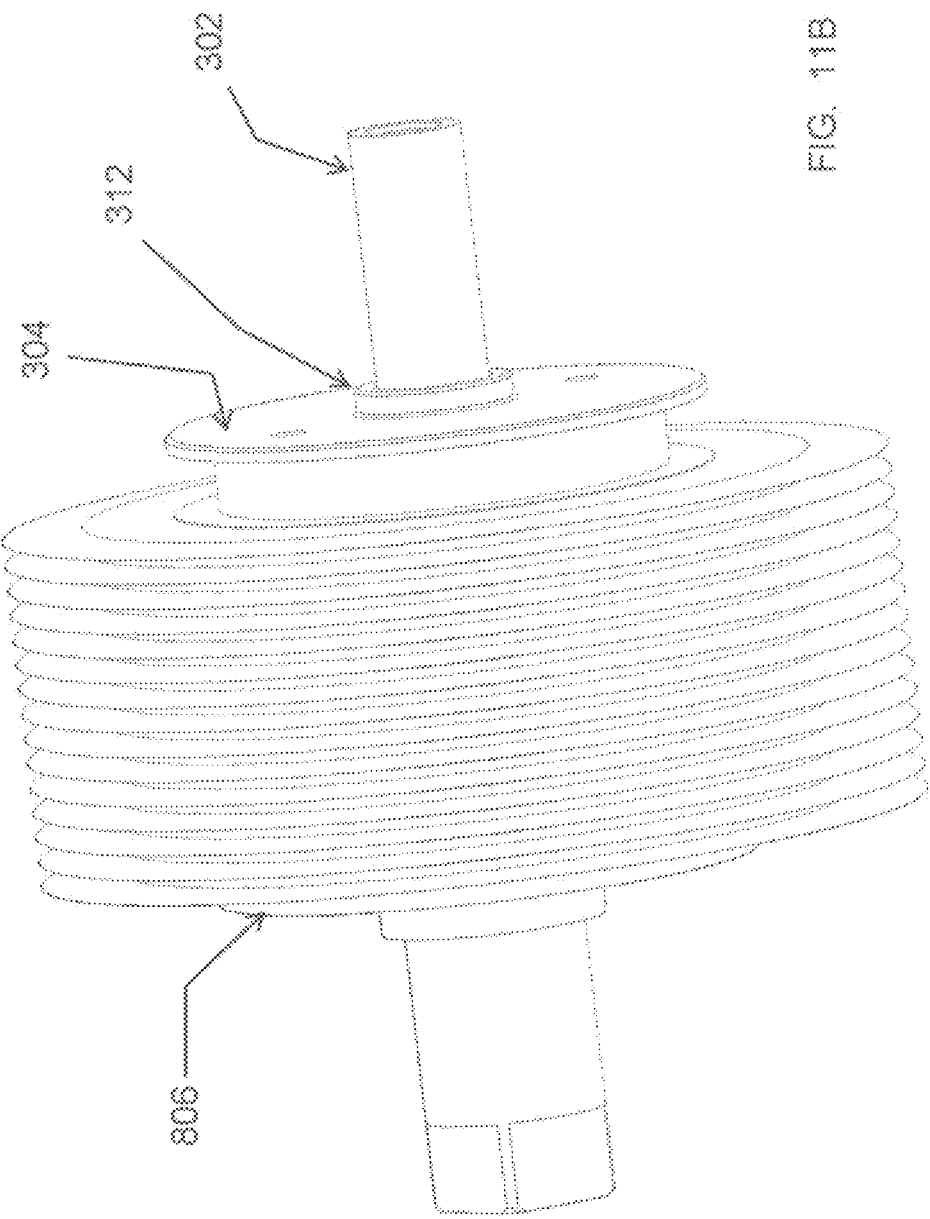

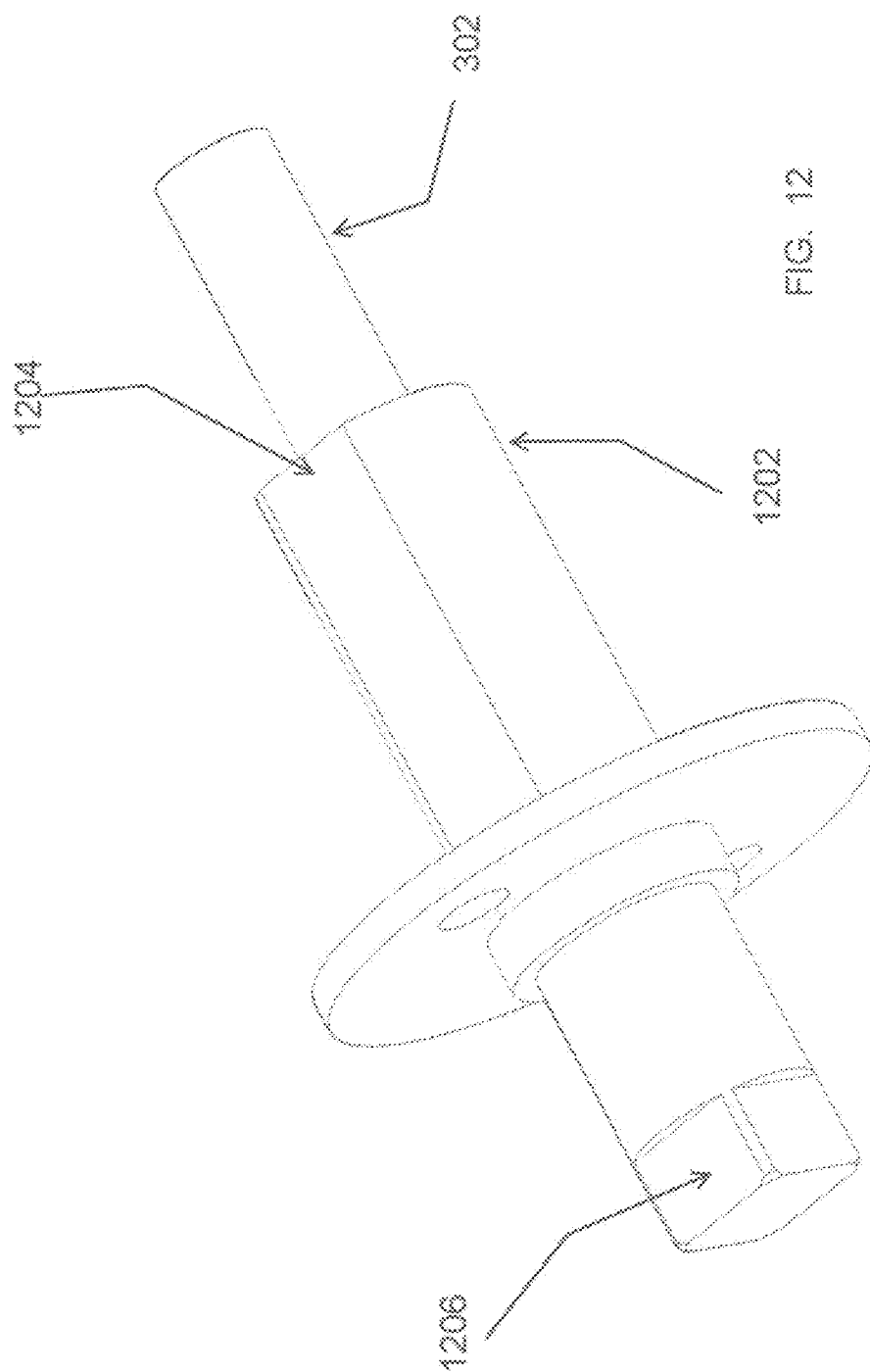

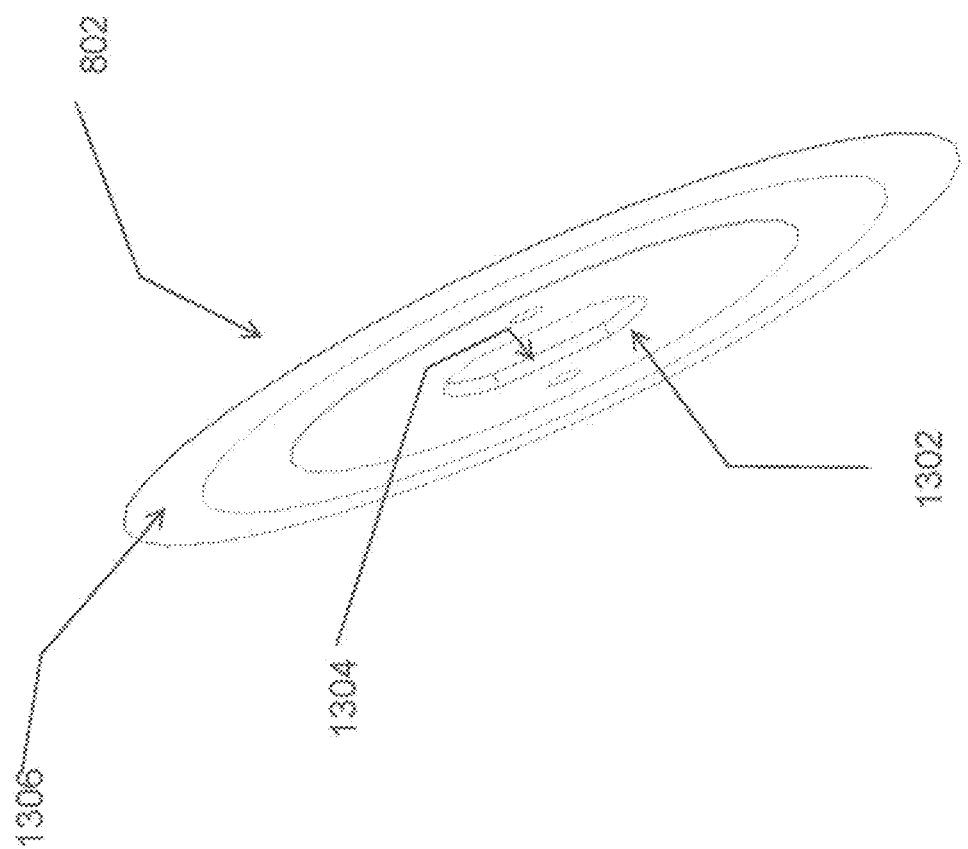

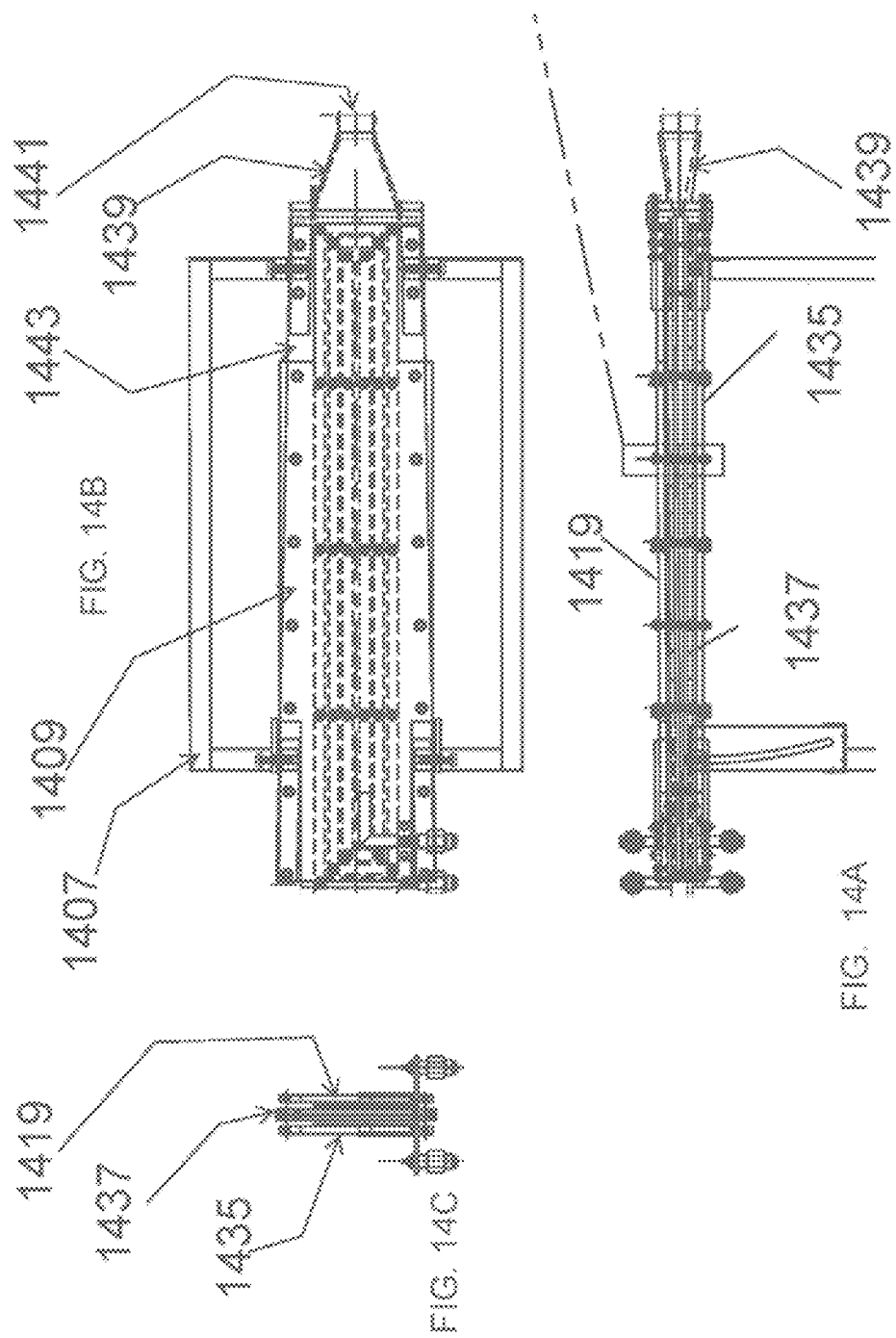

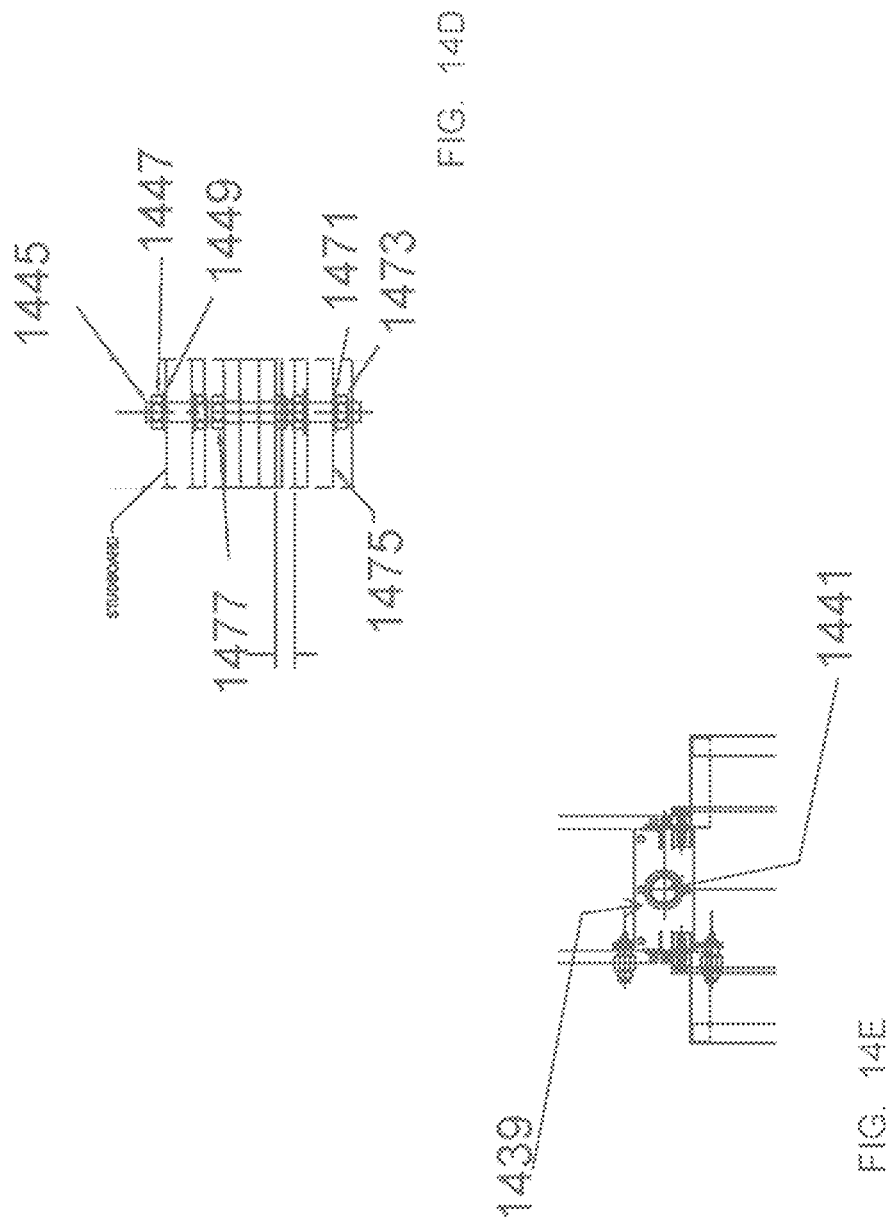

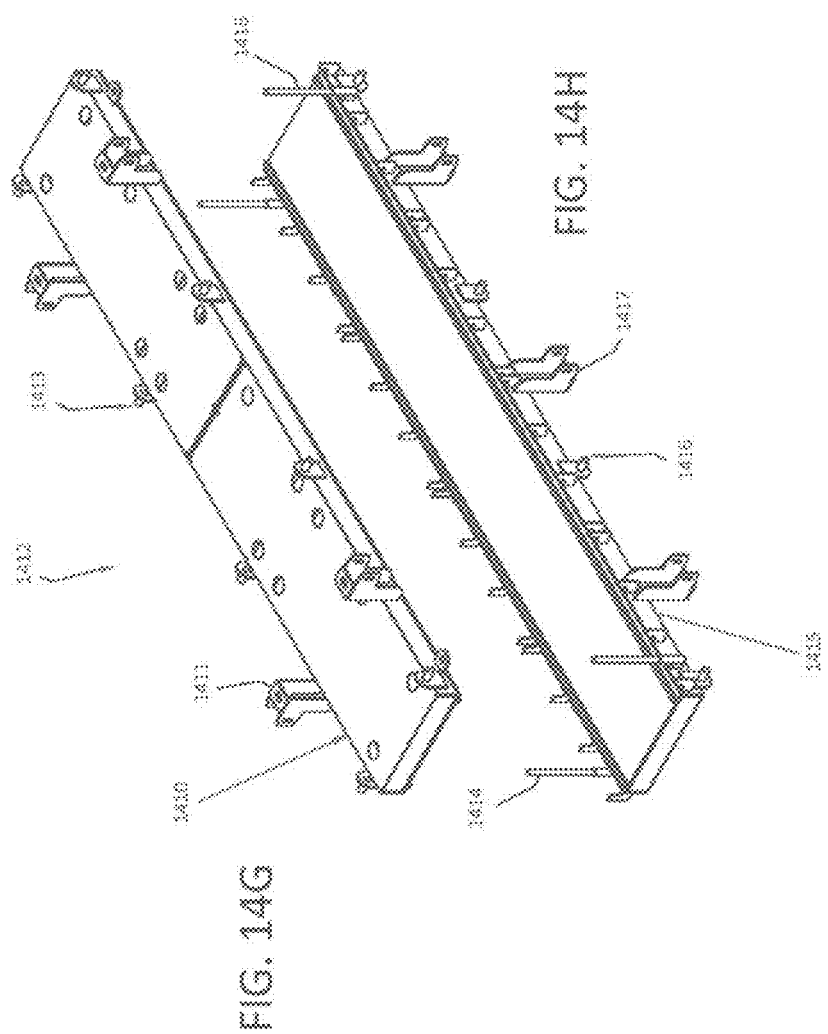

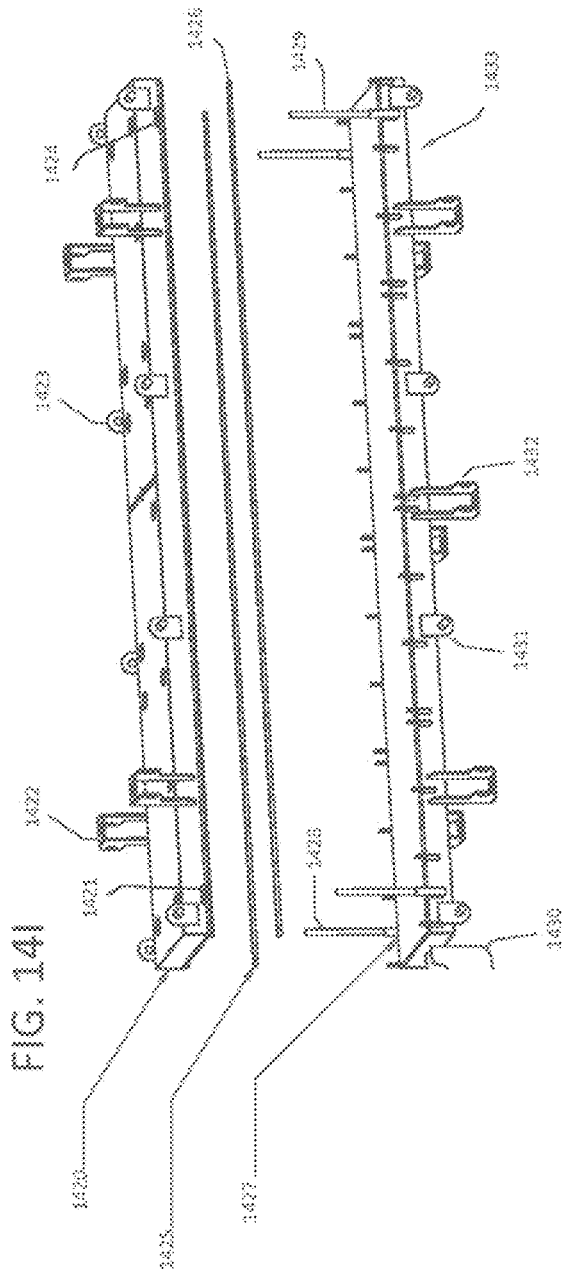

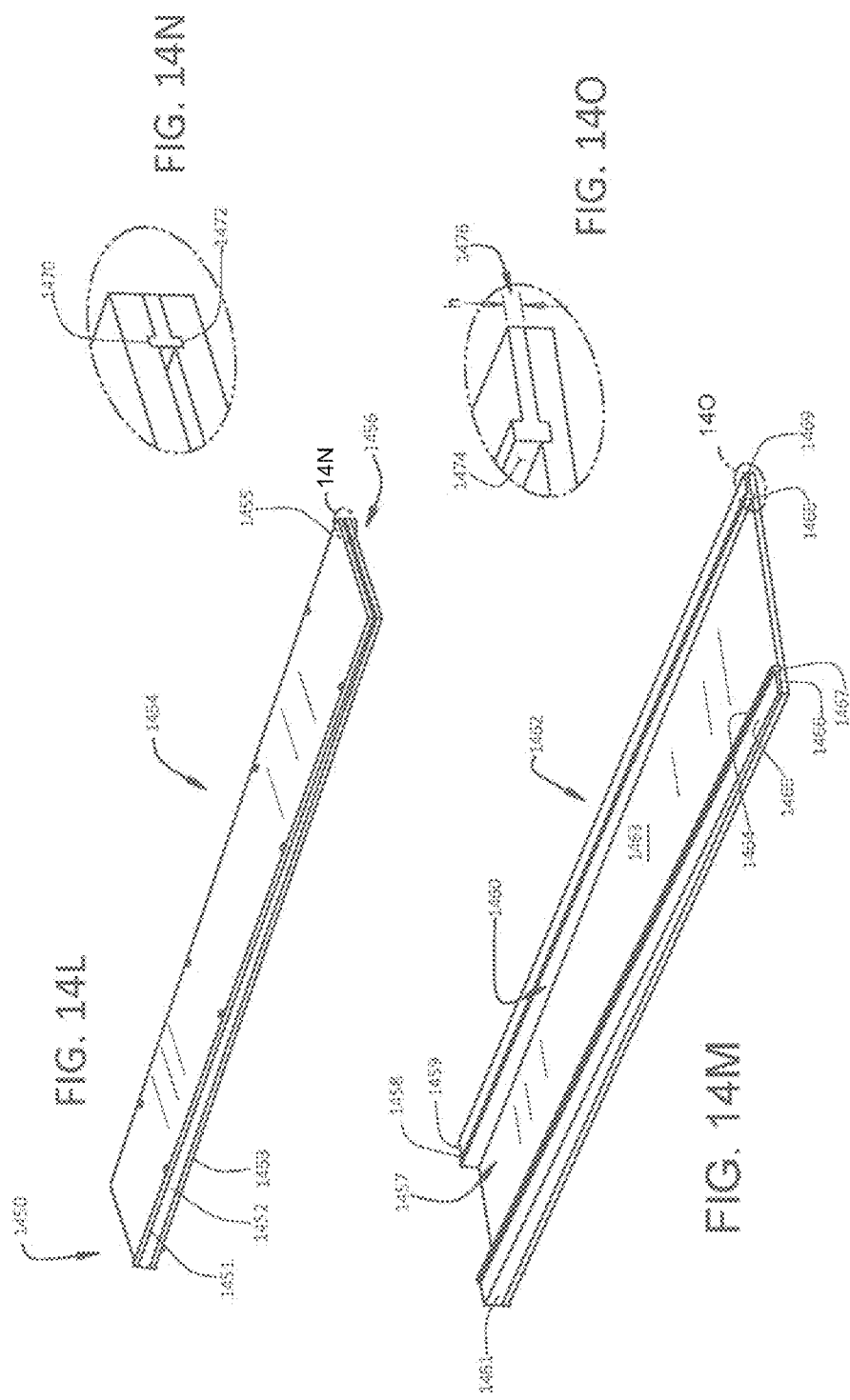

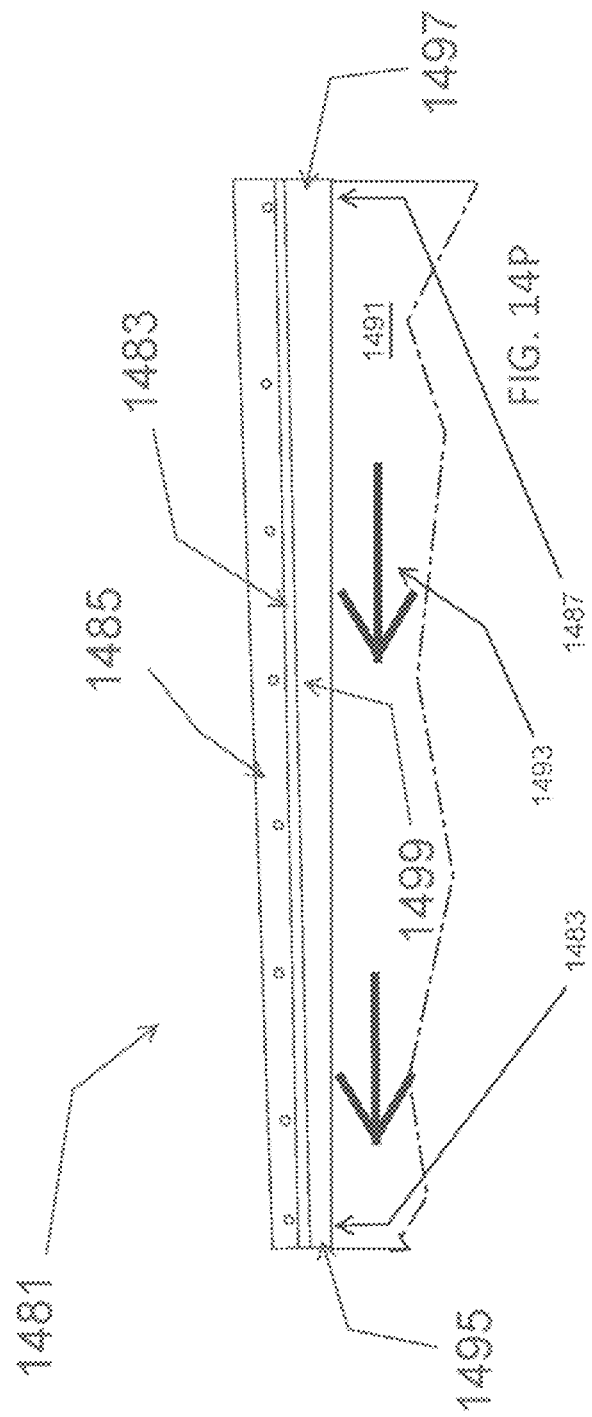

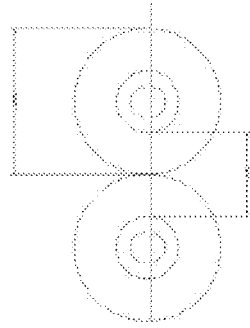
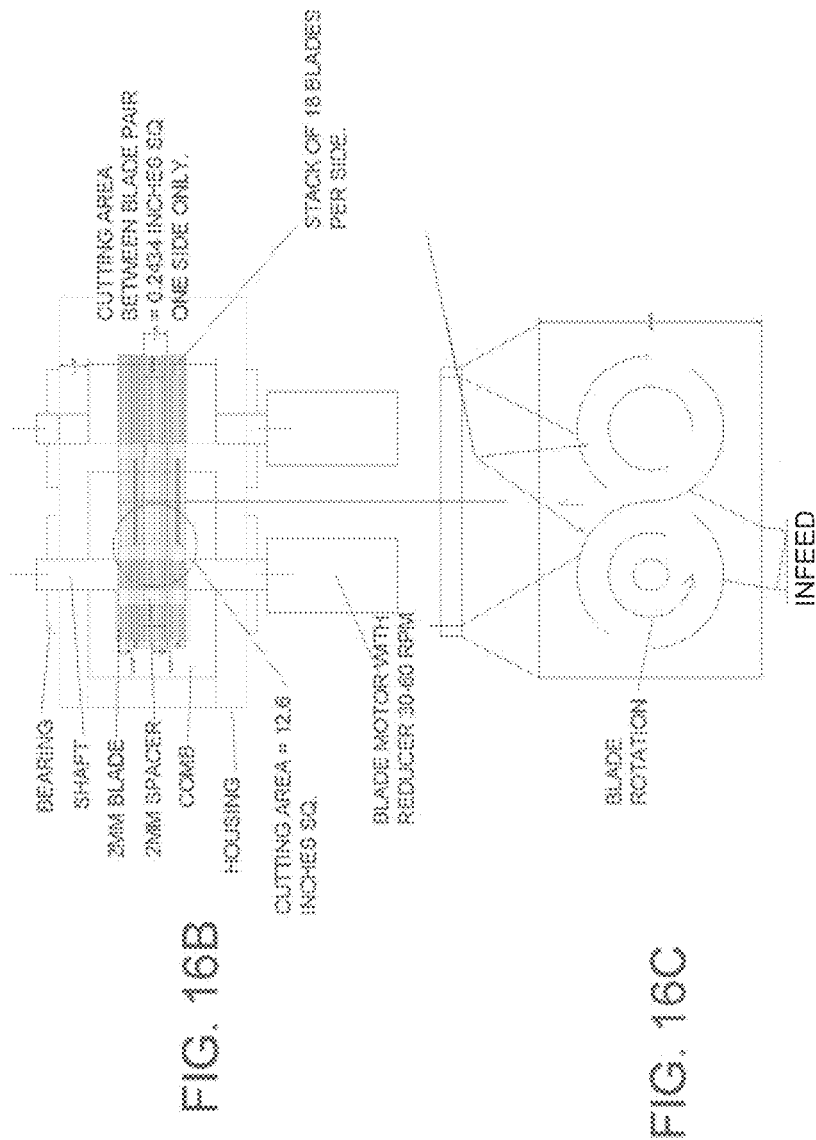
FIG. 16A
FIG. 16B
FIG. 16C

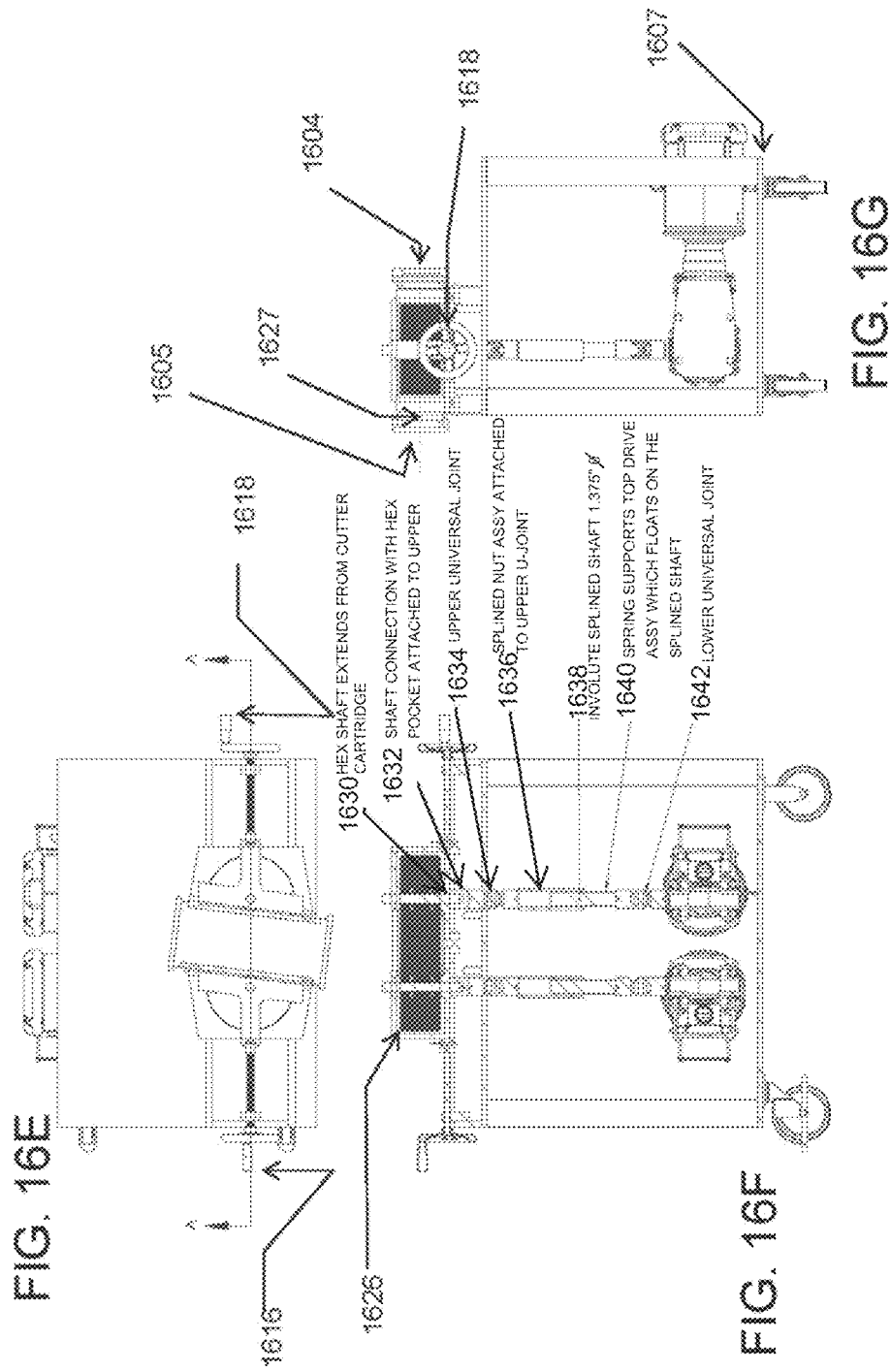

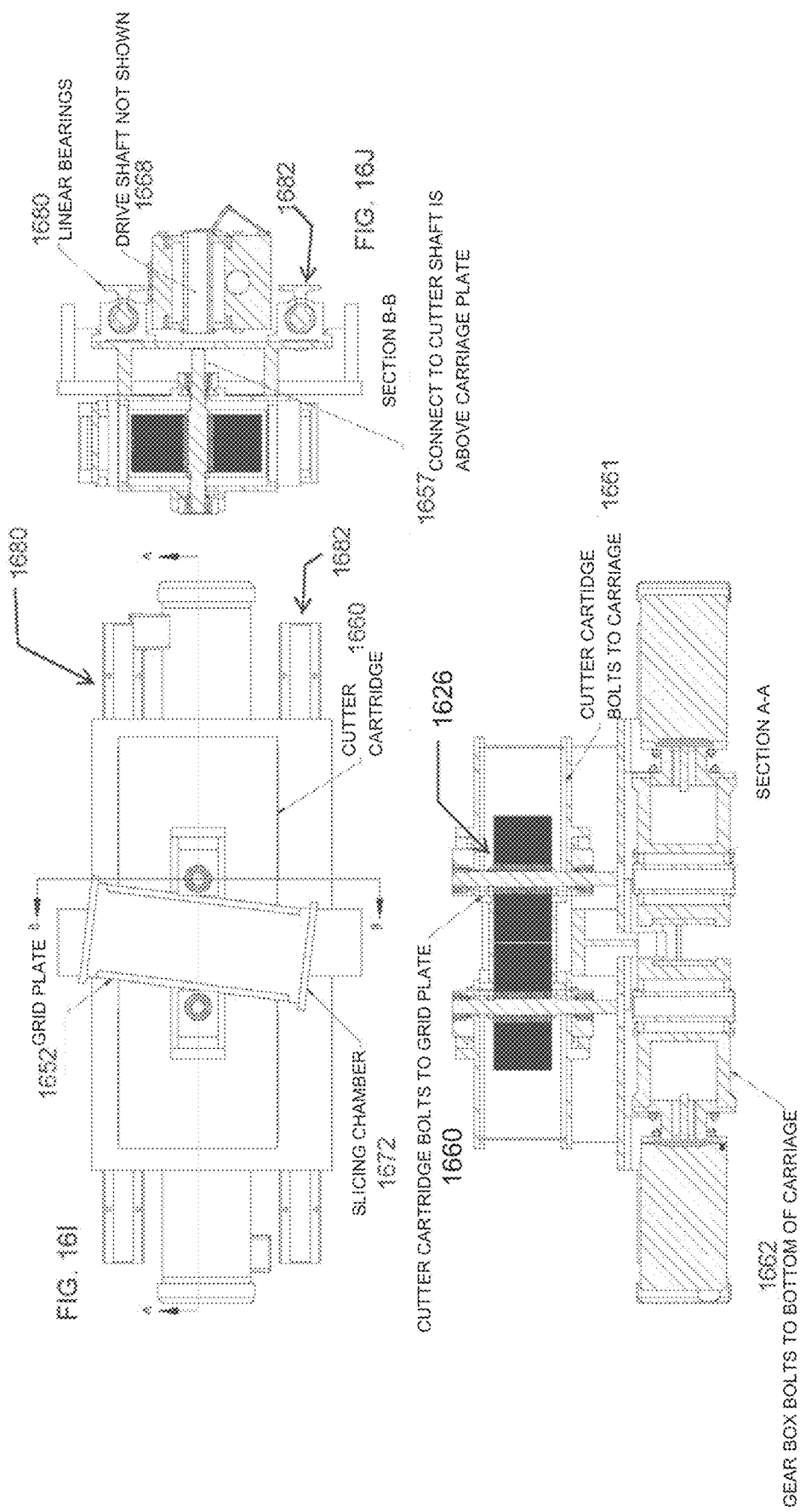

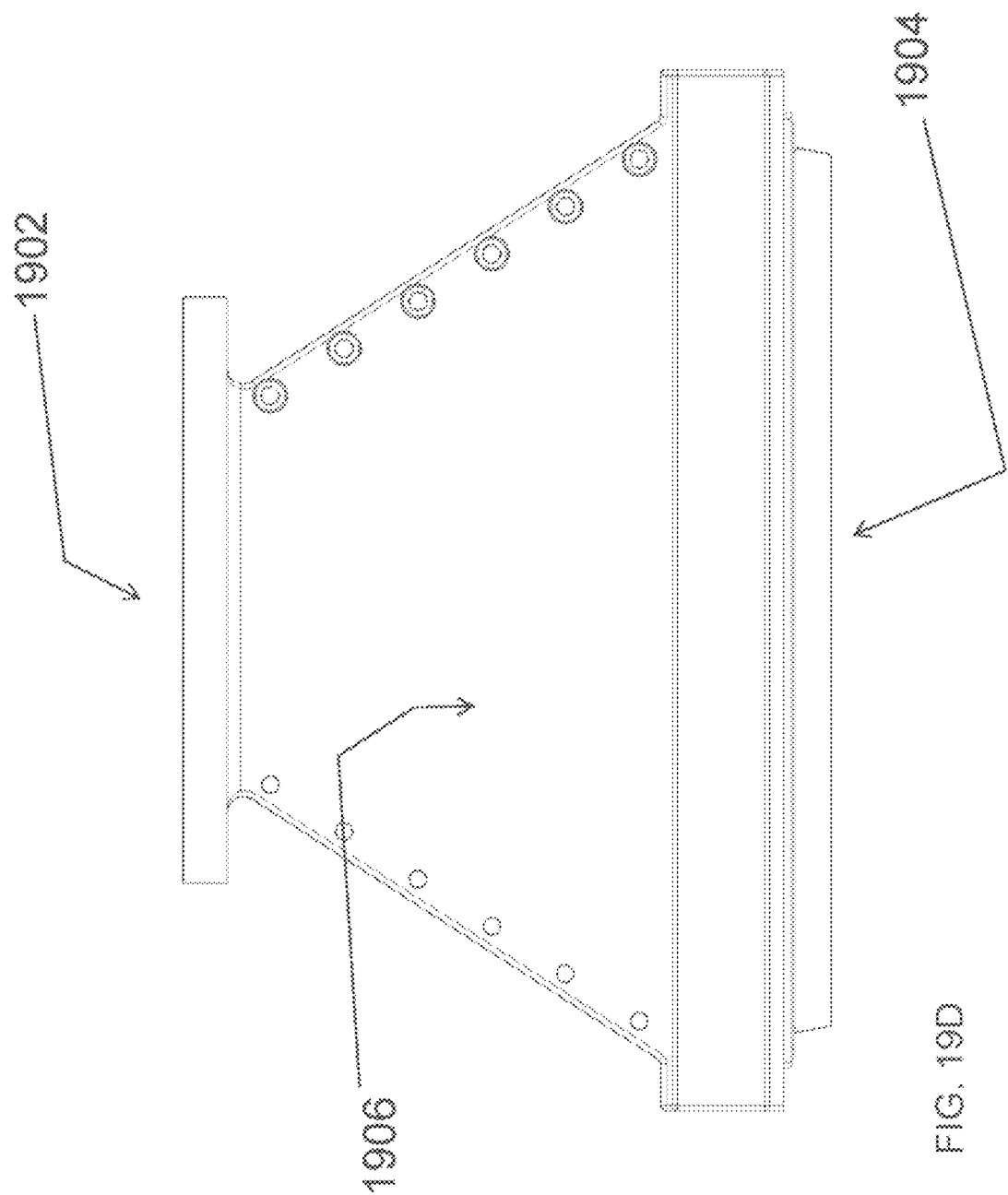

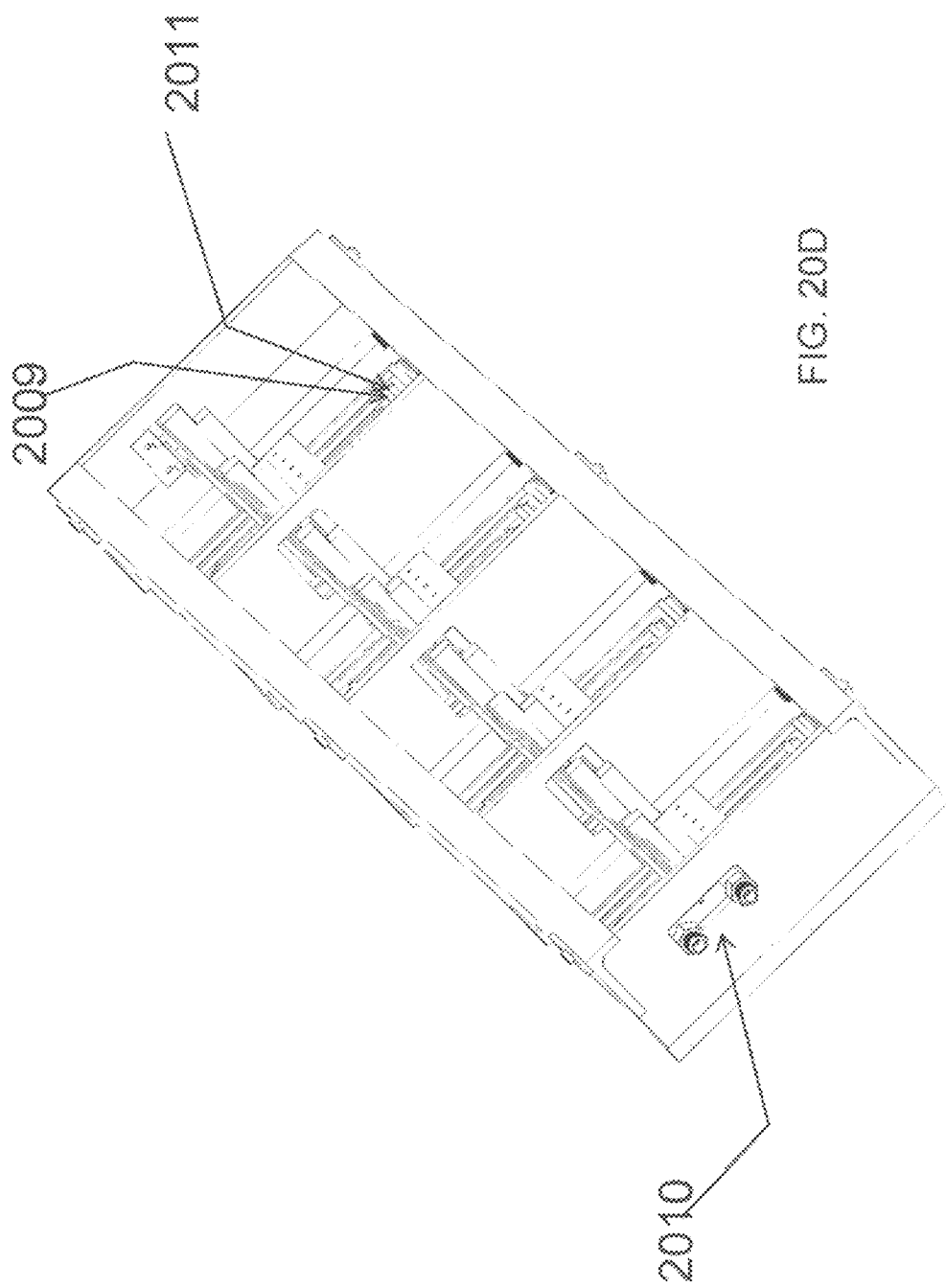

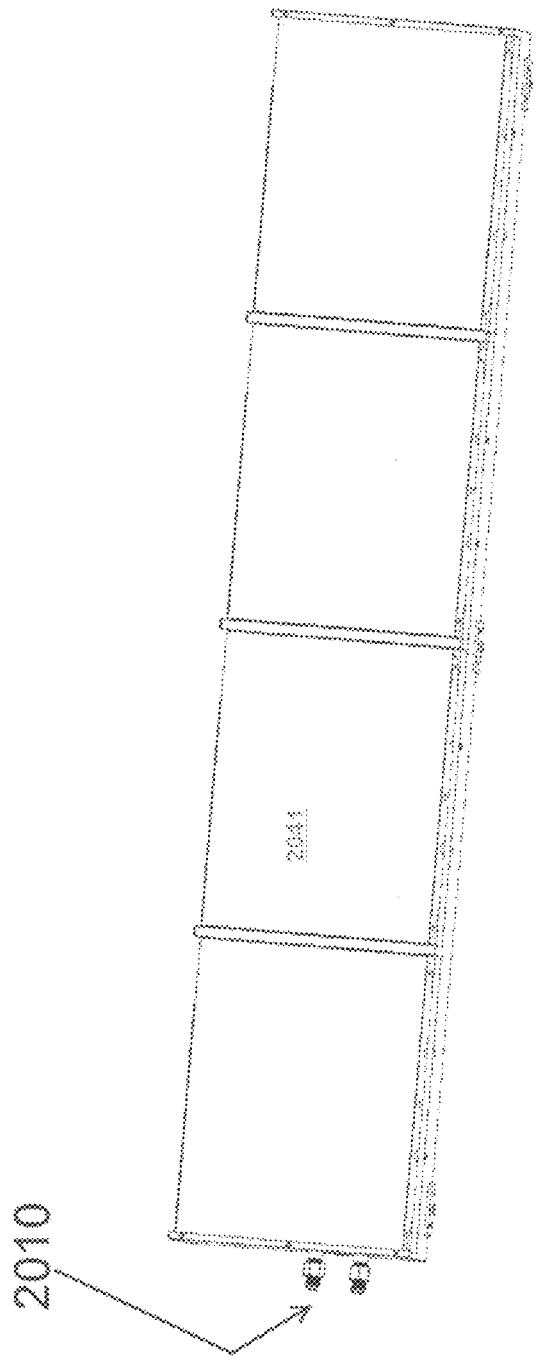

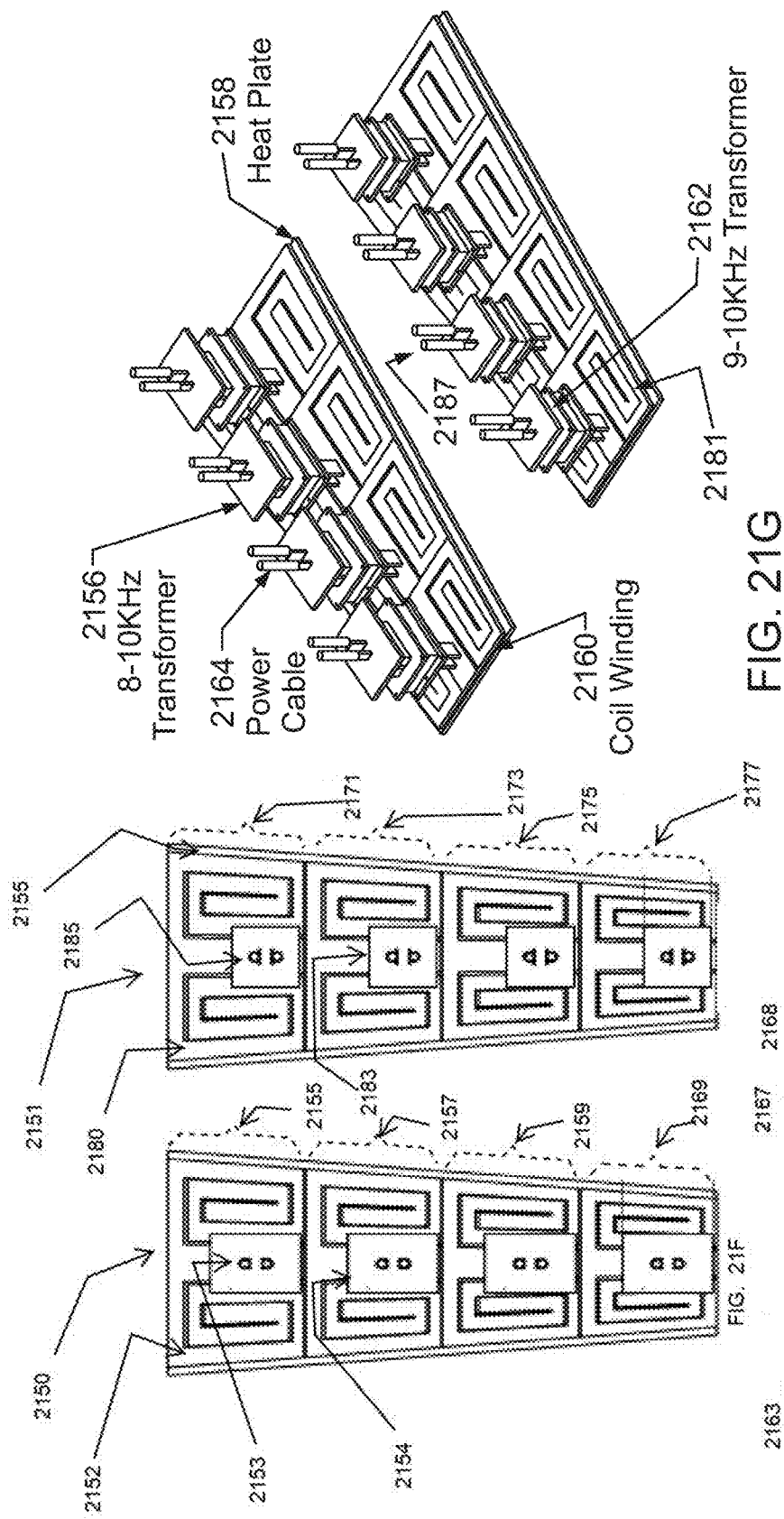
FIG. 21G
FIG. 21F
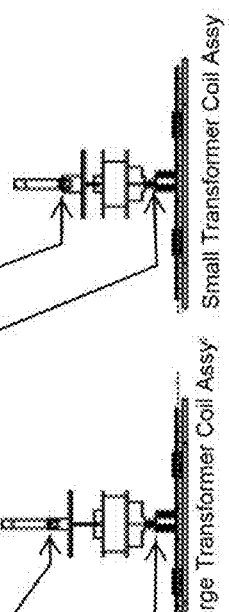
FIG. 21I
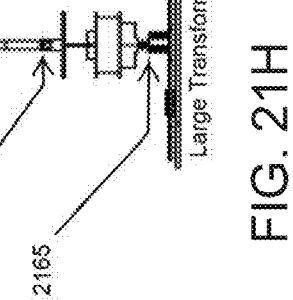
FIG. 21H

METHOD AND APPARATUS FOR SLICING AND PROCESSING WHOLE MUSCLE

This United States patent application is a Continuation-In-Part of and Claims Priority to U.S. patent application Ser. No. 16/944,871 Entitled METHOD AND APPARATUS FOR SLICING AND PROCESSING WHOLE MUSCLE, Filed Jul. 31, 2020, which is incorporated herein by reference in its entirety.

BACKGROUND

Field

This technology as disclosed herein relates generally to meat processing and, more particularly, to processing a meat product into a thinly sliced or sheeted product.

Background

Methods and Apparatus for slicing and processing whole muscle for a thinly slice and/or thinly sheeted meat item, such as meat for Philly Cheese Steak, has traditionally been very labor intensive, inefficient, and a batch process with a slow turn around. One prior method of processing whole muscle for a Philly Cheese Steak, included grinding whole muscle, mixing with salt and ingredients stuffing the mixed ground muscle into a box, palletizing, freezing the ground muscle into a solid cube and subsequently slicing the solid frozen cube with a single blade while the cube of ground meat is frozen at a temperature of about approximately 20 to 24 degrees Fahrenheit. The slice meat is subsequently conveyed through an oven and cooked. This process is labor intensive, time consuming and includes a significant amount of idle time during the batched process of freezing the cube. This prior apparatus and method requires freezer capacity for storing and freezing the cubes of meat and requires conveyance through a separate cooking station. The step of freezing the item prior to slicing the item, expends more energy, therefore, increases the cost to process.

In recent years, a trend in food product development has been toward providing products suitable for both quick preparation and convenient consumption. Manufacturers of these food items often produce them in shelf ready configurations and are often provided precooked and frozen. Even though many new products meeting these needs have been introduced commercially in recent years, there remains a need for a greater variety of convenient products that can be produced cost effectively and efficiently. The ability to commercially produce and sell any specific food product often depends on whether the product can be produced with economies of scale or other efficiencies while still meeting the other criteria of both quick preparation and convenient consumption. Sliced whole muscle meat items are very popular, such as for example, sliced meat and/or sheeted meat for Philly Cheese Steaks. However, the traditional apparatus and methods as described do not meet the criteria that the product can be produced with economies of scale, cost effectively and efficiently.

A better apparatus and/or method is needed for improving processing whole muscle for a thinly slice meat item, such as meat for Philly Cheese Steaks.

SUMMARY

The technology as disclosed herein includes a method and apparatus for improving processing whole muscle for a thinly slice and/or a sheeted meat item, such as a meat item for Philly Cheese Steaks. One implementation of the method and apparatus as disclosed and claimed herein includes grounding whole muscle and pumping the ground whole muscle through an in-line rotary multi-blade slicer and further extruding the product from the in-line slicer and pumping the product through a cooking horn. For one implementation of the method and apparatus, the product is pumped through an in-line sheeter before pumping the product through the cooking horn.

For one implementation of the in-line rotary multi-blade slicer, the diameter of each rotary blade is adjusted to the appropriate size based on the tensile and yield strength of the blade material to avoid bending of the blade during use due to pressure and force on the blade and between the blades. For one implementation of the technology, the blades are constructed of a stainless steel, and having a maximum thickness of about approximately 2 mm+/−10% and an edge thickness of about approximately, 0.1 mm+/−10%. However, the dimensions can vary depending on the application. For one implementation, the distant between the tips of the blades is about approximately 2 mm+/−10%. The maximum rotation speeds for the blades is also adjusted based on the tensile and yield strength of the blade material to avoid bending of the blade and transferring speed of inlet to the blade. Assuming the blade construction is as outlined above, then for one implementation, the rotation of the blades can be about approximately 30 rpms+/−10%. For one implementation of the method and apparatus, the apparatus includes a comb having members and/or fingers extending between the rotary blades for channeling product being conveyed to properly engage the rotary blade stack and in order to keep the space between the blades clear so that pressure or unwanted forces do not build up between the blades.

For one implementation of the method and apparatus, the in-line slicer is an in-line dual-stack rotary multi-blade slicer with an offset entry port. For yet another implementation of the method and apparatus, the product when being pumped through the cooking horn, is being pumped through an induction coil cooking horn. For one implementation of the method and apparatus, the cooking horn has a reverse taper in the interior channel of the cooking horn through which the product travels to provide the appropriate back pressure. Thinly sliced beef muscles have a tendency to shrink in size and increased in thickness when cooked if the cooking process is without pressing after cooking. For one implementation the cooking horn is configured with a reverse taper design in order to manage the pressure during the cooking process in order to compensate for some of the expansion of beef muscle thickness. The upper and lower cooking plates of the cooking horn are configured such that the inner channel of the cooking horn is tapered control the opening/thickness and width of infeed and outfeed. For one implementation, the tapered design for the inner channel is such that the outfeed thickness is 15% to 30% thicker than the infeed thickness and the width is maintained consistence through the cooking process. By way of illustration, referring to FIG. 14P, the infeed is illustrated as having an about approximately 2 mm thickness plus/minus about 10 percent and the outfeed has a thickness of about approximately 2.3 mm, plus/minus about 10 percent. For one implementation, the width varies also for certain product applications, by way of illustration, the tapers of the upper and lower cooking plates are configured with infeed about approximately 6 in, plus/minus 10% and outfeed about approximately 9 in, plus/minus about 10%. These reverse tapers for thickness and width are provided by way of illustration, but can vary depending on the product being processed and the desired end product characteristics. The heating plates width variations are for wider product applications such as bacon bits, for which the taper has thicker and narrow infeed vs. thinner/wider outfeed to thereby accelerate moving speed and separate bacon bits during the cooking. For one implementation of the system, the apparatus includes a sheeter as a transition conduit prior the induction cooking horn. The sheeter can be used to modify or optimize the flow rate or meat density.

The technology as disclosed and claimed herein provides for a more efficient methodology that is lower in cost and less labor intensive. The technology as disclosed and claimed herein is a continuous process rather than a batch process. Also, the technology as disclosed and claimed herein provide greater ability to effectively provide a thinner sliced final food item in the thickness range of 2 mm. With a prior art method, the fresh meat had to be molded into a box and frozen to make it possible to slice the meat into 2 mm slices. The prior art method of packing/molding a muscle item in a box and chilling and/or freezing the muscle item so that the muscle could be sliced thinly, resulted in the muscle cells rupturing due to the muscle having approximately 70% water content such that when the water content in the muscle freezes, the muscle cells tend to rupture thereby lowering the muscles capacity to hold water and resulting in a higher cooking yield loss, and which the chilling ultimately make it more difficult to slice in the frozen and/or near state. For the prior art method, the temperature of the had to be precisely controlled to be maintained within a 1 degree Fahrenheit to a 3 degree Fahrenheit variation of the freeze temperature of the meat product in order for the product to be thinly sliced. If the product is well below its freeze temperature, then the product is too hard and brittle and will break into pieces when sliced and may also damage the blade. If the product is well above its freezing temperature then the product being slice is too pliable thereby making it difficult to slice, and particularly difficult to thinly slice. The technology as disclosed and claimed herein allows the muscle's capacity to hold water to stay intact, because the temperature of the product during the process is at about approximately 35 to 40 degrees Fahrenheit. The features, functions, and advantages that have been discussed can be achieved independently in various implementations or may be combined in yet other implementations further details of which can be seen with reference to the following description and drawings.

One implementation of the technology is a method for processing whole muscle animal meat, which includes size reducing a whole muscle portion of animal meat to produce a size reduced whole muscle product. The method and apparatus for one implementation further cools. The method includes pumping the size reduced whole muscle product through an inline rotary cutter to engage a plurality of stacked spaced apart rotary blades. One implementation of the method and apparatus is rotating the stacked spaced apart rotary blades thereby slicing the size reduced whole muscle product as the size reduced whole muscle product engages the plurality of stacked space apart rotary blades to thereby produce a sliced size reduced whole muscle product.

At least one interpretation for the method for processing whole muscle animal meat as disclosed and claimed herein includes, extruding the sliced size reduced whole muscle product from the inline rotary cutter to a cooking horn and pumping the sliced size reduced whole muscle product through an interior channel of the cooking horn. The method includes heating interior cooking plates of the interior channel of the cooking horn thereby cooking the sliced size reduced whole muscle product. One implementation of the method further includes extruding the cooked sliced size reduced whole muscle product through the cooking horn and out of the cooking horn into thin sheets of cooked sliced size reduced whole muscle product.

For one implementation of the method and apparatus, the method for processing whole muscle animal meat includes extruding the sliced size reduced whole muscle product from the inline rotary cutter and through an inline sheeter prior extruding to the cooking horn. In order to control back pressure, one embodiment of the technology includes the interior channel of the cooking horn having a reverse taper.

For one implementation the plurality of stacked spaced apart rotary blades include a first and second stack of stacked spaded apart rotary blades thereby having dual side-by-side stacks. For one implementation a whole muscle portion of animal meat is size reduced by grinding the whole animal muscle to an about approximately 1-inch diameter grind plate or kidney plate with about 1×2 inch(es). Thin sheets of cooked, sliced and size reduced whole muscle product are extruded from the cooking horn in 2 mm sheets. The system for processing whole muscle animal meat includes an inline rotary cutter having a plurality of stacked spaced apart rotary blades and an extrusion conduit coupling the inline rotary cutter with a sheeter coupling that is connected to the cooking horn.

For one embodiment the inline rotary cutter comprises an inlet nozzle through which product enters the inline rotary cutter and said inlet nozzle has in interior inlet channel that progressively narrows from the entry end toward the exit end and said inlet channel is communicable with an interior cutting channel of the inline rotary cutter. Similarly, for one implementation, the inline cutter includes an outlet nozzle through which product exits the inline rotary cutter and said outlet nozzle has in interior outlet channel that progressively widens from the entry end toward the exit end and said outlet channel is communicable with the interior cutting channel of the inline rotary cutter.

For one implementation of the technology as disclosed and claimed herein, the inline rotary cutter includes a blade comb, where said blade comb has a plurality of fingers, where each finger extends into the space between the rotary blades to channel product traveling through the inline rotary cutter and clear product from between the spaced apart rotary blades. For one implementation, the cooking horn has an interior channel through which product travels, where the interior channel has a reverse taper in order to control backflow pressure. For one implementation for cooking, the cooking horn is an induction heated cooking horn. In order to achieve a higher throughput volume of product, the plurality of stacked spaced apart rotary blades includes two separate stacks of stacked space apart rotary blades.

For one implementation for size reducing the whole muscle animal meat as recited the size reducing is performed by a grinder and a mixer for grinding the whole muscle animal meat. A freezer for freezing the final product is provided. The plurality of rotary blades are separated by a shim spacer, where the thickness of the shim/spacer is about approximately 10 mm; +/−0.5 mm based on the characteristic of the desire final product thickness.

For one implementation, a cutter transition nozzle is used between the cutter and the cooking horn. The nozzle for one implementation includes diverter baffles to assist with the separation of the sliced sheets of product. Further for one implementation of the cooking horn, the horn includes four independently adjustable induction heating zones. For one implementation the cooking horn also includes tubular channel inserts through which product flows.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 2A through 2C are an illustration of the inline rotary cutter assembly mounted on a platform;

FIG. 3 is an illustration of the inline rotary cutter assembly mounted on a platform and with the outer top cover plate removed;

FIGS. 4A through 4B are an illustration of the inline rotary cutter assembly with the outer top cover plate removed;

FIGS. 5A through 5B are sectional views of an illustration of the inline rotary cutter assembly with the outer top cover plate removed;

FIGS. 6A through 6C are an illustration of the inline rotary cutter assembly with several of the outer top cover plates removed and including the drive motor;

FIGS. 7A through 7B are an illustration of an exploded diagram of the inline rotary cutter assembly;

FIGS. 7C through 7I are an illustration of a center support for the rotary blade stack;

FIGS. 8A through 8C are an illustration of the blade stack;

FIGS. 9A through 9D are an illustration of the input and output port;

FIGS. 11A through 11C are an illustration of the blade stack

FIG. 12 is an illustration of a bearing member;

FIG. 13 is an illustration of the single blade;

FIGS. 16A through 16K are an illustration of the dual stack rotary blade system.

FIGS. 19A through 19H are an illustration of a cutter transition nozzle;

FIGS. 20A through 20I are an illustration of an adjustable induction coil assembly;

FIGS. 21F through 21I are an illustration of a transformer controlled induction coil.

Figure 1:
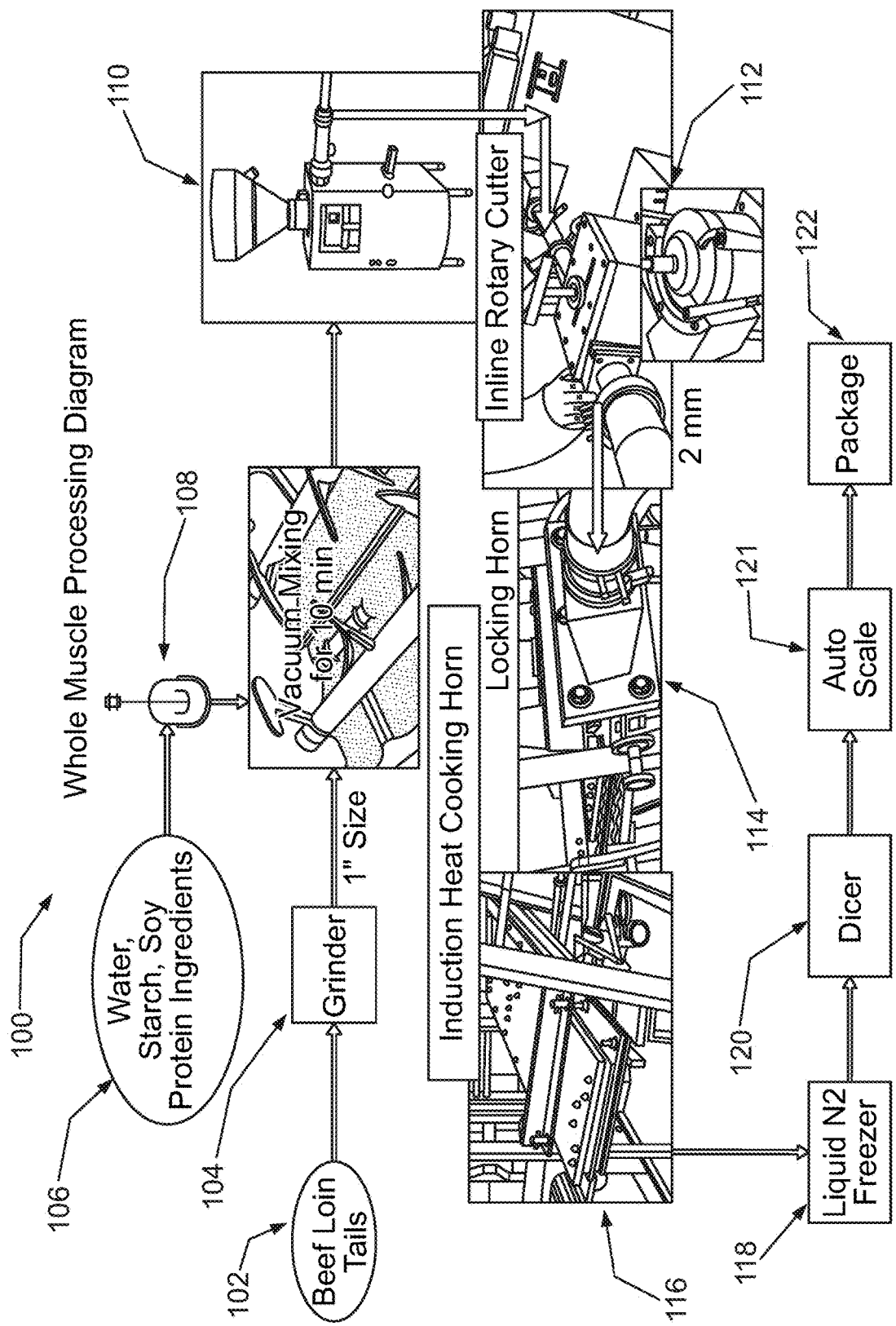
FIG. 1 is an illustration of a whole muscle process.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIG. 1-22 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

One implementation of the present technology as disclosed comprising a stacked inline rotary blade, teaches a novel apparatus and method for processing whole muscle.

The details of the technology as disclosed and various implementations can be better understood by referring to the figures of the drawing. Referring to FIG. 1, an illustration of a whole muscle process 100 is provided. One implementation of the process includes taking a beef loin tail or other edible animal muscle item 102 and grinding 104 the item. For one implementation, the item 102 is ground to a diameter of approximately 1 inch. However, this can vary depending on the product been produced and the type of animal muscle being utilized. For one implementation of the process, the ground muscle is vacuum mixed 108 and 110, using a mixer 110 under vacuum 108. The ground product can be mixed with various ingredients for including water, starch, soy protein ingredients 106 and flavoring ingredients. The ground and mixed product is conveyed (pumped) to and through an inline rotary cutter 112. The sliced product is extruded under pressure through a sheeter stage 114 and from the sheeter stage 114 through an induction cooking horn 116. For one implementation of the process, the product is fully cooked at about approximately 165 degrees Fahrenheit by the induction cooking horn 116. For yet another implementation the product is partially cooked at about approximately 130 degrees Fahrenheit by the induction cooking horn. The cooked or partially cooked product is frozen 118, using for example a liquid N2 freezer. The cooking temperature can vary depending on the type of muscle and the desire whether fully cooked or partially cooked. For one implementation of the method, the product is diced 120, auto scaled 121 and packaged 122.

Figure 2A:
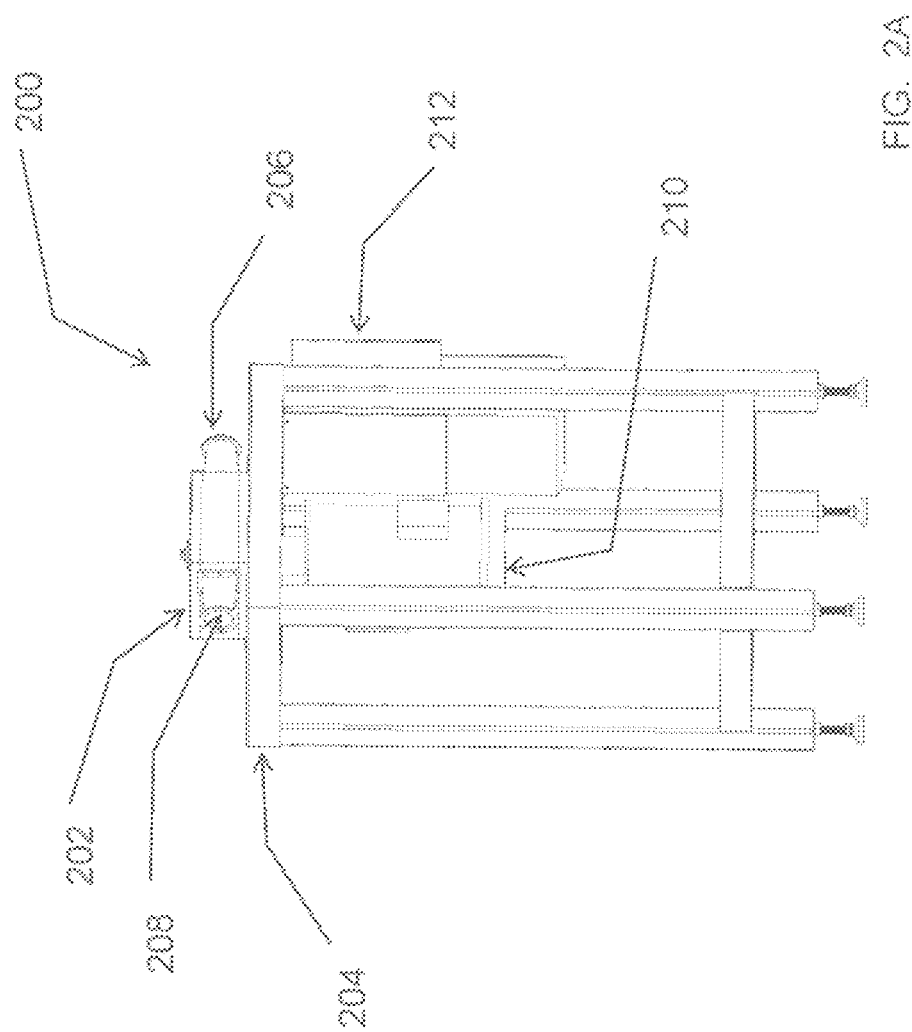
Figure 2C:
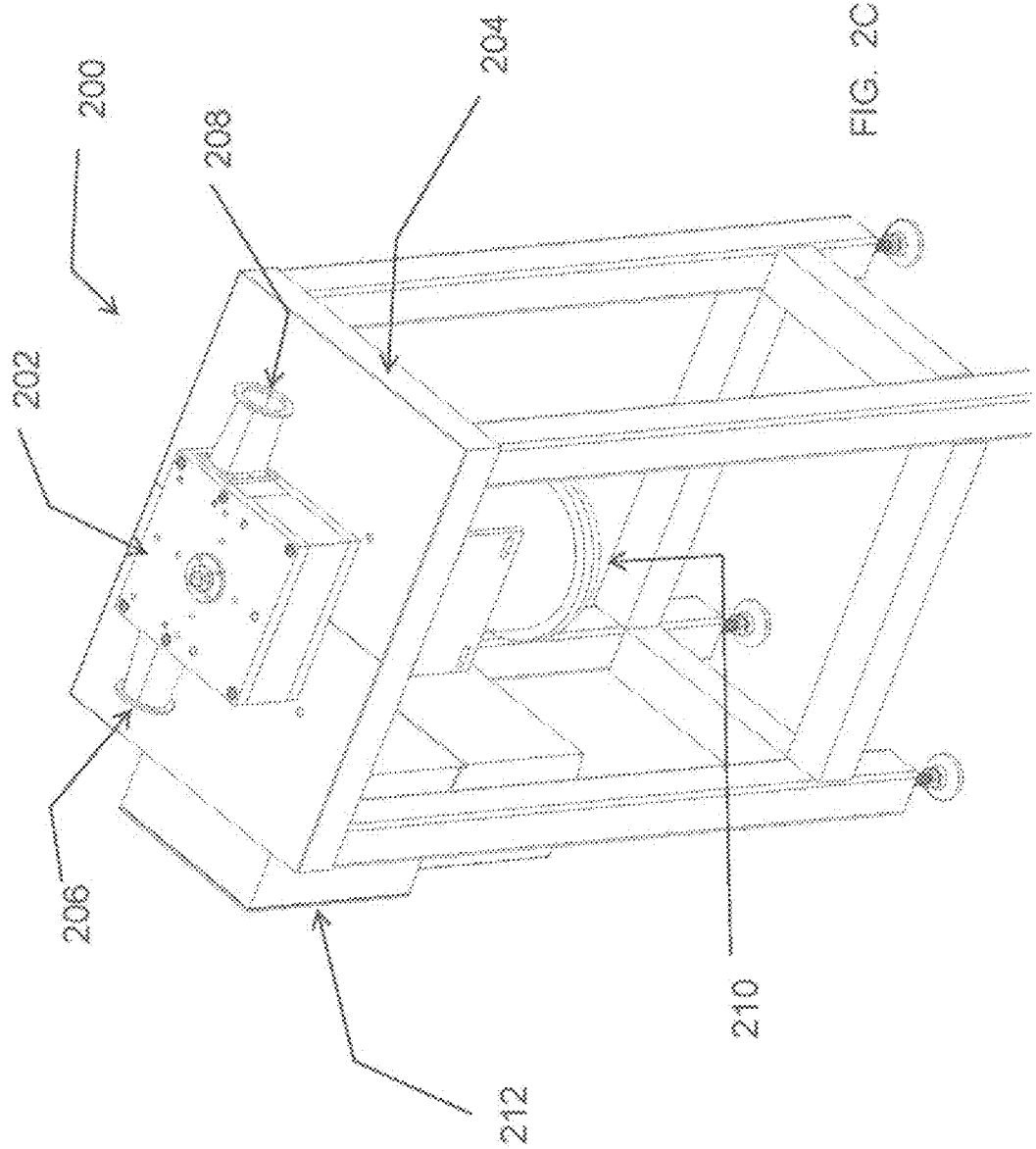

Referring to FIGS. 2A through 2C, an illustration of the inline rotary cutter assembly 202 mounted on a platform 204 is provided by the assembly 200. The inline rotary cutter 202 has an input port 206 and an exit port 208. The inline rotary cutter 202 is driven by a motor 210 at a selectable speed. A controller 212 is used to control the flow of product seen at the input and the speed of the motor and thereby the rotational speed of the blades.

Referring to FIG. 3, an illustration of the inline rotary cutter assembly mounted on a platform and with the outer top cover plate removed is provided. The inline rotary cutter 202 mounted on a platform 204 includes, and entry port 206 and an exit port 208. The inline rotary cutter includes a rotary blade stack including multiple rotary blades one on top of the other with a small spacing there between. The entry port is in fluid communication with an entry flow channel of the cutting channel 310. The rotary blade stack is rotationally mounted over bearing member 302. The rotary blade stack includes a flange cap 304 for containing the blade stack and a ball bearing flange 312 to facilitate the stack rotation. One implementation of the assembly includes a blade comb 308, which clears the space between the individual rotary blades 306 of any product and contains the product in the slicing channel 310 and thereby contacting the rotary blade stack.

Referring to FIGS. 4A through 4B, an illustration of the inline rotary cutter assembly with the outer top cover plate removed is provided. The middle blocks 402 and 404, the back plate 408 and the front block 406 contain the rotary blade stack 300 and defines the slicing channel through which the product travels and engages the blade stack 300. The view also further illustrates the entry 206 and the exit 208 nozzles through which the product enters and exits the rotary blade assembly 202. The blade stack 300 has an integral comb assembly 309 for cleaning away debris 1 between the blades.

Referring to FIGS. 5A through 5B, a sectional view of an illustration of the inline rotary cutter assembly with the outer top cover plate removed is provided. This sectional view provides a better illustration of the entry end of the cutting channel 310, which extends to the exit end of the cutting channel 410. The product travels from the entry end 310 of the cutting channel, through the rotary blade stack 300, and through the exit end 410 of the cutting channel. The sectional view also illustrates the interior walls and surfaces of the entry nozzle 206 and the exit nozzle 208. The distance between the lateral walls 502 and 504 of the entry nozzle 206 progressively decreases in the direction of the product travel. The distance between the lateral walls 508 and 510 of the exit nozzle 208, progressively increases in the direction of travel of the product. Further, the distance between the bottom wall 506 and the opposing complimentary top wall (not shown) decreases in the direction of product travel, whereas the bottom wall 512 of the exit nozzle and the opposing complimentary top wall (again—not shown) increases in the direction of travel of the product.

It is also illustrated that for one implementation of the technology, the middle block 402 and the back plate 408 include opposing facing walls 514 and 516, which define the side boundaries of the exit end of the cutting channel 410. The distance between the opposing facing side walls 514 and 516 increase along the direction of travel of the product. It is also illustrated that for one implementation of the technology, the middle block 404 and the back plate 408 include opposing facing walls, which define the side boundaries of the entry end of the cutting channel 310. The distance between the opposing facing side walls decreases along the direction of travel of the product. In order to achieve the desired pressure in the cutting channel, for one implementation, the total area of the plurality of spaces between the blades in the cutting channel combined is equivalent to the area of the infeed portal into the cutting channel.

Figure 6C:
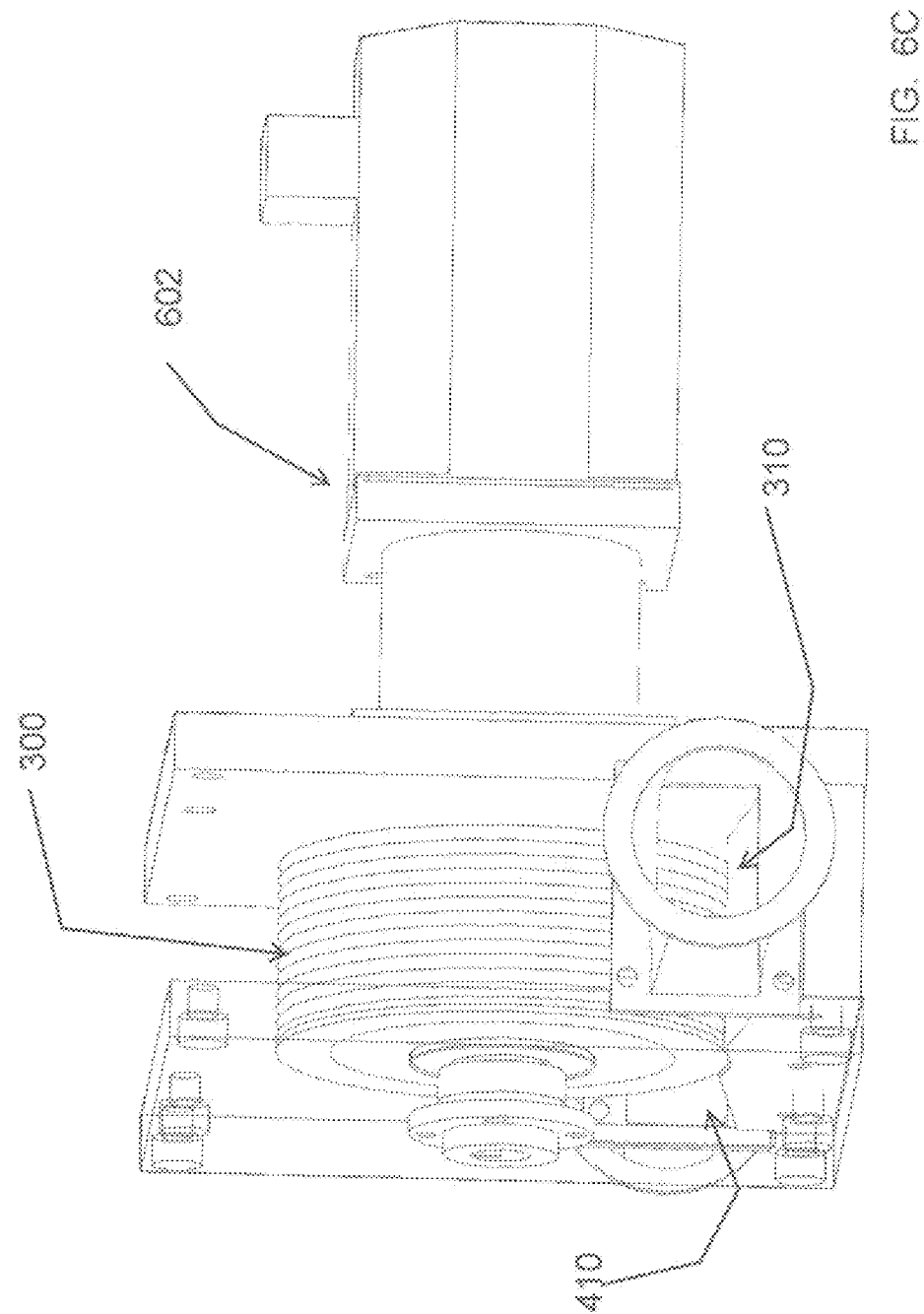

Referring to FIGS. 6A through 6C, an illustration of the single stack inline rotary cutter assembly with several of the outer top cover plates removed and including the drive motor 602 is provided. The entry portion 310 of the cutting channel and the exit portion 410 of the cutting channel is further illustrated. The plurality of cutting edges of the rotary blade stack projects into the cutting channel as defined again by the back plate and the middle blocks.

Referring to FIGS. 7A through 7B, an illustration of an exploded diagram of the inline rotary cutter assembly is provided. The entry and exit nozzles 206 and 208 are illustrated. The top plate 702 of the assembly and bottom motor mounting plate 704 and motor side ball bearing flange 706 is illustrated. A sinew block is also illustrated.

Figure 7C:
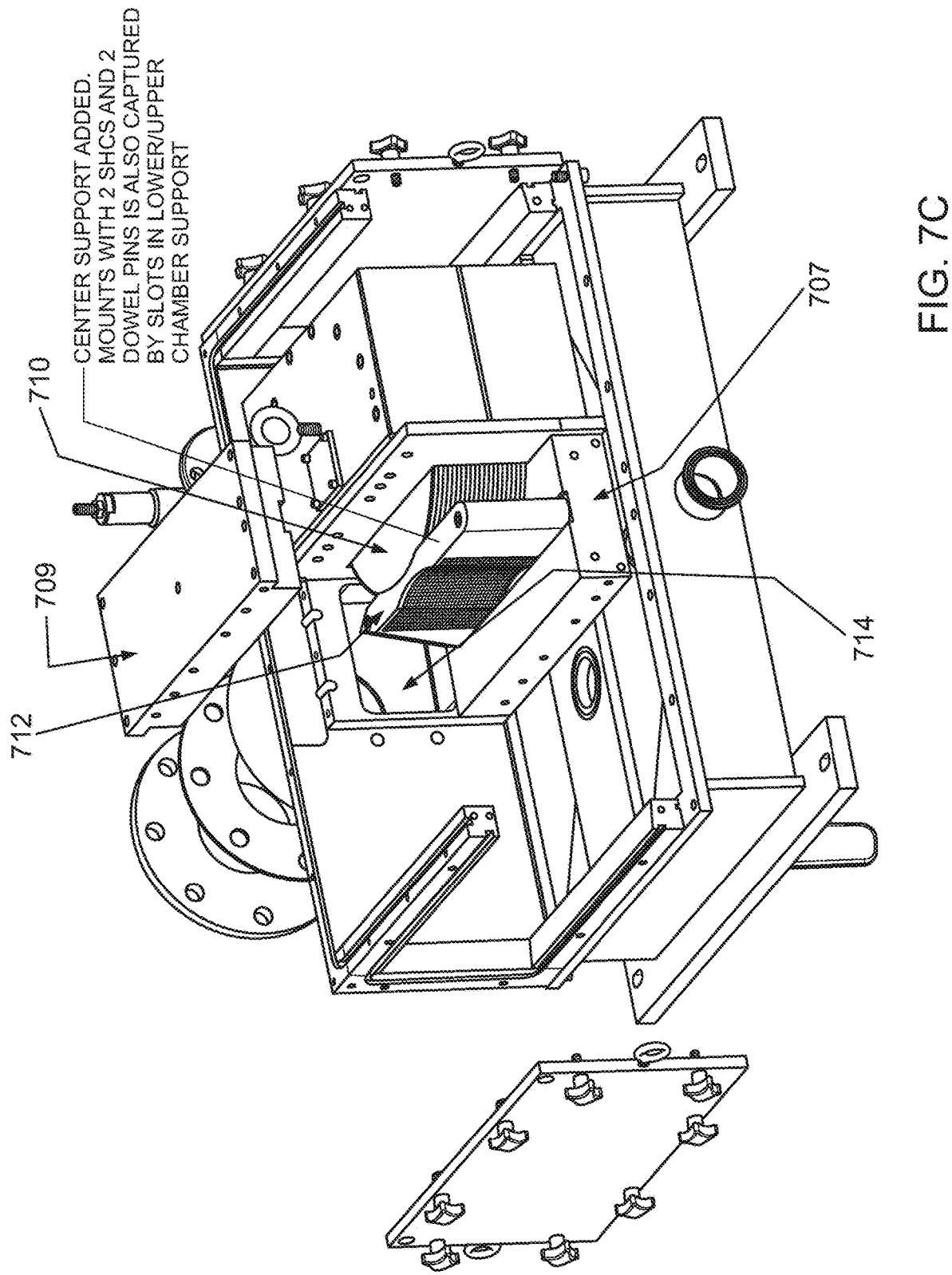

Referring to FIGS. 7C through 7I, an illustration of a center support for the rotary blade stack is shown. Depending on the thickness of each rotary, the material used for its construction, the distance between each blade in the stack, the rotational speed under which the blade is operated and the accumulated pressure and forces between the blades during operation, the rotary blades can have a tendency to flex and bend such that distance or spacing between blades is not consistent along the blades radius or across its surface. The blade deflections result in the product not being slice to the proper size/thickness and the size/thickness is inconsistent. The center support provided resists blade deflection. Referring to FIG. 7C, an illustration of the inline rotary cutter assembly with outer cover plates removed exposing the cutting channel 714, the rotary blade stack 710 and the center support 712 is provided. For one implementation, the center support is mounted and captured in slots in the lower and upper chamber supports 707 and 709 respectively. The center support 712, includes central vents or fins that are positioned to extend into the spacing between the blades to thereby provide better support to the rotary blades and resist deflection of the rotary blades to thereby achieve the desired product thickness uniformly and consistently.

Figure 7E:
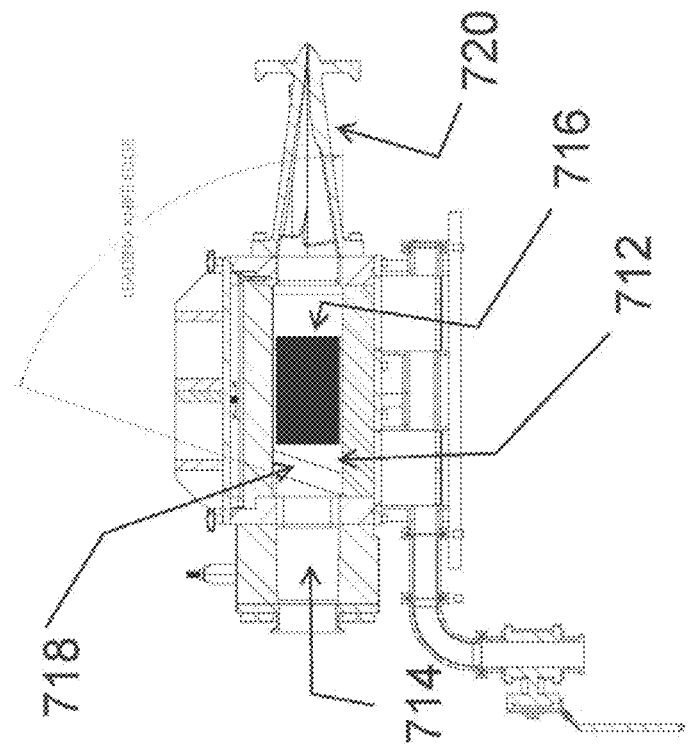
Figure 7D:
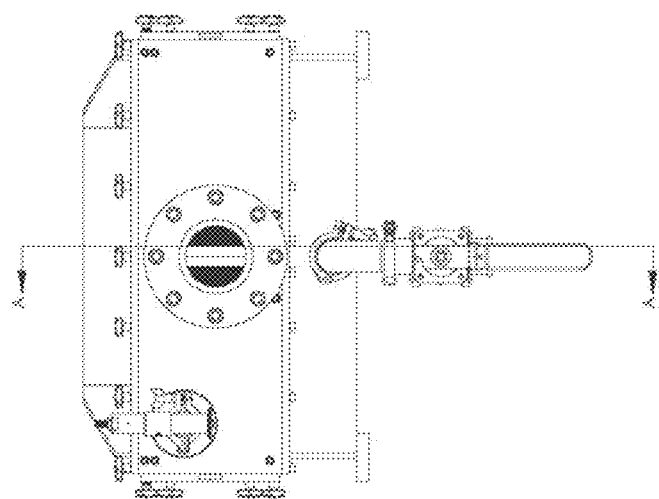
Figure 71:
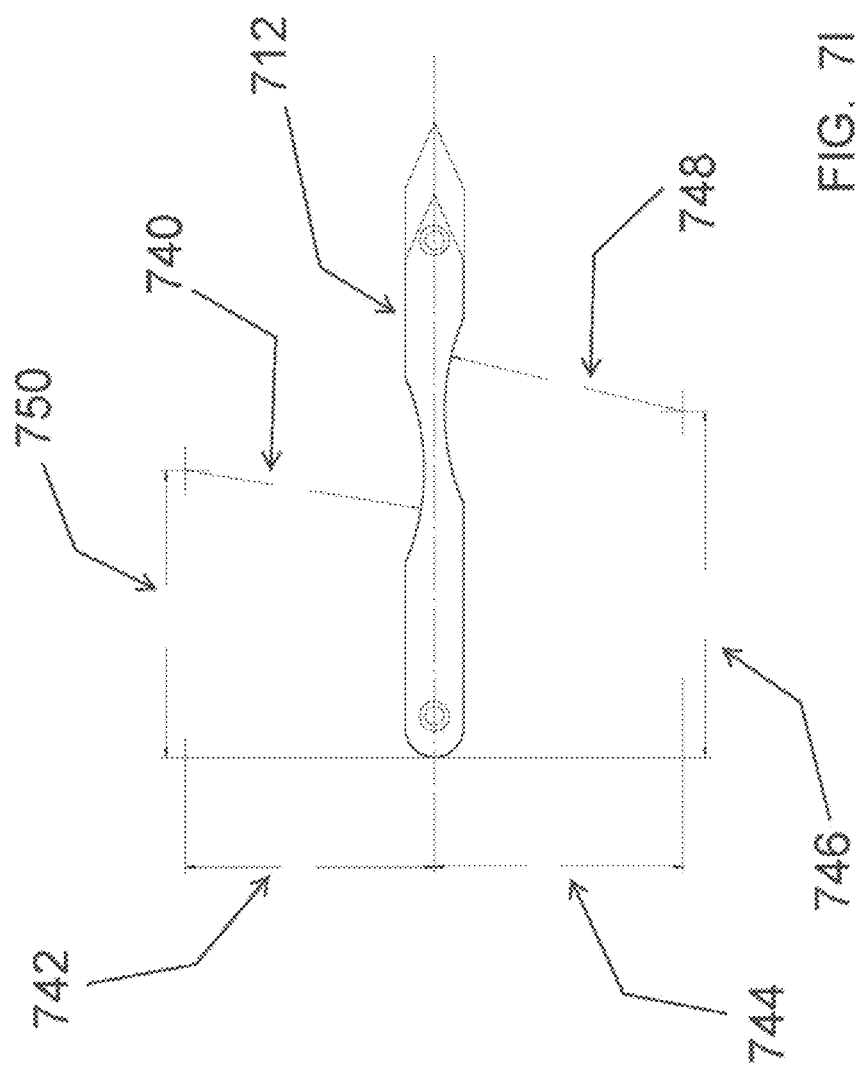

Referring to FIGS. 7D and 7E, an entry end view and a sectional side view is provided. The entry end view illustrates an open entry portal 701, through which the sharpened end 718 of the support member 712 can be seen. Product enters the entry portal 701 and travels through the channel 714 to engage the rotary blade stack. The product exits the rotary blade assembly through one implementation of a transition nozzle 720. The fins 716 of the support member 712, which alternately interlace with the rotary blades whereby each rotary blade extends between immediately adjacent fins and each fin extends between immediately adjacent rotary blades in an alternating interlaced configuration.

FIGS. 7F through 7H are a further illustration of the support member 712. The support member has a sharpened leading edge 718. The fins 716 are a series of substantially rectangular flattened spaced apart panels 724 vertically stacked one above the other. Each fin has an accurate side notch 726. The spacing between the fins is defined by 726 and 722 defines the distance center to center of each spacing as illustrated in Detail A of FIG. 7G. The distance between the base of the support member and the fins is 728, which is consistent with the slots in the lower and upper chamber supports 707 and 709 respectively in which the support member 712 is mounted. The height of the support member 712 is illustrated by 730 and the height of the fin stack is illustrated by 732. The sharpened leading edge 718 acts as pilot that deflects on coming product as the oncoming product approaches the blade stack, which will assist in reducing the pressure and forces between the rotary blades as caused by the flowing product. The leading edge, having a bevel angle 735, of the pilot or deflector extends with an acute angle with respect to the horizontal base of the support member. The acute angle is illustrated by 737. The angle of the bevel of the sharpened edge is illustrated by Section B-B of FIG. 7G. The spacing and the positions of the dowel holes are illustrated by 729, 731, 733, 734, 736, 738 and 739. The fin stack of the support member 712 is oriented such that each flattened fin is substantially parallel with the substantially horizontal base of the support member. The fin stack is centrally located in the support member structure and the fins extend between and through the sides of the support member. For one implementation each fin has an arcuate notch in opposing sides of each fin. For yet another implementation the arcuate notches are circular arcs having radii 740 and 748 as illustrated. The opposing arcs of each fin are staggered along the length of the fin such that. The circular centers of the arcs are a distance from the trailing edge of the support member 712, where the respective distances are illustrated by 746 and 750. The respective distances between the center line of the support member 712 and the circular centers is illustrated by 742 and 744.

Referring to FIGS. 8A through 8C, an illustration of the blade stack is provided. The blade shaft 302 includes a blade shaft/arbor 806. Also, between each of the blades 802 there is a shim/spacer disc 804 having a thickness to create a desired thickness for a slice. The blades 802, for one embodiment, include dual beveled cutting edges. The containment flange 804 contains the stack securely. Referring to FIGS. 9A through 9D, an illustration of the input and output port is provided. The nozzle has an opening 902 and a mounting flange 904 for mounting on the rotary blade assembly. Items 902 and 906 illustrate the openings on opposing ends of the nozzle. This illustration also further reveals how the upper and lower walls would vary in distance along their length. Referring to FIG. 10, an illustration of a blade comb 308 is provided. The blade comb 308, includes a plurality of teeth 1002 that extend between the individual blades of the blade stack for clearing debris from between the blades in the stack. Referring to FIGS. 11A through 11C, an illustration of the blade stack is provided. The illustration illustrates the blade stack with spacing 1102 between each blade based on the spacer 804. In order to achieve the desired pressure in the cutting channel, for one implementation, the total area of the plurality of spaces between the blades in the cutting channel combined is equivalent to the area of the infeed portal into the cutting channel.

Figure 10A:
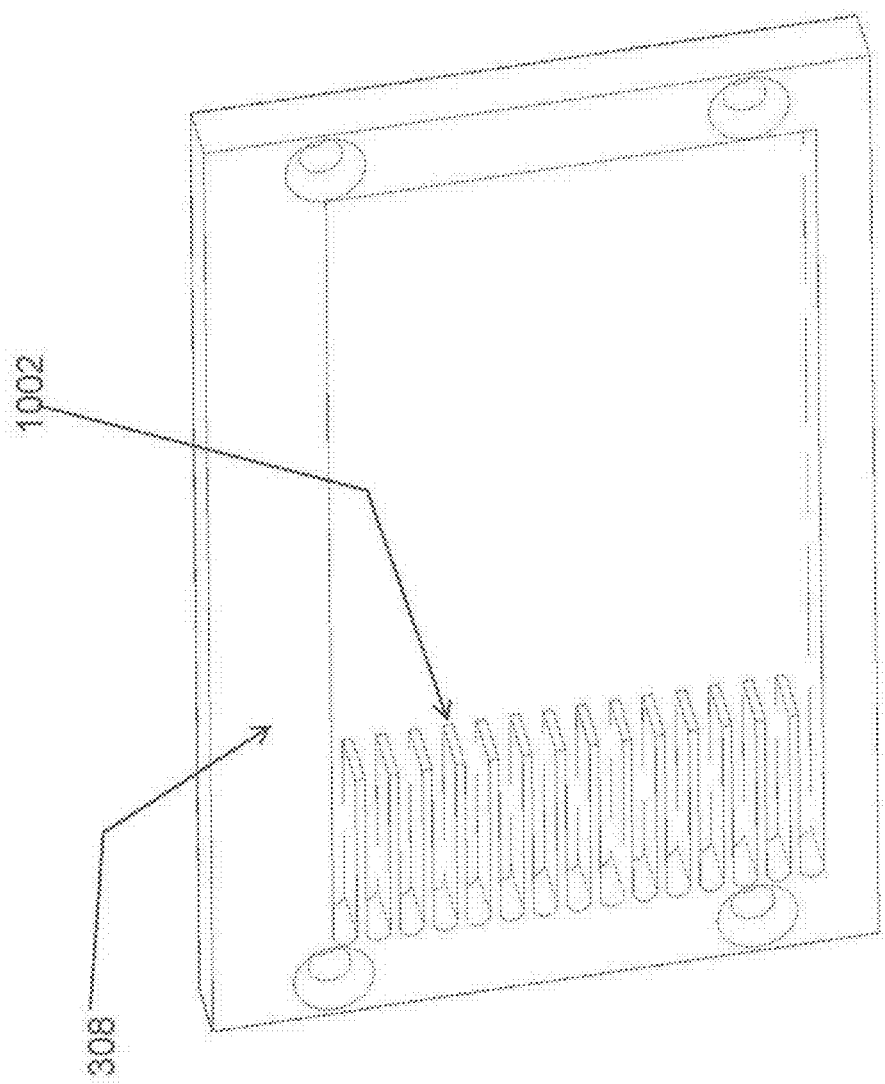
FIG. 10A is an illustration of a blade comb.
Figure 10B:
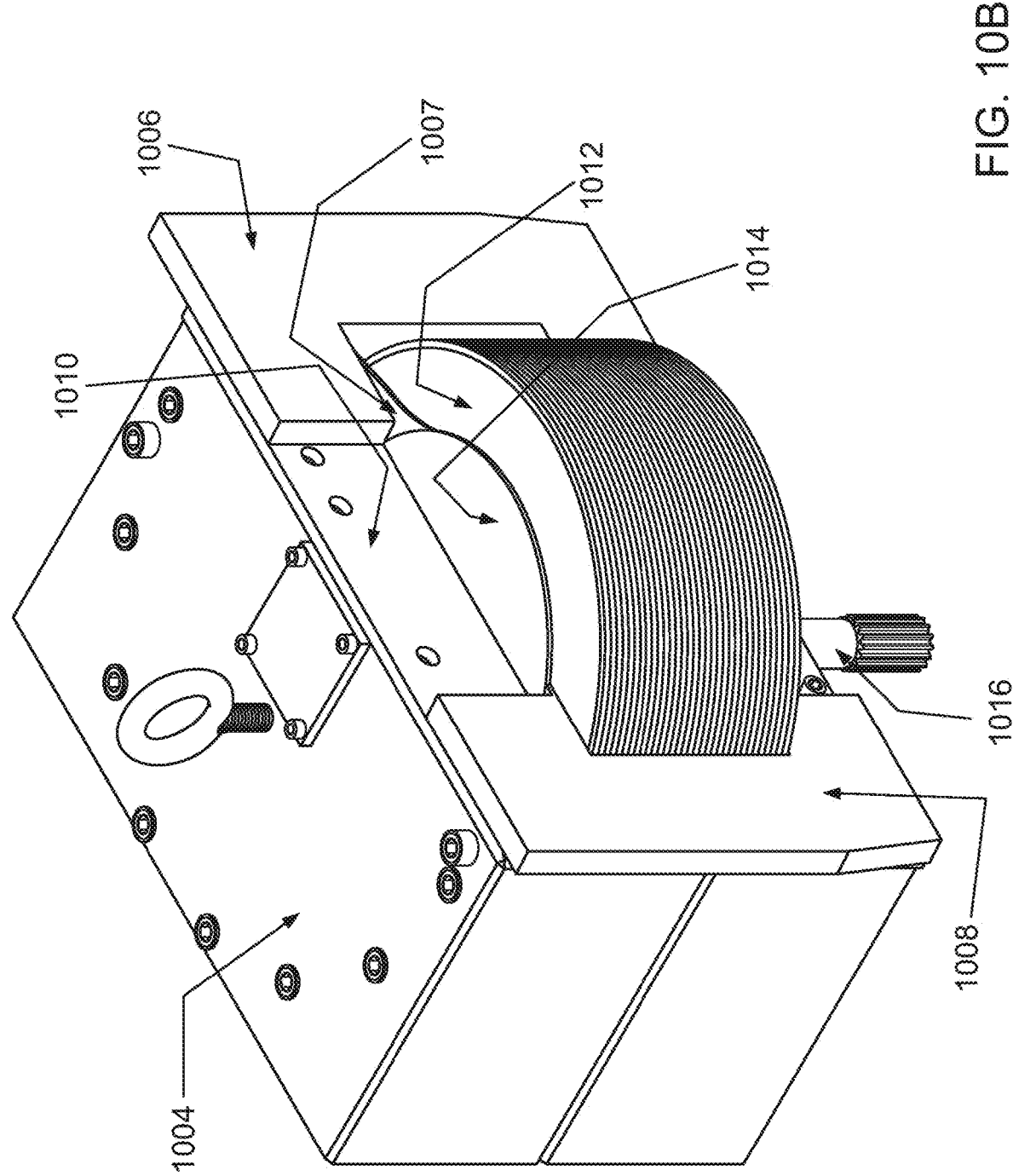
FIGS. 10B through 10F is an illustration of an antideflector.

Referring to FIGS. 10B through 10F, an illustration of an anti-deflector for a circular blade stack is illustrated. FIG. 10B provides a perspective view of a circular blade stack 1012 partially contained in a housing 1004. The circular blade stack rotates on axle 1016, whereby the axle 1016 is powered by a motor to rotate, thereby causing the blade stack to rotate for slicing a product. A semi-circular portion of the blade stack extends beyond the housing 1004 and into the product flow path. An end shim/spacer disk 1014 and adjustment screw 1018 is illustrated framing the blade stack 1012. Also, FIG. 10B illustrates left (1008) and right (1006) anti-deflection members utilized to reduce the vertical deflection of the circular blades during a cutting operation. The left anti-deflection member 1008, as illustrated in the view, can also be referred to as the forward anti-deflection member, because it is up stream with respect to the right or aft anti-deflection, member which is downstream with respect to the forward anti-deflection member along the product flow path.

Figure 10C:
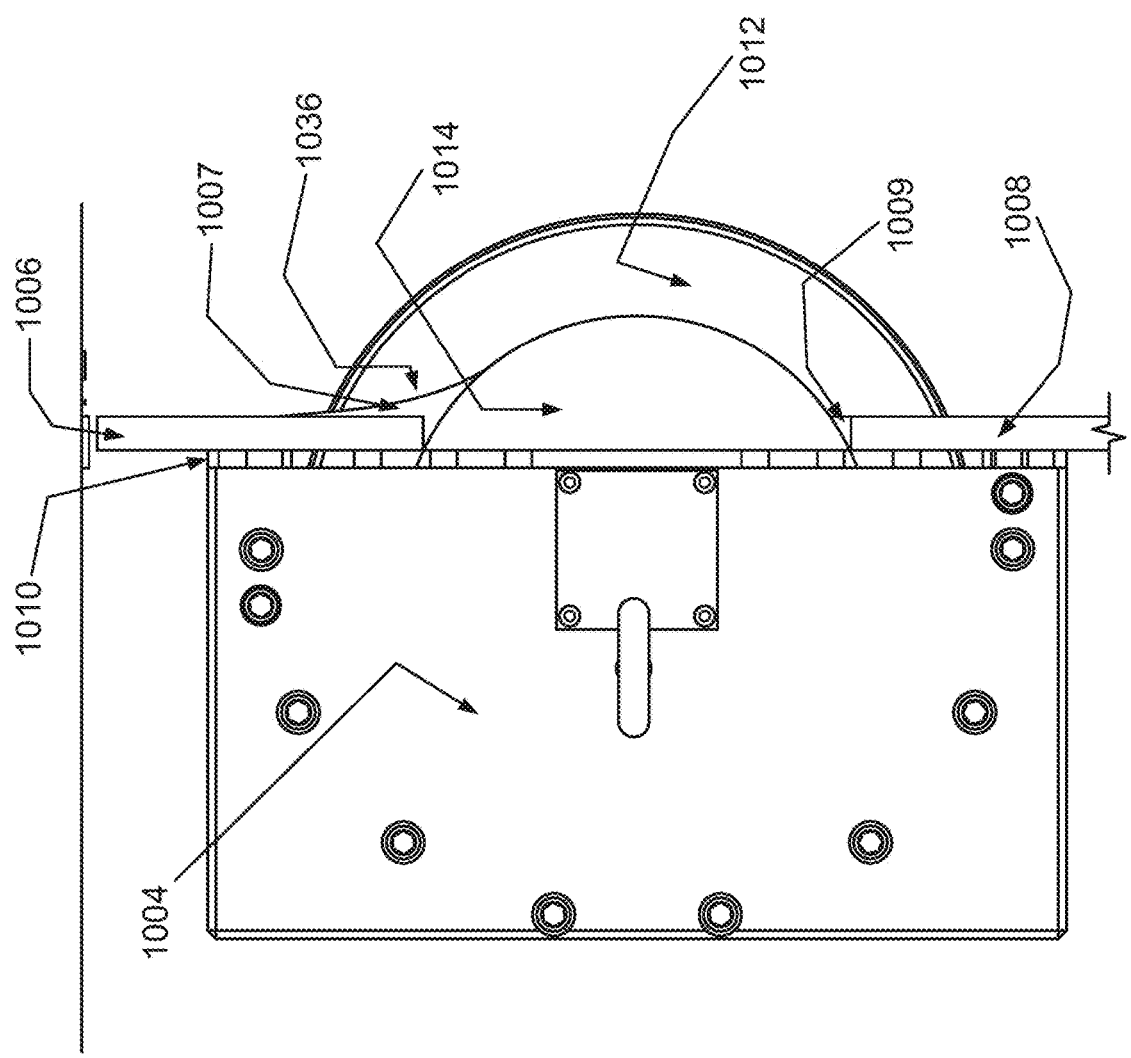
Figure 10D:
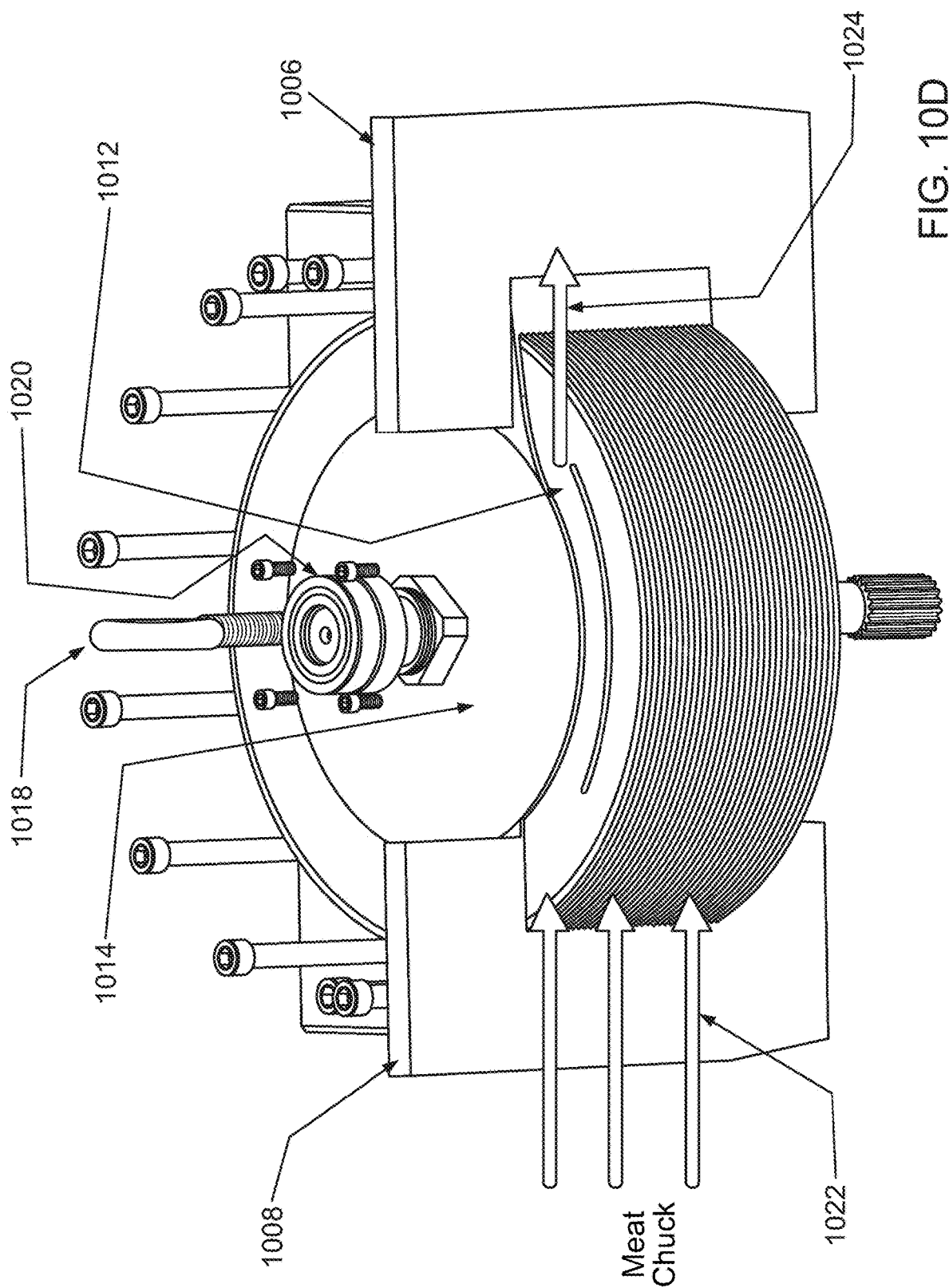
Figure 10F:
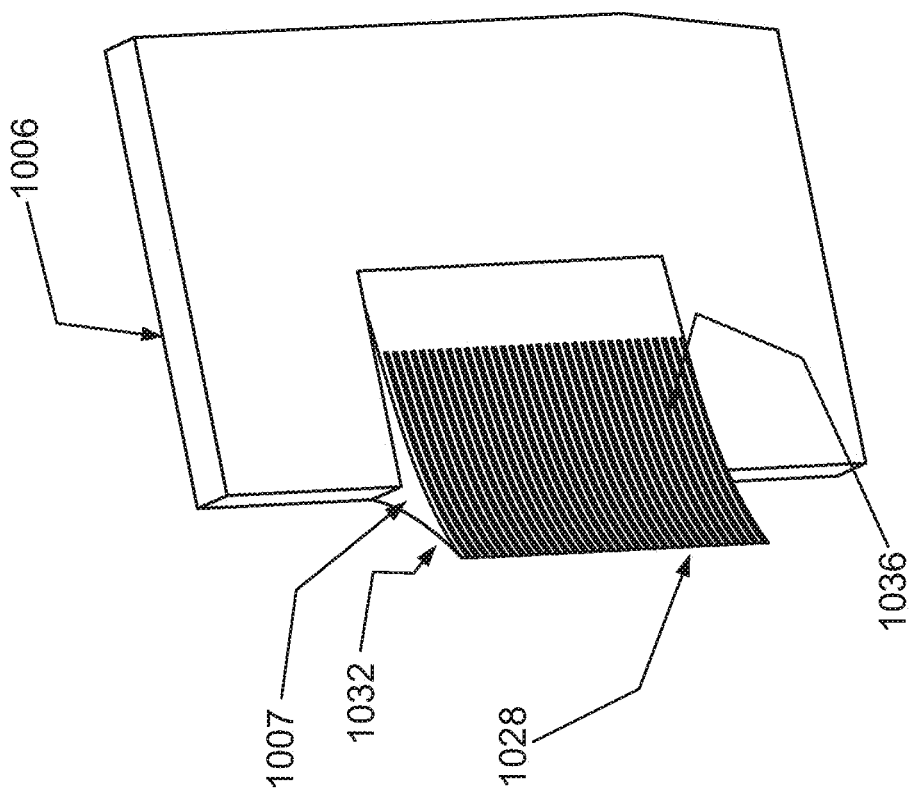
Figure 10E:
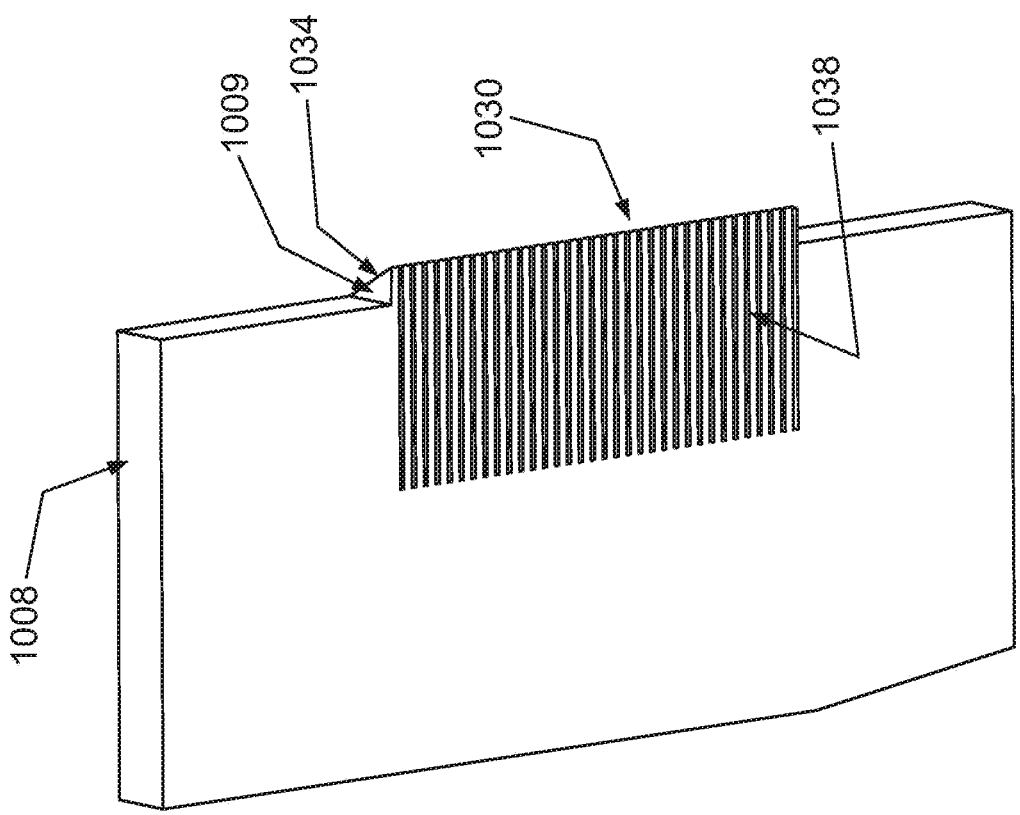
Figure 11C:
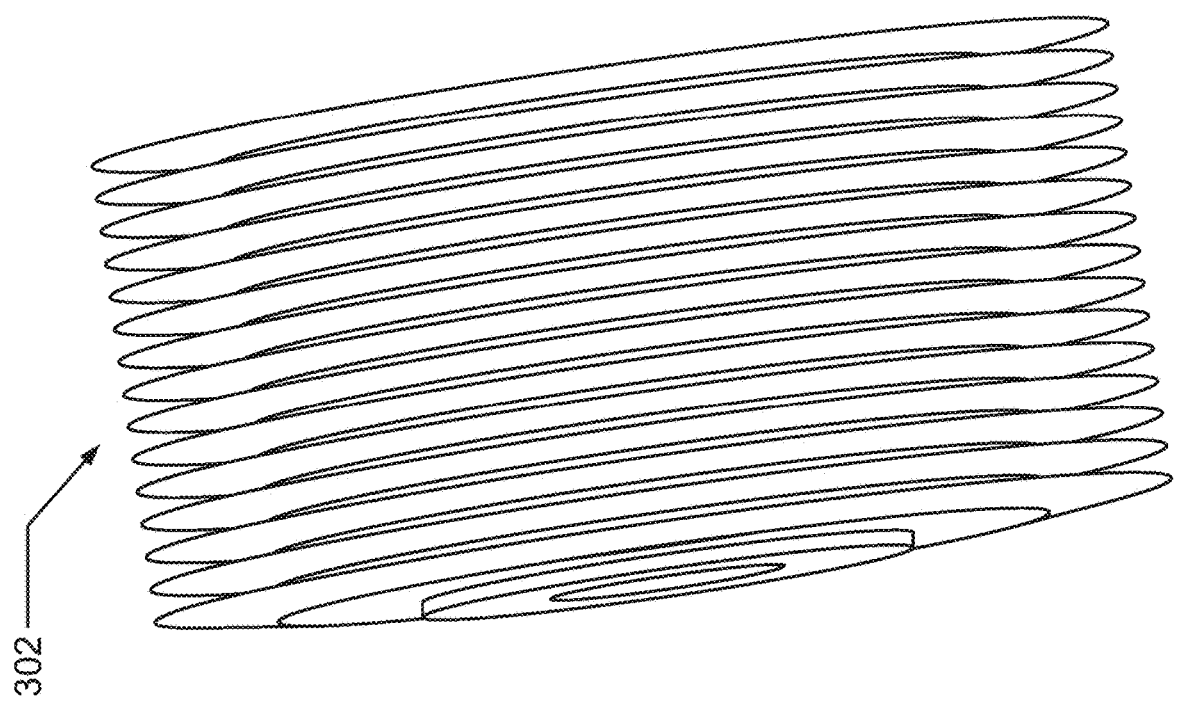

The right anti-deflection member 1006 includes a plurality of teeth 1007. At least one of the teeth extends above the blade stack and below the blade stack (not shown in FIG. 10B or 10C, and at least one of the teeth extends between each circular blade. The left anti deflection member is configured similar to the comb like structure illustrated in FIG. 10A. The teeth-like members 1007 of the right anti-deflection member 1006 has a concave leading edge 1036 that curves inward forming a thin concave leading surface. The teeth-like members gradually widen as they extend towards the center of the blade stack thereby creating a greater surface area to resist deflection. The concave leading edge that curves inward forming a thin concave leading surface as illustrated more evenly distributes product flowing between the blades to reduce pressure build up. The teeth-like members gradually narrow along the direction of the product flow path 1022. The direction of the product flow path is illustrated by arrows 1022. In addition, the teeth-like members resist deflection of the circular blades in the blade stack. In FIG. 10C the mounting bracket 1010 is transparent making visible the blade stack, and the top shim/spacer 1014. FIGS. 10D and 10F illustrate a perspective view of the left (1008) and right (1006) anti-deflection members utilized to reduce the deflection of the circular blades during operation as sliced product flows between the individual circular blades in the stack.

The plurality of teeth-like members 1007 form a comb-like structure 1028 that interlaces with the individual circular blades of the blade stack. The plurality of teeth-like members 1007 and hence the comb-like structure 1028 has a concave facing edge 1036 and a concave rear edge 1032. The plurality of teeth-like members 1009 of the left ant-deflection member 1008, form a comb-like structure 1030 that interlaces with the individual circular blades of the blade stack. The plurality of teeth-like members 1009, and hence the comb-like structure 1030 has a flat face flat edge 1038 and a beveled rear edge 1034. The facing edges 1038 and 1036 facilitate the product flow path as indicated by lines and arrows 1022 and 1024. The axle hub bearing 1020 is also illustrated in FIG. 10D. The circular blade stack assembly illustrated in FIGS. 10B through 10F can be utilized as a product slicer in a manner similar to the blade stack illustrated in FIGS. 4 through 7.

Referring to FIG. 12, an illustration of a bearing member is provided. The blade assembly center shaft 302 includes a blade stack mounting portion 1202 having a keyed flattened side 1204 for receiving the keyed center opening of each blade within the stack. The center shaft 302 includes a motor mount end 1206. Referring to FIG. 13, an illustration of the single blade 802 is provided that mounts over the center shaft 302. The individual blade 802 has a center opening 1302 having a keyed flattened side 1304. The edge of the individual rotary blade also includes a bevel 1306.

Referring to FIGS. 14A through 14C, an illustration of an induction cooking horn is provided. The cooking horn has an upper 1419 and lower 1435 pressure containment panels having the induction cooking horn mounted there between. The containment panels 1419 and 1435 include induction coils. The cooking plates 1437 are position between the containment panels 1419 and 1435. The upper cooking plate is illustrated by item 1443. The entire cooking horn assembly is supported by the platform 1407. This view also illustrated a sheeter nozzle 1439 mounted to the entry end 1441 and portal of the cooking horn. An end view of the exit end is illustrated by FIG. 14C. FIG. 14D illustrates the stud board assembly for mounting the upper and lower containment panels for the cooking horn, including a stud 1445 and boards 1475 and a combination of bolts 1447, 1473, 1477 and washers 1449, and 1471. The boards have a spacing 1477. FIG. 14E illustrates and end view of the entry end 1441 of sheeter nozzle 1439. For one implementation of the technology, the product travels through the induction cooking horn at a rate such that the cooking time within the horn is less than approximately 30 seconds with a yield of over about approximately 80%. The product is cooked using induction heating and the interior cooking plates of the interior channel are about approximately 165 degrees Fahrenheit for a fully cooked product and about approximately 130 degrees Fahrenheit for a partially cooked product. The temperature and the cooking travel times through the horn will vary depending on the animal muscle used and the desired final product.

Figure 14F:
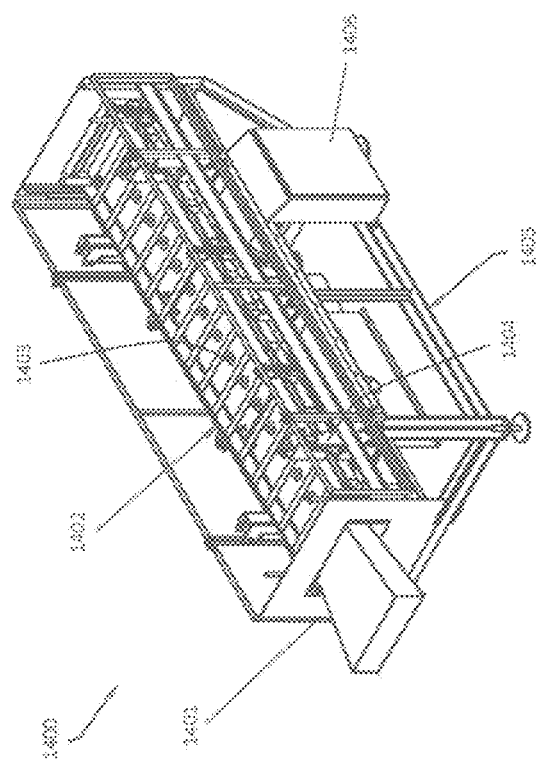
FIG. 14A through 14P are an illustration of an induction coil and reverse taper channel.

Referring to FIGS. 14F through 14P, a cooking horn system 1400 is shown. Referring to FIG. 14F a perspective view illustrating a cooking horn system 1400 is shown. The illustration, as shown, reflects an implementation were a pre-compression nozzle is being used in combination with the pre-compression infeed nozzle 1401 including a compression chamber and outer housing as further described herein. However, for one implementation the pre-compression infeed nozzle 1401 is used without the pre-compression nozzle, where the infeed nozzle 1401 is used with a basic tapered nozzle.

The cooking plate 1402 is mounted in a support frame 1405. The cooking plate has an upper plate and a lower plate as illustrated in FIGS. 14G and 14H. The upper and lower plates are compressed together by compression members 1403 and tension members 1404. The infeed nozzle 1401 is a conduit between and communicably linking the cooking plate and pre compression nozzle. The infeed nozzle 1401 is communicably linked directly to the extrudate channel 1452. Power unit 1406 provides power to the cooking plate 1402.

Referring to FIGS. 14G through 14J, a side isometric exploded view of the of the top 1410 and bottom 1415 portions of the cooking plate 1412 are shown along having an exterior tight fitting housing 1420 and 1433. Spacers 1425 and 1426 are also illustrated as gap spacers between the top 1410 and the bottom 1415 portions of the cooking plate, which can define the height in this configuration (or the cross sectional area) of the channel between the plates 1410 and 1415. The spacer diameters can be increased in height to increase the volume and flow capacity of the channel between the upper and lower plates to increase the flow and thickness (height) of the extrudate that flows there through. Also illustrated in FIGS. 14I and 14J is the bottom plate, which includes compression member mounts 1431 and tension cylinder mounts 1432. The bottom plate also includes alignment pins 1428 and 1429 that insert through alignment eyelets 1421 and 1424 of the top plate. The top plate includes compression member mounts 1423 and tension cylinder mounts 1422 and alignment rods 1414 and 1418. The lower plate has a cooking surface 1427 and the assembly includes a hinge assembly 1430 for a nozzle.

Figure 14K:
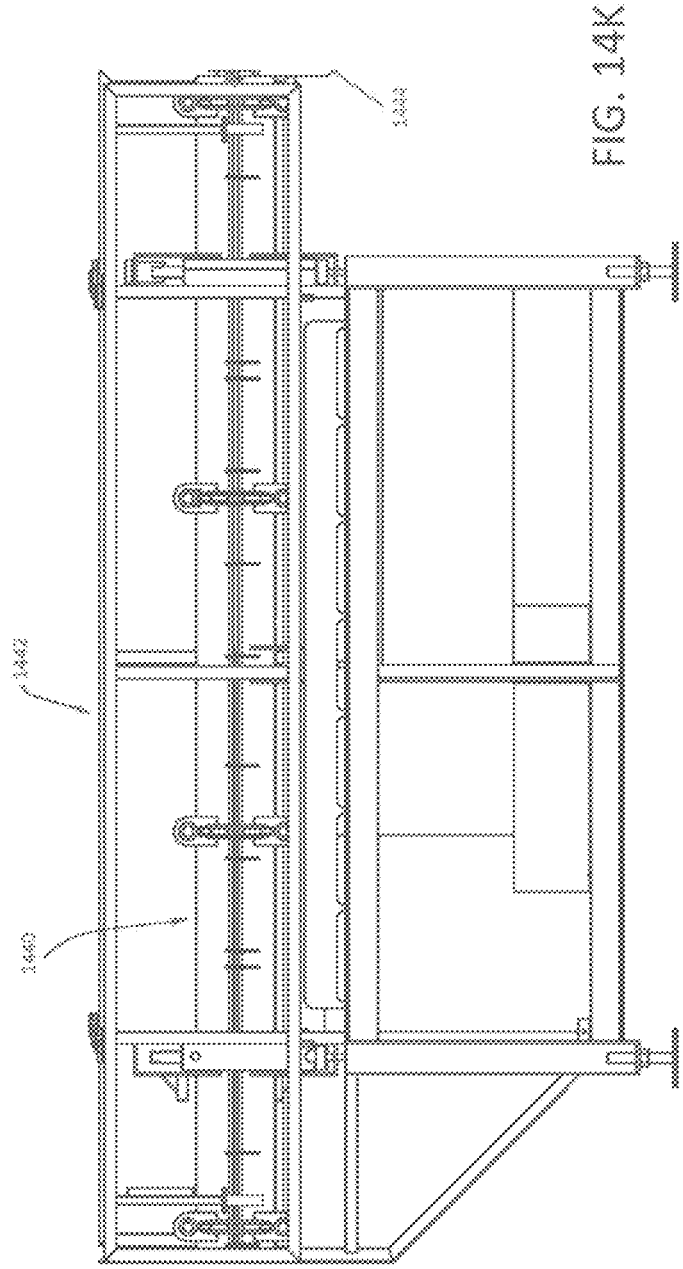

Referring to FIG. 14K, a side view of the cooking plate, upper 1440 and lower 1444, mounted in a frame assembly 1442 is illustrated. Referring to FIGS. 14G and 14H, an isometric view illustrating the top portion 1410 of the cooking plate 1412 is shown. The top plate 1410 includes compression member mounts 1413 and tension cylinder mounts 1411. The bottom plate 1415 includes compression member mounts 1416 and tension cylinder mounts 1417. The bottom plate also includes alignment pins 1428 and 1429 that insert through alignment eyelets of the top plate.

Referring to FIGS. 14L through 14P a side view of another implementation of the cooking plate assembly 1454 is shown. The cooking plate assembly 1454 shown conveys an extrusion. The interior cooking surface 1463, as seen in FIG. 14M, of the interior channel 1457 of the cooking plate assembly 1454 through which the product travels is constructed of a material that provides a non-stick low-friction coefficient surface so that the product as it is extruded through the cooking plate assembly 1454. There are upper 1451 and lower 1453 cooking plates.

The thickness or height (h) 1476 of the entry portal is thin or narrow and having an elongated horizontal width forming a slit like opening having an elongated width and narrow in height to further assist the product as it enters to maintain separation of the original sheet rather than having multiple sheets binding together. The thickness or height of the entry portal also provides a certain product slice thickness. The interior channel 1457 of the cooking plate assembly 1454 through which the product travels can have a graduated widening in thickness from the entry portal 1456 to the exit portal 1450. The upper surface of the interior channel and the lower surface 1463 of the interior channel are proximately spaced apart and slope outwardly one with respect to the other, thereby having a graduated widening in thickness or height from the entry portal 1456 to the exit portal 1450. The widening thickness or spacing could result in a reduced pressure; however, this is counteracted by the increased pressure under which the product is being pumped through the interior channel 1457, and the non-stick, low-resistance surface 1463 of the interior channel. In one implementation, the widening of the interior channel can reduce pressure.

For one implementation, the interior cooking surfaces of the interior channel are heated by induction heating. The cooking plate utilizes electrically conducting coils that generate eddy currents that cause the conductive plates to heat up. Induction heating is a non-contact method of heating a conductive body (i.e. plates) by utilizing a strong magnetic field from the specially designed coils. The coils do not contact the conductive plates. The conductive plates heat up responsive to its proximity to the strong magnetic field. The heated plates contact and heat up the meat. The advantage of an inductive heating system and method is that the heating temperature of the plates can reach a very high temperature (approximately 500 degrees F.) ins a short period of time and the surface temperature of the plates can be controlled by adjusting the power output to the coils. An induction heater consists of an electromagnet, and an electronic oscillator that passes a high-frequency alternating current (AC) through the electromagnet. The rapidly alternating magnetic field penetrates the object, generating electric currents inside a conductor called eddy currents. The eddy currents flowing through the resistance of the material heat it by Joule heating. In ferromagnetic (and ferromagnetic materials like iron, heat may also be generated by magnetic hysteresis losses. The frequency of current used depends on the object size, material type, coupling (between the work coil and the object to be heated) and the penetration depth. An important feature of the induction heating process is that the heat is generated inside the object itself, instead of by an external heat source via heat conduction. Therefore, objects can be heated very rapidly. In addition, there need not be any external contact.

Therefore, the interior cooking surface 1463 of the cooking plate as disclosed and claimed herein can be heated by induction heating. Induction cooking is quite efficient, which means it puts less waste heat into the surrounding assembly. Induction heating can be quickly turned on and off, and is easily controlled for heating level. Induction cooking provides faster heating, improved thermal efficiency, and more consistent heating than cooking by thermal conduction, with more precise control over the heat provided. Therefore, the heat applied by the interior cooking surface to the product can be more precisely controlled. FIG. 14M provides an illustration of a lower cooking plate 1462 and the upper cooking plate 1455 is seen in FIG. 14L. A spacer or lateral seal 1452 defines the spacing between the upper cooking plate 1455 and the lower cooking plate 1462 and provides a side seal between the upper and lower and defines the side wall 1460 of the cooking channel 1457. The exit end 1461 of the spacer 1452 is thicker than the entry end 1466 of the spacer 1452. Similarly, the exit end 1459 of the opposing spacer is thicker than the entry end 1469 of the opposing spacer.

Referring to FIG. 14M, a side isometric view of the lower cooking plate 1462 is illustrated. FIG. 14O illustrates the spacer or lateral seal, which defines the height (h) 1476 of the cooking channel 1457. FIG. 14N provides a detail of the spacer between the upper and lower plates and how the spacer fits in the lengthwise grooves 1470 and 1472 of the upper and lower plates thereby forming a seal between the plates. The spacers have lengthwise flanges 1467 and 1468, or lengthwise ridges that extend along the length of the spacers along the inner edge 1474 of the spacer and the flanges extend into the length wise grooves to form a seal. The exit end 1458 of the ridge is thicker than the entry end 1468 of the ridge. The inner side wall 1462 of the spacers form the sidewall of the interior channel 1457. The top surface 1465 of the spacer abuts against the upper cooking plate.

Referring to back to FIGS. 14L through 14O, an isometric view of the cooking plate assembly 1454 is shown. An isometric view of a cooking plate housing is illustrated. The cooking plate housing includes and upper elongated plate 1451 and a lower elongated plate 1562 where the upper and lower elongated plates are proximately spaced apart. The distance or spacing between the upper and lower plates gradually increases from the entry end 1456 to the exit end 1450. The upper and lower plates and the lateral spacer gaskets 1452 define an interior channel 1457 that extends from an entry portal or entry opening 1456 to an exit portal or exit opening 1450. The lateral spacer gaskets 1452 can have a wedge shaped geometry in order to provide the graduated spacing. The thickness or height (h) 1476 at the entry portal, defined by the spacing between the upper and lower plates, can be thin or narrow to further assist the product as it exits to separate into smaller pieces. The interior channel 1457 of the cooking plate assembly 1454 through which the product travels can have a graduated widening in thickness from the entry portal to the exit portal. The exit portal has a thin slit or slot like cross section where the width is more than five times the length of the height.

The graduated spacing between the upper and lower cooking plates are such that spacing between the plates gradually increases from the entry portal to the exit portal such that for one implementation the ratio of the height between the exit portal and the entry portal is such that the entry height is about approximately 10-25% of the exit height. The distance between the two plates at the exit portal (height of the exit portal) is dependent on the thickness of the slice product being extruded through the horn, e.g. if the sliced meat has a thickness of 2 mm, the height of the entry portal is approximately 2 mm. Therefore, the entry portal has a height such that the product as it enters maintains separation of the original pieces and doesn't cling together or overlap as they are being extruded through the cooking horn. If the entry portal has a height that is much less than the product slice thickness, then the pressure would build up for the inlet stream and within the cooking horn.

The upper and lower plates have upper and lower interior surfaces, which contact the product as the product flows through the interior channel 1457. The upper surface of the interior channel and the lower surface of the interior channel slope outwardly one with respect to the other, thereby the channel having a graduated widening in thickness or height from the entry portal to the exit portal. The upper plate's upper surface (not shown) is essentially the mirror image of the lower plate's lower surface 1463. The widening thickness could result in a decreased pressure; however, this is counteracted by the increase pressure under which the product is being pumped and/or increasing the flow speed of the product through the interior channel; and the non-stick, low-resistance surface (low-friction) of the upper and lower surfaces of the interior channel will also counteract the reduce pressure.

The spacing between the upper plated and the lower plate is defined by the elongated spacer gaskets or spacers 1452 and 1458, which have a graduated thickness that increases gradually along the length of the elongated spacer gasket from a proximal end 1456 to a distal end 1450. FIG. 14M illustrates the interior channel 1457 and the lengthwise graduation in thickness of the lateral spacer gaskets 1452 and 1458. The elongated lateral spacer gaskets have lengthwise upper and lower ridges 1464 and 1467 that protrude from the upper surface 1465 and lower surface, not shown, of the spacer gaskets respectively; and the upper and lower ridges extend along interior side upper and lower edges, respectively, of the spacer gaskets. The upper and lower ridges of the spacer gaskets project into and fit within an upper elongated lengthwise groove in the upper plate and a lower elongated lengthwise grooves in the lower and upper plates respectively (note: the opposing side illustrates the upper plate and lower plate having the upper and lower elongated lengthwise grooves, 1470 and 1472, which are a mirror image), thereby forming an interlocking seal between the spacer gasket and the upper and lower plates.

The interior surfaces of the upper and lower plates are cooking surfaces of the interior channel and are heated by induction heating. The upper plate's upper surface (not shown) is essentially the mirror image of the lower plate's lower surface 1463. An important feature of the induction heating process is that the heat is generated inside the object itself, instead of by an external heat source via heat conduction. Therefore, objects can be heated very rapidly. In addition, there need not be any external contact between the induction element and the interior cooking surface. The interior cooking surface of the interior channel of the cooking plate through which the product travels is constructed of a material that provides a non-stick low-resistance (low-friction) surface so that the product as it is extruded through the cooking plate is conveyed through at a faster rate such that the product doesn't back up, thereby assisting the product to not form a continuous mass or sheet.

The implementation as illustrated in FIG. 14 is configured to prevent the product from cooking together as it travels through the horn. As product progresses through horn the cross section of the horn is gradually changing (the height or thickness is gradually becoming larger) and the velocity of the product traveling through the horn changes and creates the desired extrusion. The objective is to produce a thin loose open layer of the extrudate, whereby there are spaces or openings between the pieces. The is accomplished by lessened pressure in horn, intensive heat using inductive heating rather than steam or conductive heat, and a coated cooking plate to reduce friction and sticking. With the implementation illustrated in FIG. 14, the product is cooked down significantly such that the weight of the product may be decreased by as much as 70% from the input weight of the product. The induction heating coil is mounted on top and bottom of horn assembly, where the horn is sandwiched by the two coils. The coil is connected to a high-frequency power supply causing the coil to generate a magnetic field and the metal based horn is within the magnetic field being generated whereby eddy currents are generated in the horn and the horn tries to resist the field whereby the cooking plate gets very hot in a very short period of time. Induction generators can work in a frequency range from 100 kHz up to 10 MHz. More commonly, heating devices with induction heating control have a frequency range of 100 Hz to 200 kHz. The frequency chosen is based on the heating plate material properties and thickness.

Also, as discussed, there is a coating on the interior surface of the cooking plate to reduce friction and aid in sanitation. The heat transfer coefficient is improved over other implementations. The intake diameter of the input pipe feeding the horn should be appropriately sized in combination with the force of the pump to reduce pressure. The distance between the cooking plates and the angle of the taper will depend on the type of the product is being processed and the flow rate. The representative types of product being processed by this configuration can include sliced whole muscle such as beef muscle or poultry muscle. The cooking plate assembly can have an exterior non-conductive plate covering the coils.

Referring to FIG. 14P, one implementation of an interface 1481 of an elongated lateral spacer gasket 1499 interfacing with one side of a cooking horn 1485 bottom plate is shown. The lateral spacer gasket 1499 is illustrated with an elongated raised rib 1483, which is used to create a seal between a top and a bottom cooking horn plate. The spacer gasket 1499 is thicker at the exit end thereby creating a thicker side wall 1483 as compared to the thinner side wall 1487 at the entry end, which increases the height of the flow channel at the exit end side wall 1483 and the height of the exit portal as opposed to the lesser height of the flow channel at the entry end side wall 1487 and of the entry portal. The thickness of the elongated lateral gasket is tapered or graduated to gradually increase in thickness from the entry end 1487 to the exit end 1483. Therefore, as product flows through the flow channel 1491 along the flow path 1493, the pressure lessens due to the gradual increase in height of the flow channel 1491. In addition, for the implementation illustrated in FIG. 14P, the lateral gasket is wider 1497 at the entry end to thereby create a lesser width of the flow channel at the entry end and of the entry portal as compared to the lesser width 1495 of the lateral gasket at the exit end such that the width of the flow channel and of the exit portal is wider than that of the width of the flow channel and entry portal at the entry end.

Figure 15A:
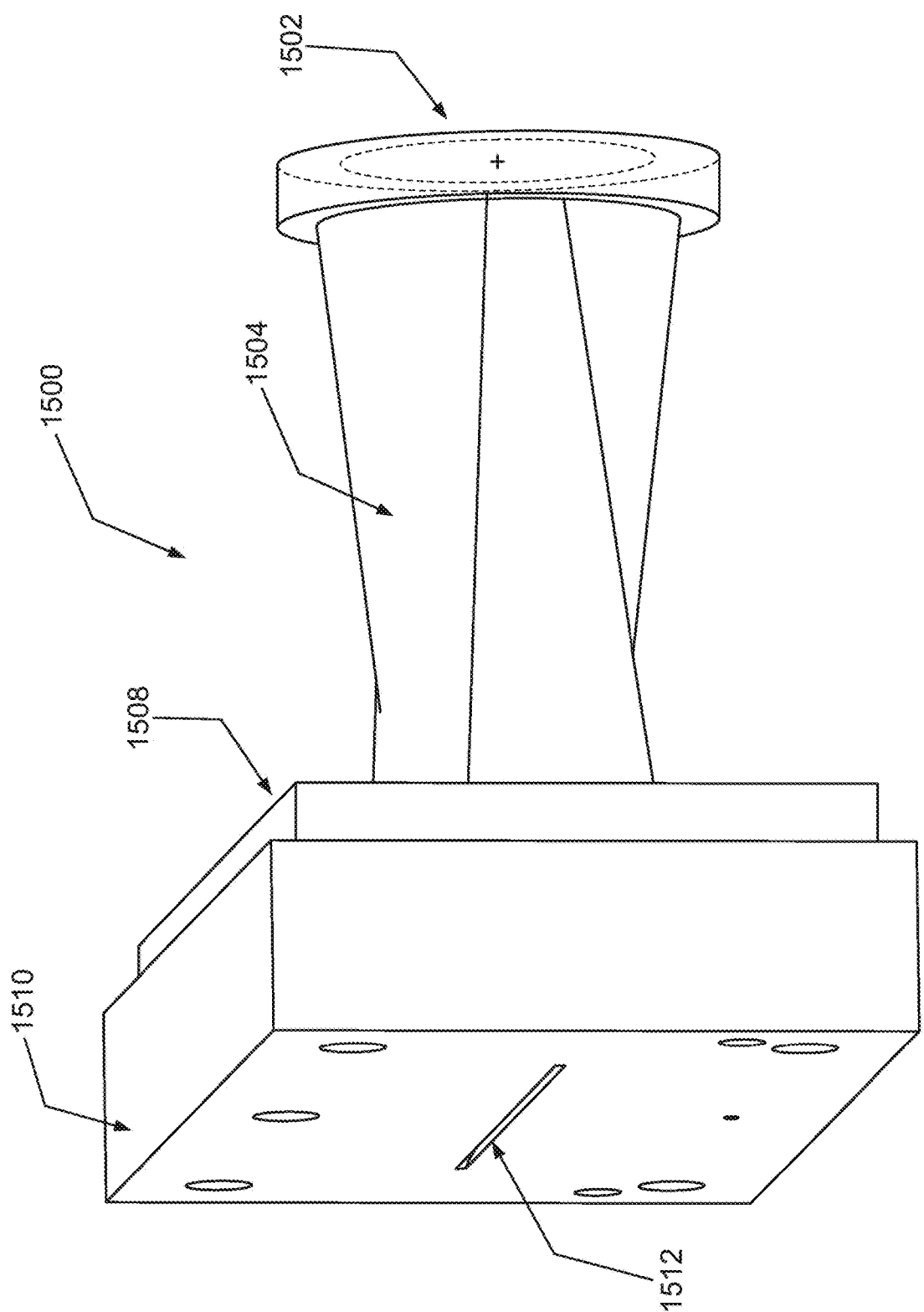
FIGS. 15A through 15C are an illustration the sheeter.
Figure 15B:
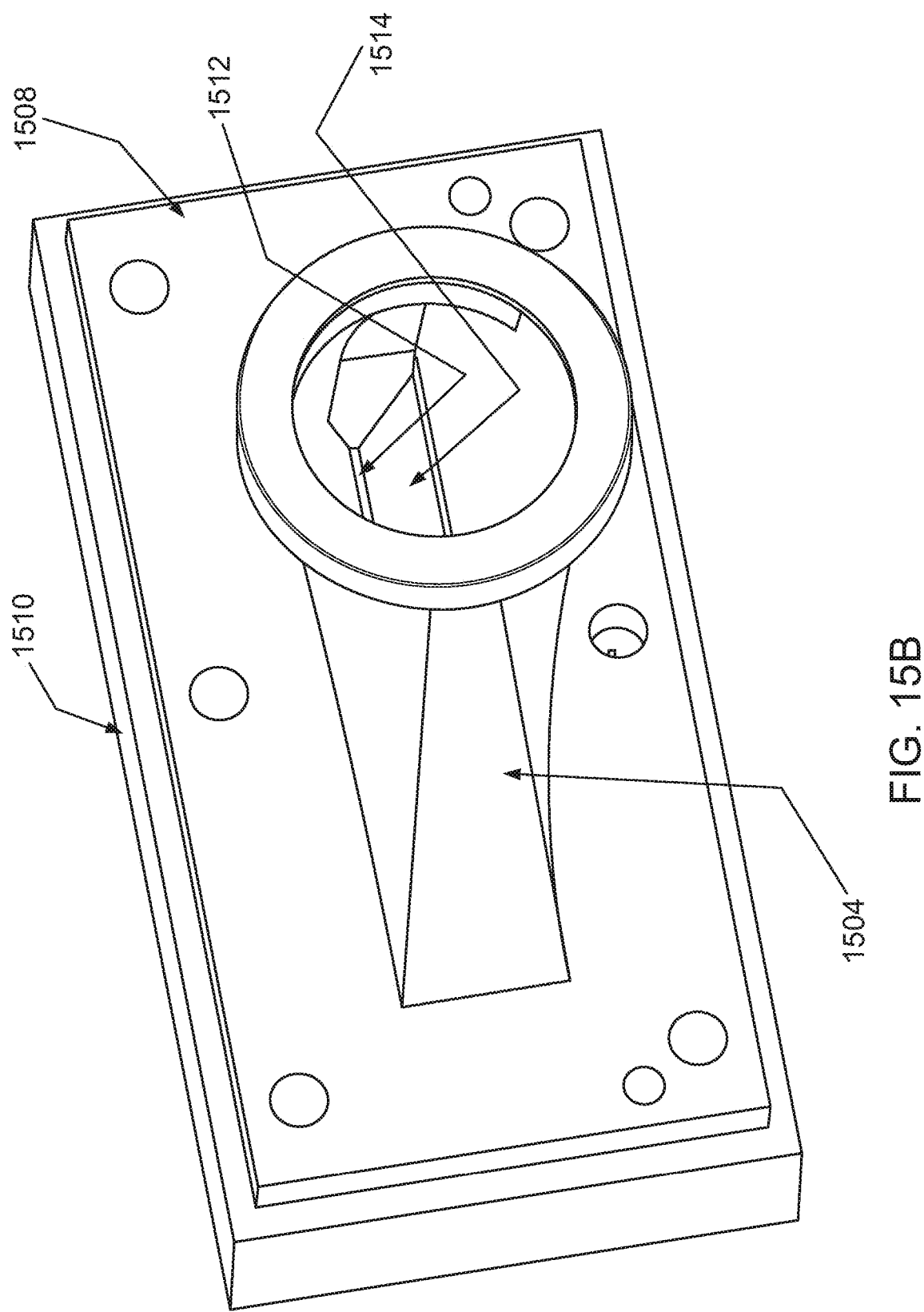
Figure 15C:
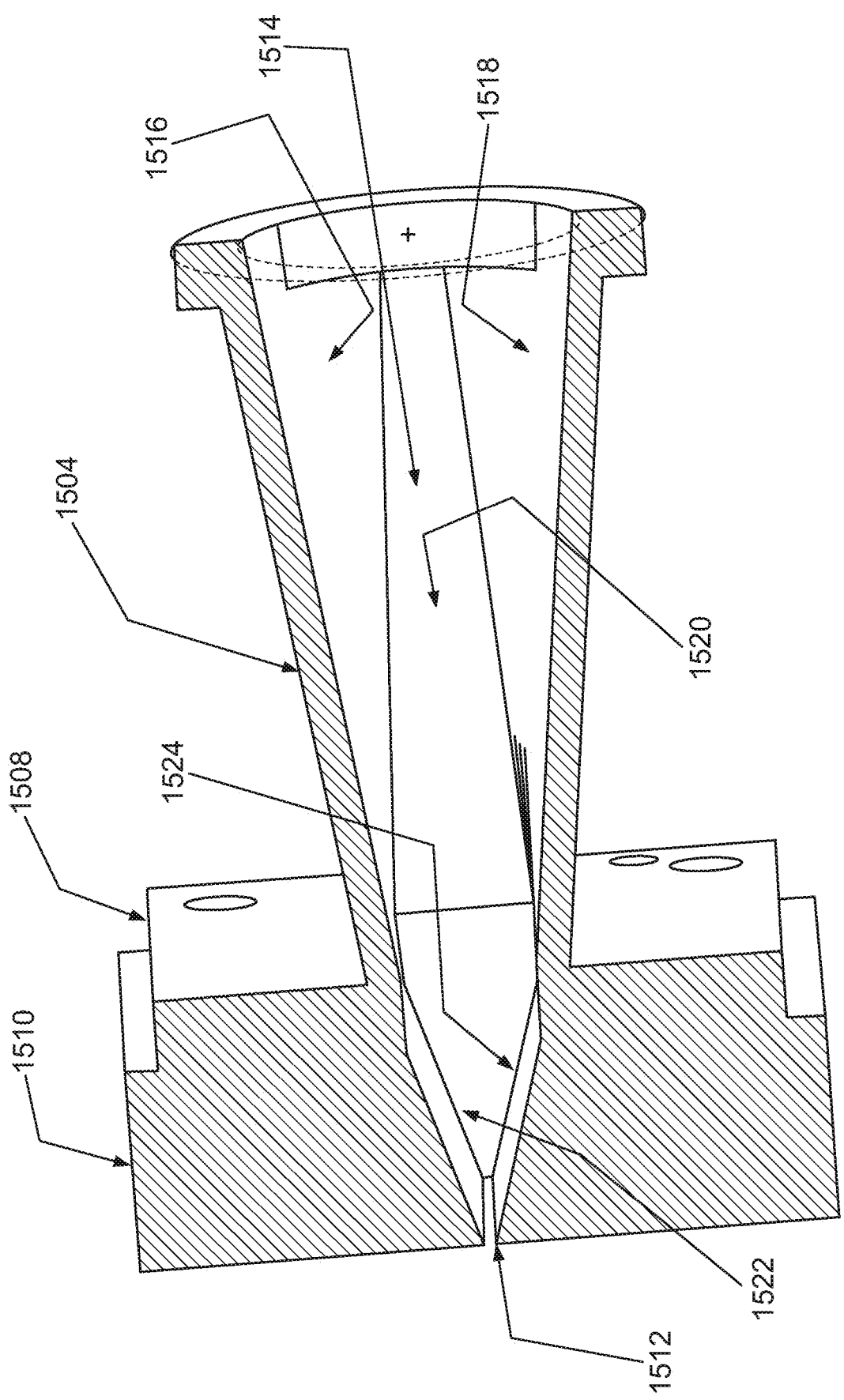

Referring to FIGS. 15A through 15C, an illustration of the sheeter 1500 is provided. One purpose of the sheeter is separation of stacked slice meat exiting from the cutter to a single slice layer in order to readily feed into the cooking horn. The sheeter 1500 includes and entry portal 1502 for receiving the product. The product travels within an interior channel of the sheeter body 1504. The sheeter is mounted includes a mounting flange 1508 that is mounted to a sheeter exit block 1510 having a narrow slit exit opening 1512. The sheeter includes an interior channel 1514 through which the product enters. The interior channel 1514 is defined by upper 1516 and lower 1518 interior side walls and lateral side wall 1520 and the opposing complementary side wall. The distance between the upper and lower side walls and the distance between the lateral side walls progressively decreases in the direction of travel of the product. The sheeter exit block has a narrowing interior channel defined by an upper 1522 and lower 1524 interior walls whose distance there between progressively decreases in the direction of the travel of the product. The channel narrows to its most narrow point at the narrow slit exit opening 1512.

Referring to FIGS. 16A through 16D an illustration of the dual stack rotary blade system is provided. For one implementation of the technology as disclosed and claimed herein, the rotary blade assembly includes dual stacked rotary blades. Rather than one stack of rotary blade, the assembly includes two adjacent stacks to handle an increased flow. The infeed port is offset in order to properly channel the product toward the cutting area for the dual stacked rotary blades. The dual stack system can receive a larger grind than the single stack system. The dimensions shown are only illustrative of one implementation where the spacing between the blades are 2 mm and are not intended to be limiting in effect.

Figure 16D:
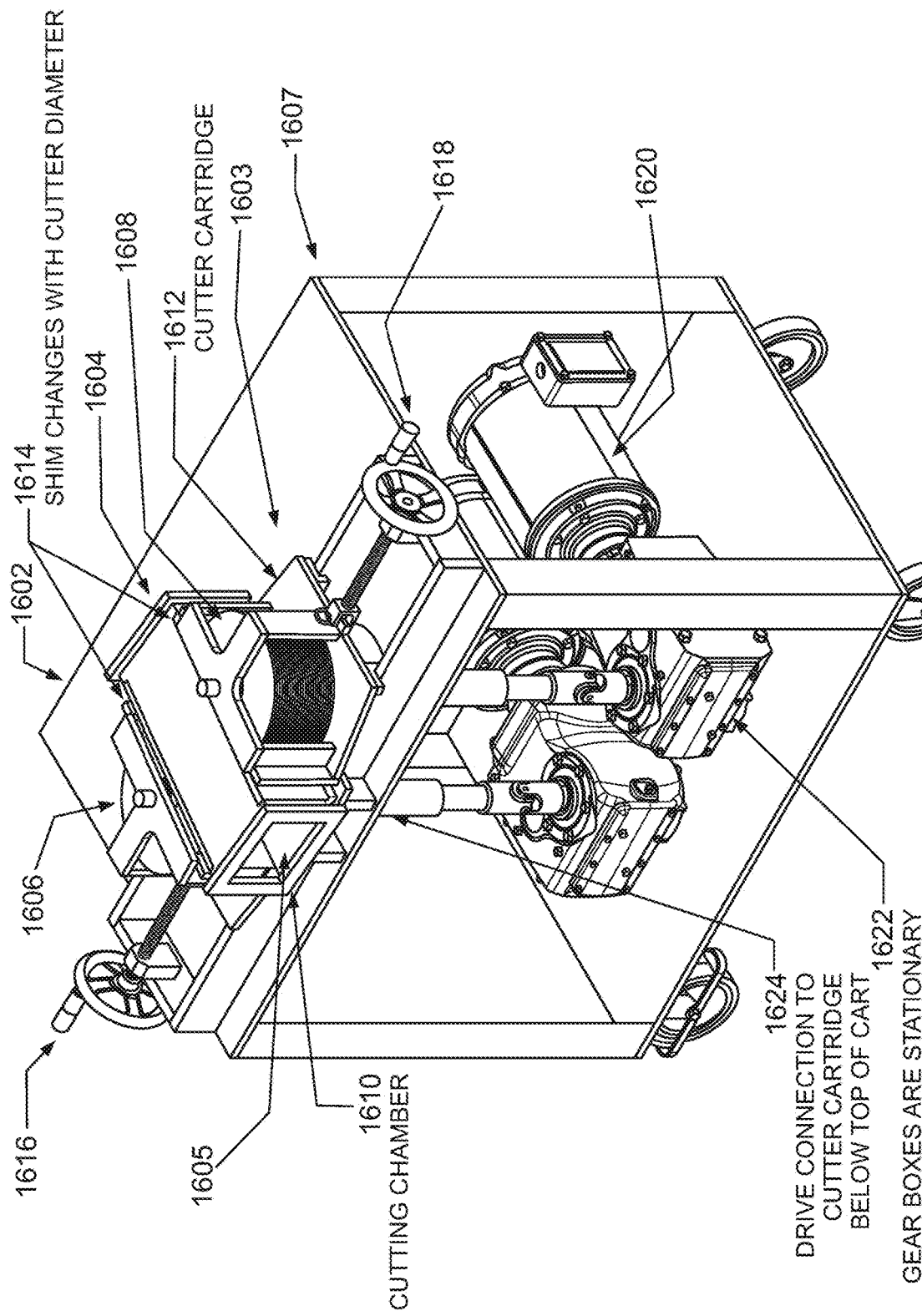
Figure 16H:
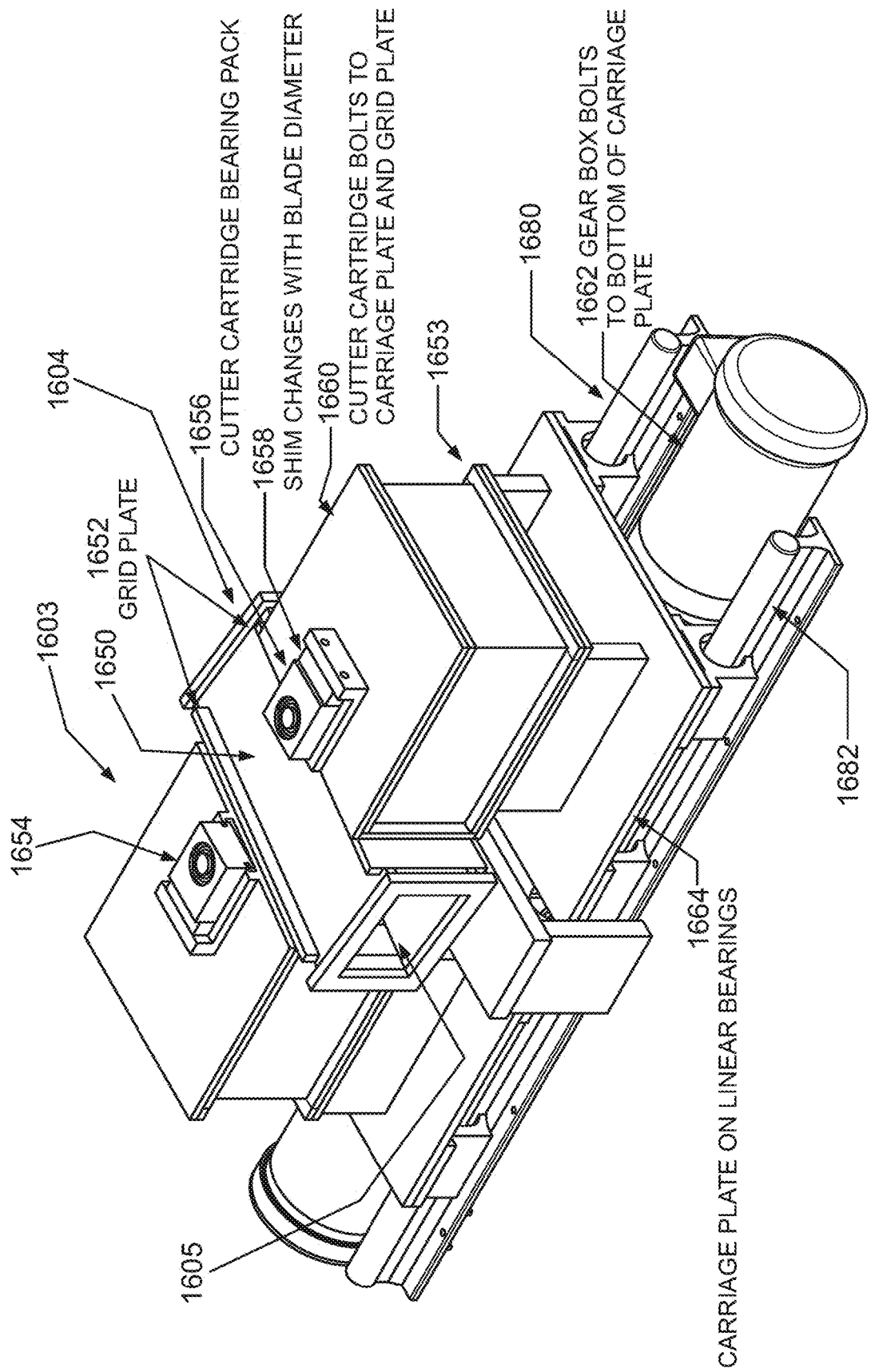

Referring to FIGS. 16E through 16K, various illustrations of a dual rotary blade system is provided. The dual rotary blade assembly 1602 is illustrated including a dual rotary blade system 1603 mounted on a frame 1607. The illustration provide in FIG. 16D shows a view were the outer housings removed that surround the left rotary blade stack 1608 and the right rotary blade stack 1606. The overlap of the blade stack diameters can be adjusted using a shim 1614 or other mechanism. The left rotary blade stack cartridge is illustrated with the outer housing removed and the lower plate 1612 is shown. Left and Right 1618 and 1616 lateral adjustment screw jacks are illustrated for laterally adjusting the position of the dual rotary blade system. Product to be slice can enter through the entry portal 1604 of the rotary blade system 1603 and the product exits through the exit portal 1605 after it has traveled through the cutting chamber 1610 passed the rotary blade stacks 1606 and 1608. The rotary blades system is shown being powered by a pair of motors 1620 and a pair of gear boxes 1622, which drive the drive connection 1624 to the cutter cartridge and the rotary blade stacks. FIG. 16E illustrates a top plan view of the dual rotary blade assembly and the lateral adjustment screw jacks 1616 and 1618 are further illustrated. A sectional view A-A is illustrated in FIG. 16F and a side elevation view of the dual rotary blade assembly is shown in FIG. 16G. The drive connection 1624 is illustrated including a lower universal joint 1642, a spring support top drive shaft assembly 1640, an involute spline shaft 1638, a splined nut assembly 1636, an upper universal joint 1634, a shaft connection with a HEX pocket 1632 attached to an upper U-joint attaching to a HEX shaft that extends from the cutter cartridge 1630. The sectional view reveals the overlapping rotary cutter blade stacks and the interior cutter chamber 1626. FIG. 16G further illustrates the entry portal 1604 of the rotary blade system 1627 and exit portal 1605 of the rotary blade portal.

Referring to FIGS. 16H through 16K, various views of the dual rotary blade system 1603 is shown. The cutter cartridge 1660 is illustrated with an outer housing. The cutter cartridge 1660 is mounted to the grid plates 1652 and is mounted on a platform 1653 that is mounted to the carriage plate 1664. The entry portal 1604 and the exit portal 1605 are further illustrated. The cutter cartridge bearing packs 1656 and 1654 are also illustrated having a shem 1658 that changes with the blade diameter and a shaft 1657 is illustrated about which the rotary blade stacks rotate. A drive shaft is located in the area indicated by item 1668, but is not shown. For one implementation of the technology as disclosed and claimed herein, the rotary blade assembly includes dual stacked rotary blades. Rather than one stack of rotary blades, the assembly includes two adjacent stacks to handle an increased flow. The infeed or entry port is laterally offset with respect to the exit port in order to properly channel the product toward the cutting area for the dual stacked rotary blades. The dual stack system can receive a larger grind than the single stack system. A shim 1658 can also be utilized to laterally adjust the rotary blade stacks. The cutter chamber 1650 includes an interior channel that extends from the entry portal 1604 to the exit portal 1605. The gear box 1662 is shown mounted to the bottom of the carriage plate 1664 which is mounted on the linear bearings. Referring to FIG. 16I, a top plan view of the rotary blade system is shown. The top view further illustrates the cutter cartridge 1660, the slicing chamber 1672 and the grid plates 1652. FIGS. 16J and 16K, illustrate sectional views of the rotary cutter blade system. The position of the grid plate 1652 is further illustrated. The gear box 1662 mounts on the bottom of the carriage 1664. The cutter cartridge 1660 mounts to the carriage 1661. The gear box is mounted 1662 to the bottom of the carriage 1661. The cutter cartridge mounts to the grid plate. The connection between the cutter shaft and the rotary blade stack is above the carriage plate 1664. Linear bearing tracks 1680 and 1682 allow the rotary cutter system to traverse laterally along the linear bearing tracks for lateral adjustment. Sectional view A-A illustrated in FIG. 16K illustrates the interior cutter chamber 1626 through which the product travels. Sectional view B-B illustrated in FIG. 16J illustrates a sectional B-B elevation. The aft and forward linear bearing tracks 1680 and 1682 align the cutter system to move laterally for alignment purposes.

Figure 17A:
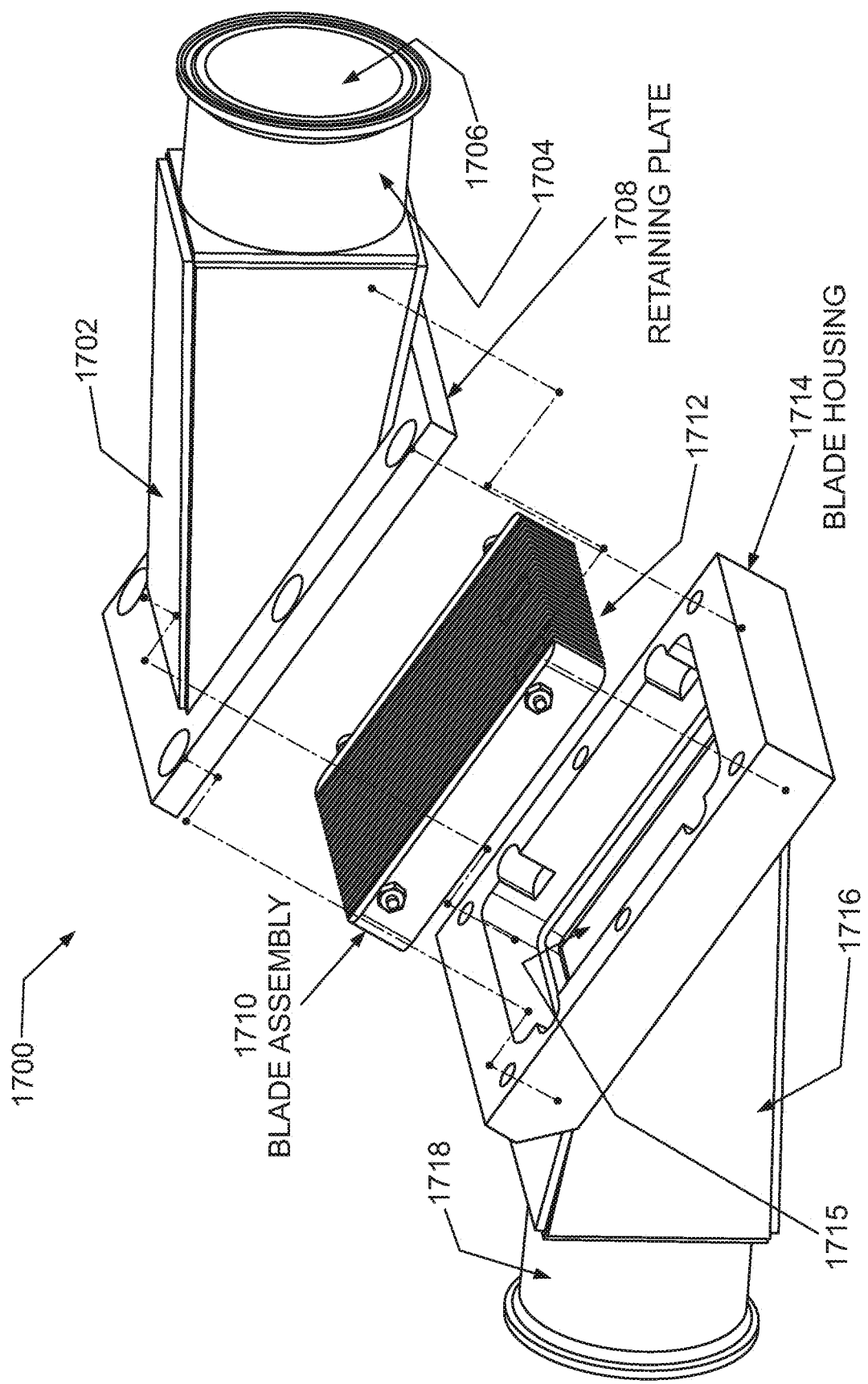
FIGS. 17A through 17D are an illustration of a razor slicer.
Figure 17B:
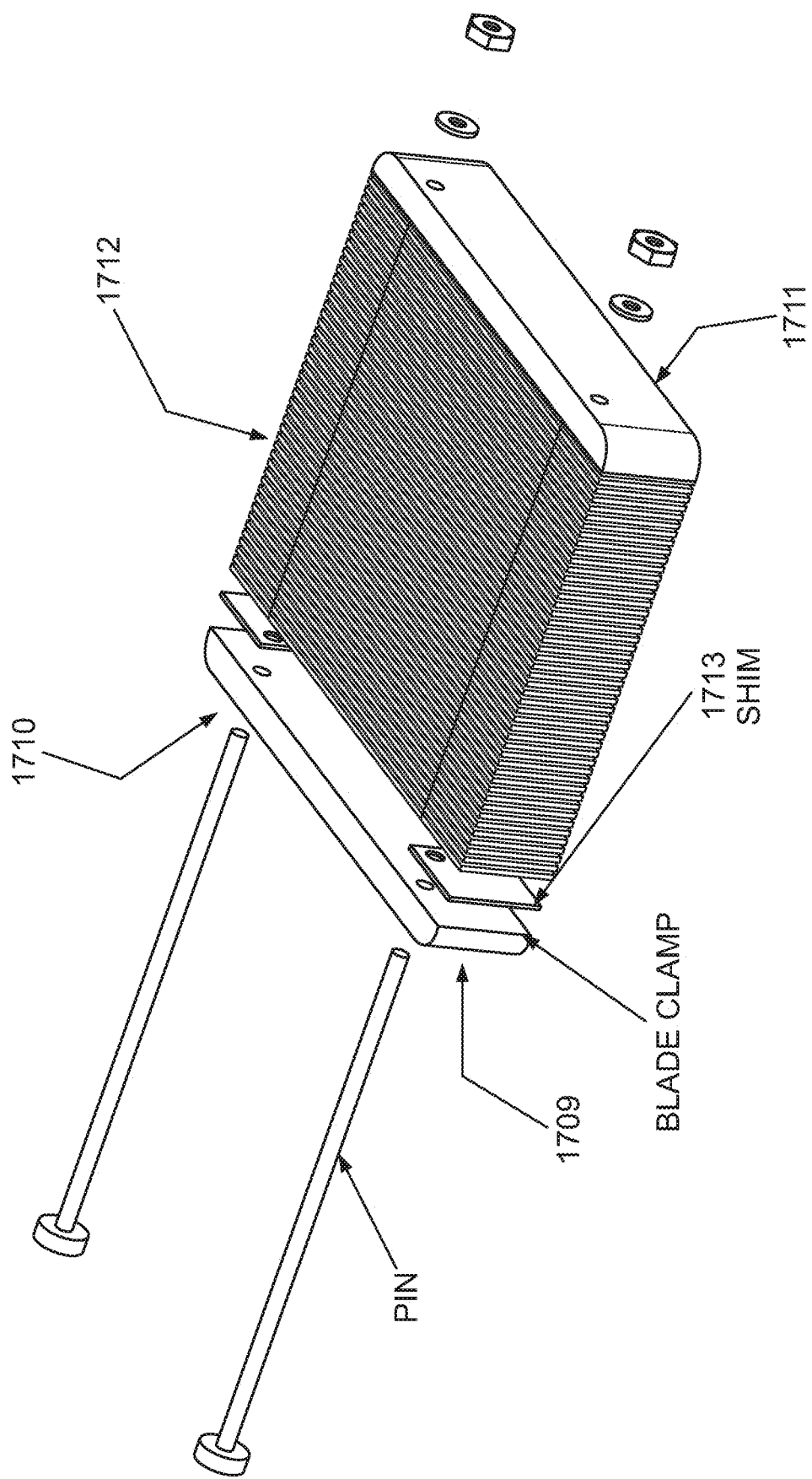
Figure 17C:
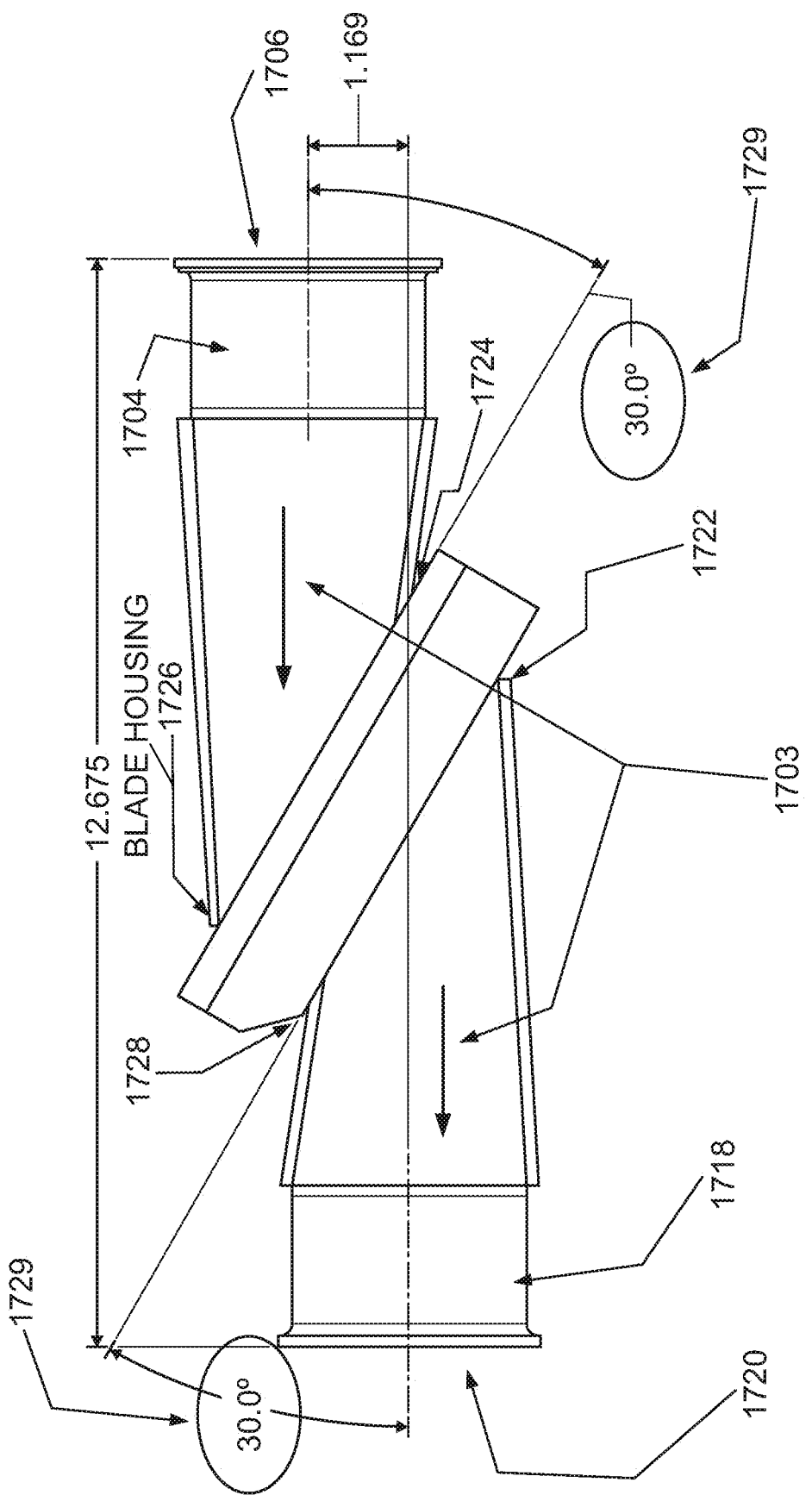

Referring to FIGS. 17A through 17C, an illustration of a razor slicer 1700 is provided. For one implementation of a whole muscle slicing system, a razor slicer 1700 as shown is utilized in lieu of the various rotary slicer implementations described herein. The razor slicer 1700 includes an upstream main body 1702 that is upstream with respect to a blade assembly 1710 along a flow direction 1703 and a downstream main body 1716 that is downstream with respect to the blade assembly 1710 along the flow direction 1703. The blade assembly 1710 is disposed along the flow direction 1703 positioned between the upstream main body and the downstream main body. The blade assembly housing 1714 houses the blade assembly 1710 and a blade assembly retaining plate retains the blade assembly 1710 within the blade assembly housing 1714. For one implementation, the blade assembly 1710 includes a series of flattened substantially rectangular razors that are stacked 1712 with the flattened surfaces positioned substantially parallel and side-by-side with a space between each adjacent blade and each blade having a sharpened edge facing upstream with respect to the flow direction. The blade stack 1712 is retained between two opposing blade clamps 1709 and 1711. For one implementation, the space between each adjacent flattened blade is defined by a flattened shim 1713.

The blade assembly 1710, the retaining plate 1708 and the blade housing 1714 are mounted between the upstream main body 1702 and the downstream main body 1716. The blade housing 1714, includes an open ended through channel 1715 thereby providing a flow path through the blade housing along the flow direction. The blade assembly is housed in the through channel 1715 and oriented with the series of adjacent blade edges facing upstream with respect to the flow direction. The retaining plate includes a similar through channel in this case an opening through which product can flow into the through channel 1715 and engage the blade assembly. The upstream main body 1702 is mounted to the retaining plate 1708 and includes an upstream channel interior to the upstream main body, which is communicable with the opening in the retaining plate such that product can flow through the upstream channel, through the opening in the retaining plate 1708 and through the open ended channel 1715 in order to engage the razor stack. For one implementation of the razor slicer, each of the blade housing, the series of sharpened edges of the blade assembly, and the retaining plate, are oriented at an approximately 30-degree angle 1729 with respect to the flow direction. The angle 1729 with respect to the flow direction for each of the elements can vary depending on the product flowing through the assembly.

Figure 17D:
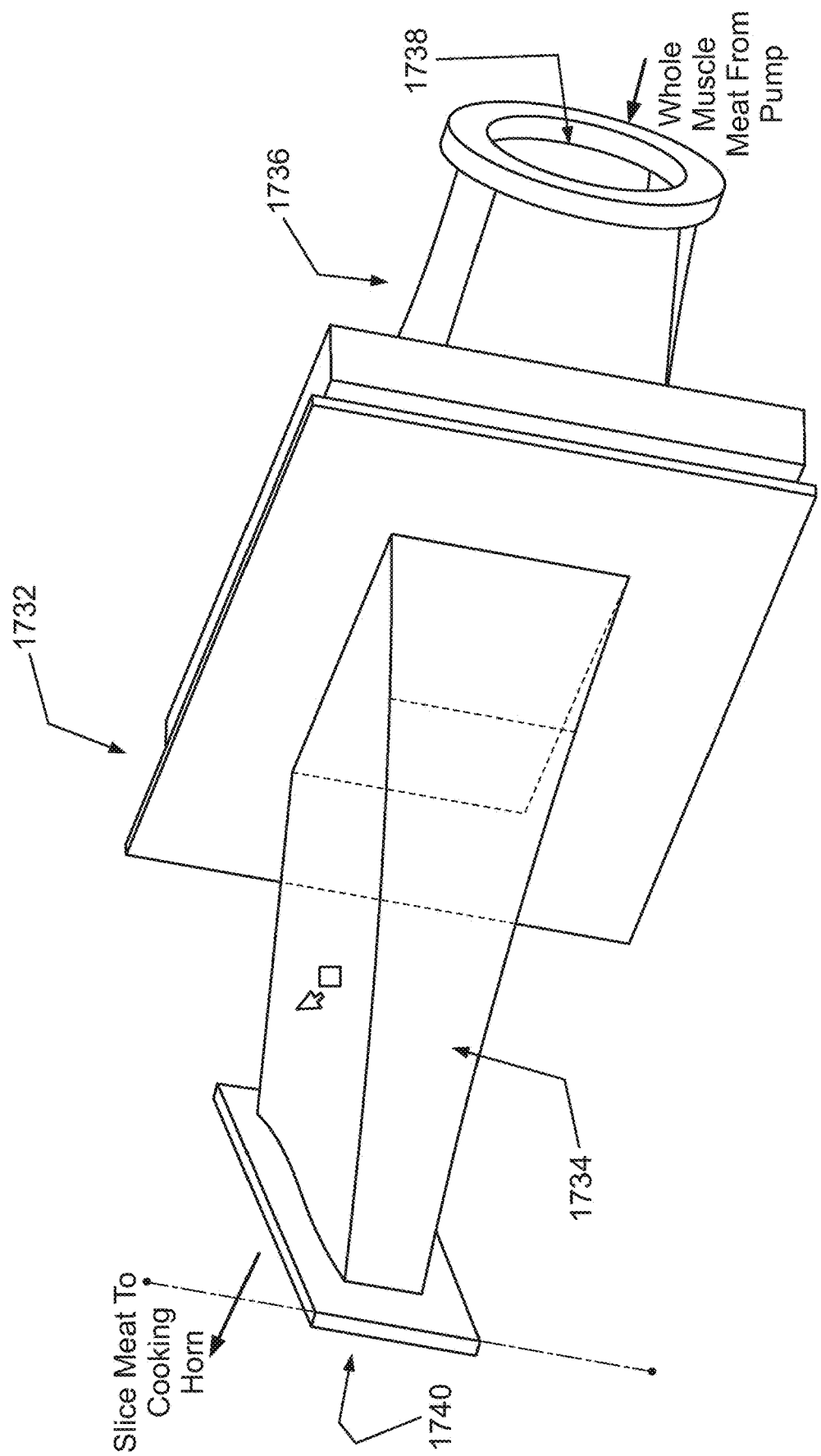

For one implementation, the upstream main body has an input tubular conduit 1706 mounted to the upstream main body and the tubular conduit include an interior tubular channel with an entry portal 1706, whereby the tubular conduit 1704 is mounted in such an orientation that the interior tubular channel is communicable with the upstream channel. The downstream main body has an output tubular conduit 1718 mounted to the downstream main body 1716 and the tubular conduit 1718 includes an interior tubular channel with an exit portal 1720, whereby the tubular conduit 1718 is mounted in such an orientation that the interior tubular channel is communicable with the downstream channel. The upstream main body 1702 is mounted, 1726 and 1724, to the retaining plate 1708, and the downstream main body 1716 is mounted, 1728 and 1722, to the blade housing 1714. Referring to FIG. 17D, one implementation of a razor cutter 1732 is illustrated where the downstream main body 1734 and output portal 1740 are similar to that illustrated in FIGS. 17A and 17C, however, in the implementation illustrated in FIG. 17D, the downstream main body 1734 is combined with a sheeter 1736 and a sheeter input portal 1738, where the sheeter 1736 is similar to the sheeter illustrated in FIGS. 15A through 15C. The sheeter is utilized to provide a narrow sheet of product to flow into the razor cutter to thereby reduce the pressure seen at the razors resulting in better separation of the slice product.

Figure 18A:
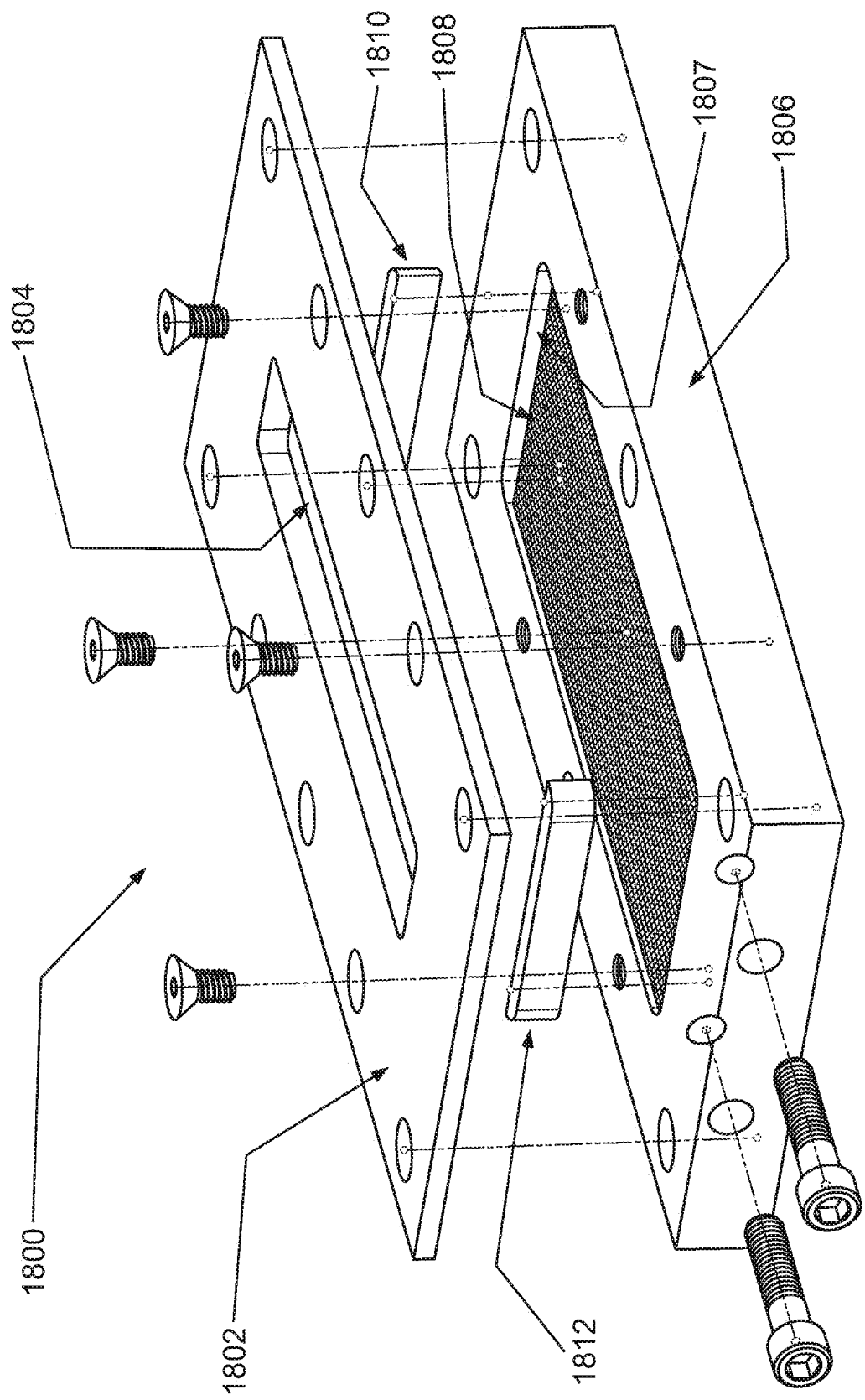
FIGS. 18A through 18C are an illustration of an inline slicer.
Figure 18B:
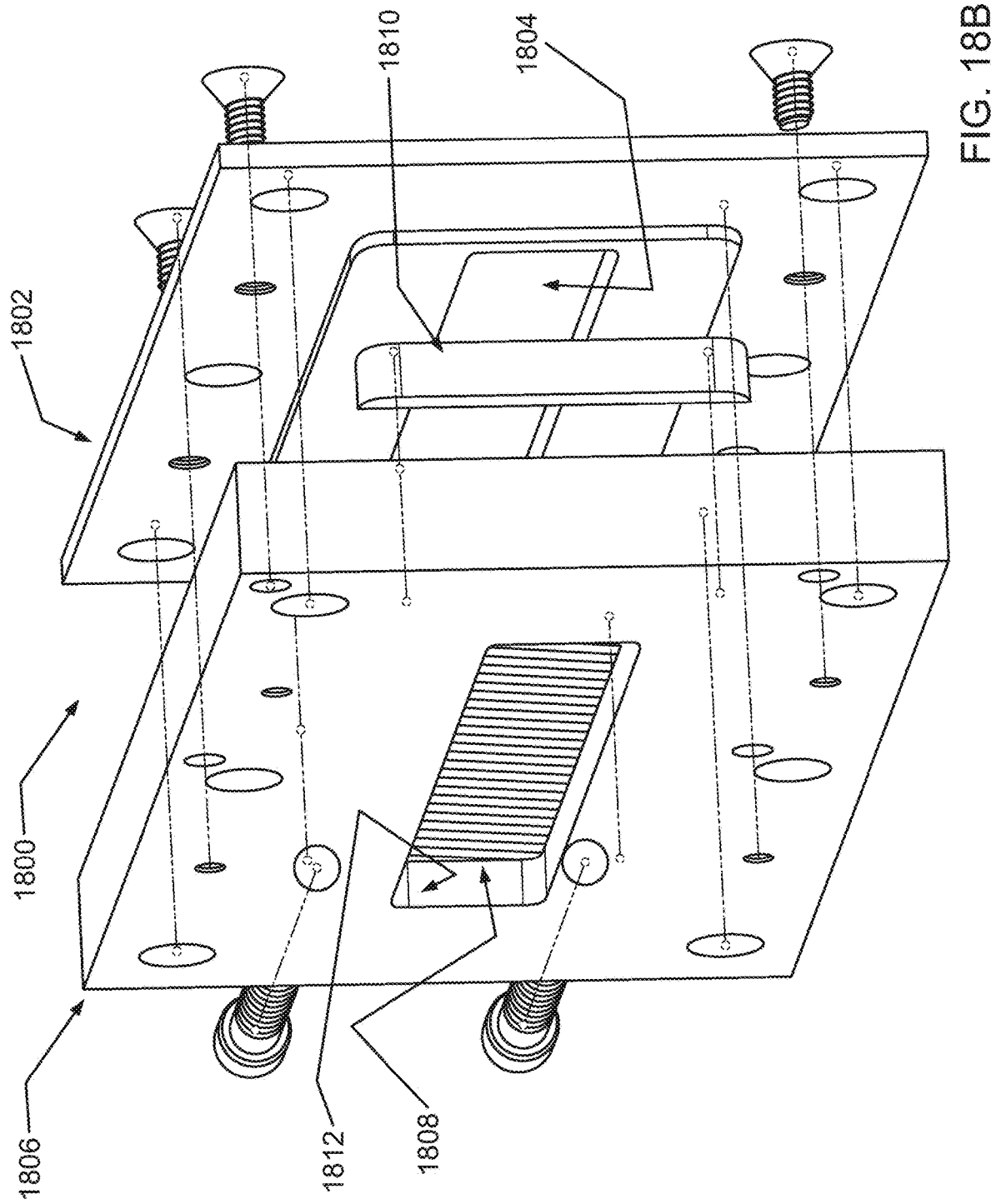
Figure 18C:
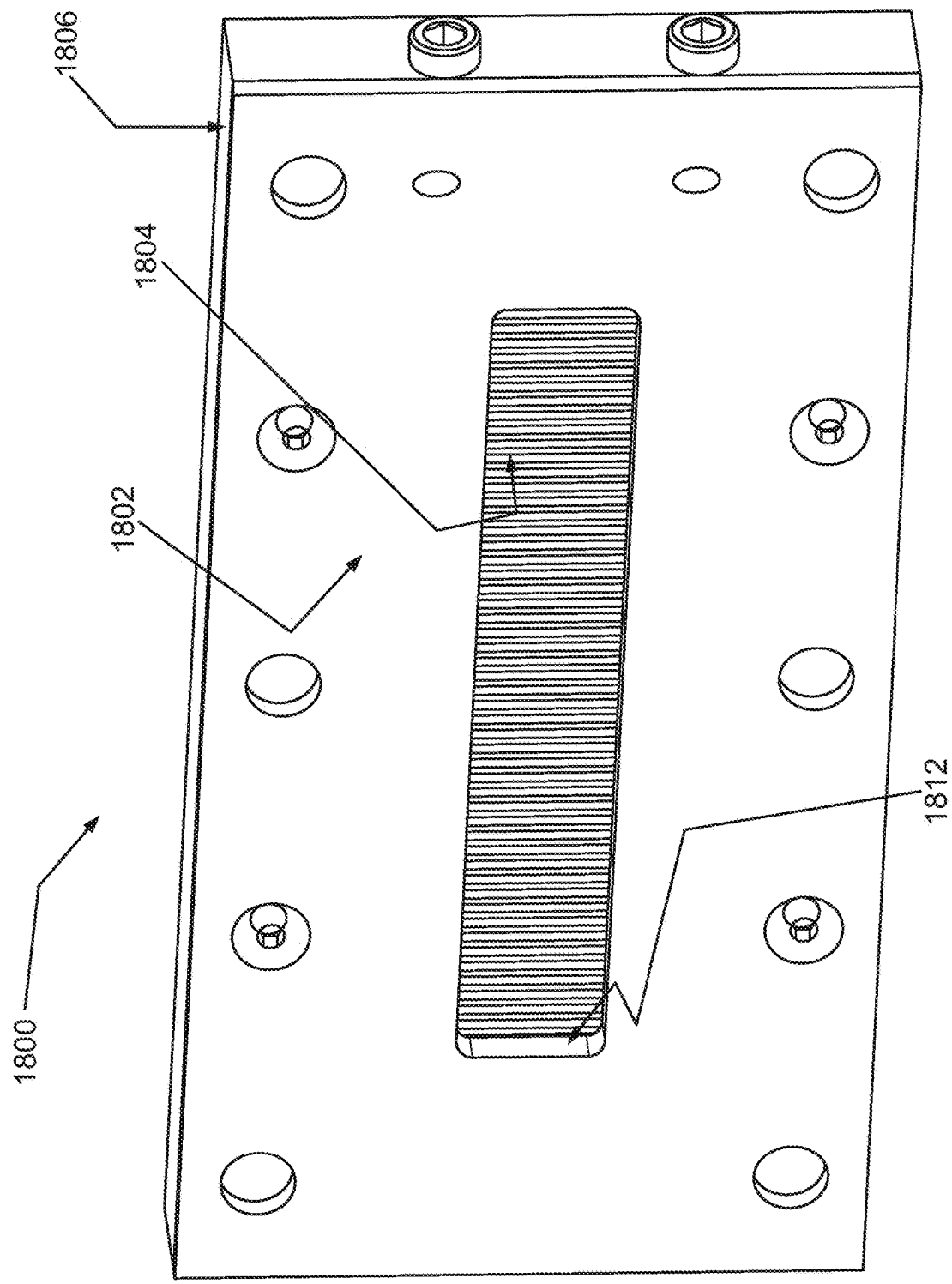

Referring to FIGS. 18A through 18C, an inline slicer 1800 is shown. For one implementation of a whole muscle slicing system, an inline slicer 1800, as shown, is inserted in a flow path. The inline slicer 1800 is positioned between an upstream input conduit that is upstream with respect to an inline slicer assembly 1800 along a flow direction and a downstream conduit that is downstream with respect to the inline slicer assembly 1800 along the flow direction. The blade assembly housing 1806 houses the blade assembly 1808 and a blade assembly retaining plate 1802 retains the blade assembly 1808 within the blade assembly housing 1806. For one implementation, the blade assembly 1808 includes a series of flattened substantially rectangular razors that are stacked 1808 with the flattened surfaces positioned substantially parallel and side-by-side with a space between each adjacent blade and each blade having a sharpened edge facing upstream with respect to the flow direction. The blade stack 1808 is retained between two opposing blade clamps. For one implementation, the space between each adjacent flattened blade is defined by a flattened shim.

The blade assembly 1808, the retaining plate 1802 and the blade housing 1806 are mounted between an upstream conduit and a downstream conduit. The blade housing 1806, includes an open ended through channel 1807 thereby providing a flow path through the blade housing along the flow direction. The blade assembly is housed in the through channel 1807 and oriented with the series of adjacent sharpened blade edges facing upstream with respect to the flow direction. The retaining plate 1802 includes a similar through channel 1804 in this case an opening through which product can flow into the through channel 1807 and engage the blade assembly. The upstream conduit is mounted to the retaining plate 1802 and said conduit includes an upstream channel interior to the upstream conduit, which is communicable with the opening 1804 in the retaining plate 1802 such that product can flow through the upstream channel, through the opening in the retaining plate 1804 and through the open ended channel 1807 in order to engage the razor stack. Spacers 1810 and 1812 are placed between the plate and the housing. The housing 1806 further includes an exit portal 1812 through which product will flow into and through the downstream conduit. For one implementation of the razor slicer, each of the blade housing, the series of sharpened edges of the blade assembly, and the retaining plate, are oriented at an approximately 90-degree angle with respect to the flow direction. The angle with respect to the flow direction for each of the elements can vary depending on the product flowing through the assembly. The inline razor slicer for one implementation is utilized to slice product such chicken and/or beef having a thickness of 4 mm and over. For one implementation, the angle of the blades is greater than 90 degrees, such as 120 degrees to 150 degrees with respect to the flow of the product.

Referring to FIGS. 19A through 19H, an illustration of a cutter transition nozzle 1900 is provided. The cutter transition nozzle for one implementation is positioned immediately upstream from an induction cooking horn and immediately downstream of a cutter assembly. Product flows through a cutter assembly, which slices the product into sheets. The flow of layered product sheets flows into the entry end 1902 of the cutter transition nozzle 1900. The sheets of product flow through an inner channel of the transition nozzle and out of the exit end 1904 of the cutter transition nozzle 1900. The inner channel of the cutter transition nozzle gradually widens from the entry end 1902 and the exit end 1904. The cutter transition nozzle has an upper component 1906 having a lengthwise cutout to form an upper portion of the inner channel and a lower component 1908, also having a lengthwise cutout to form a lower portion of the inner channel. The cutter transition nozzle 1900 is mounted to an exit end of a cutter assembly using upper 1914 and lower 1916 flange mounts. The cutter transition nozzle 1900 is mounted to an entry end of the induction cooking horn with upper 1912 and lower 1910 mounting flanges. The cutter transition nozzle 1900, for one implementation, includes a removable/replaceable nozzle head assembly 1918. The nozzle head assembly 1918 has a narrowing taper.

Figure 19A:
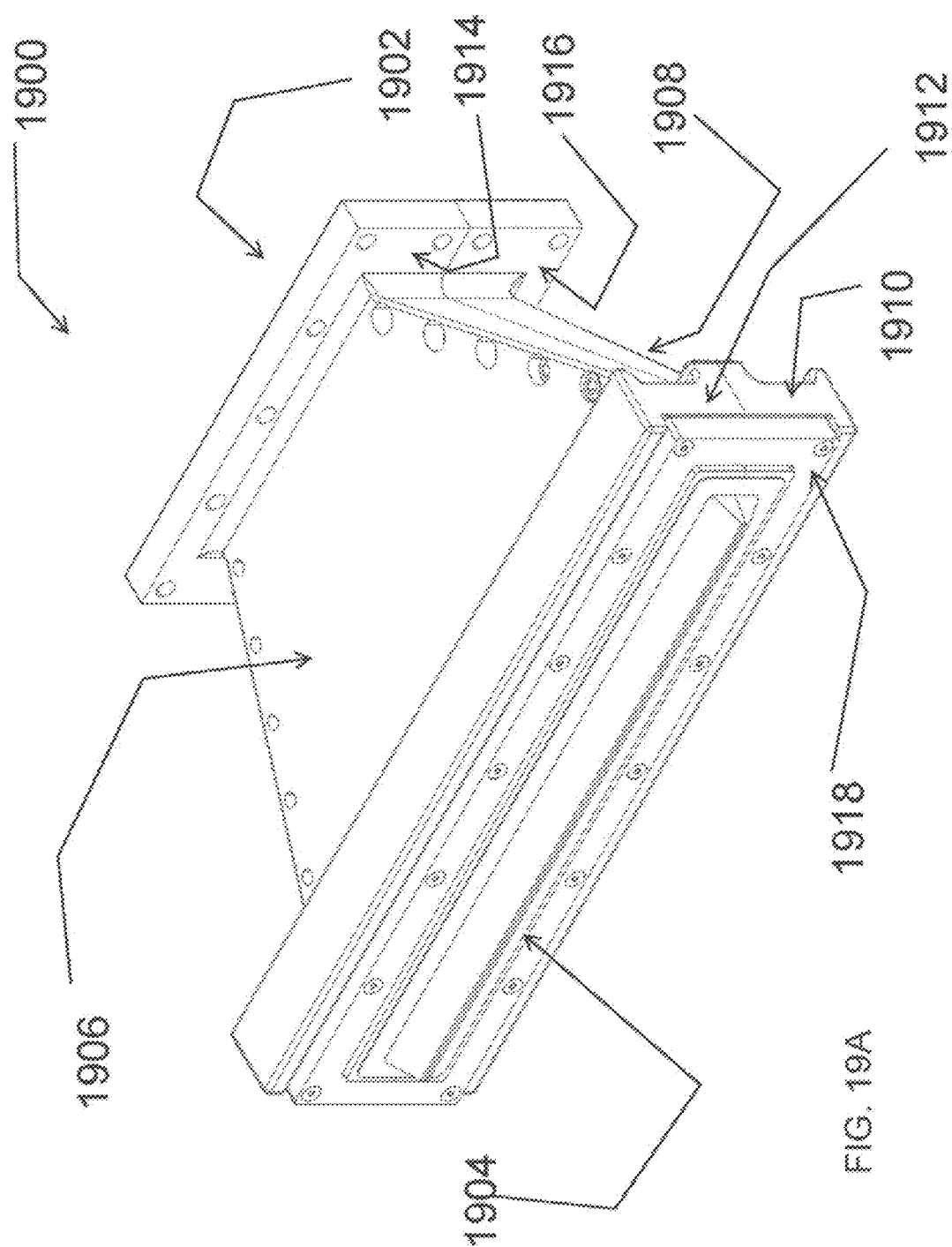
Figure 19B:
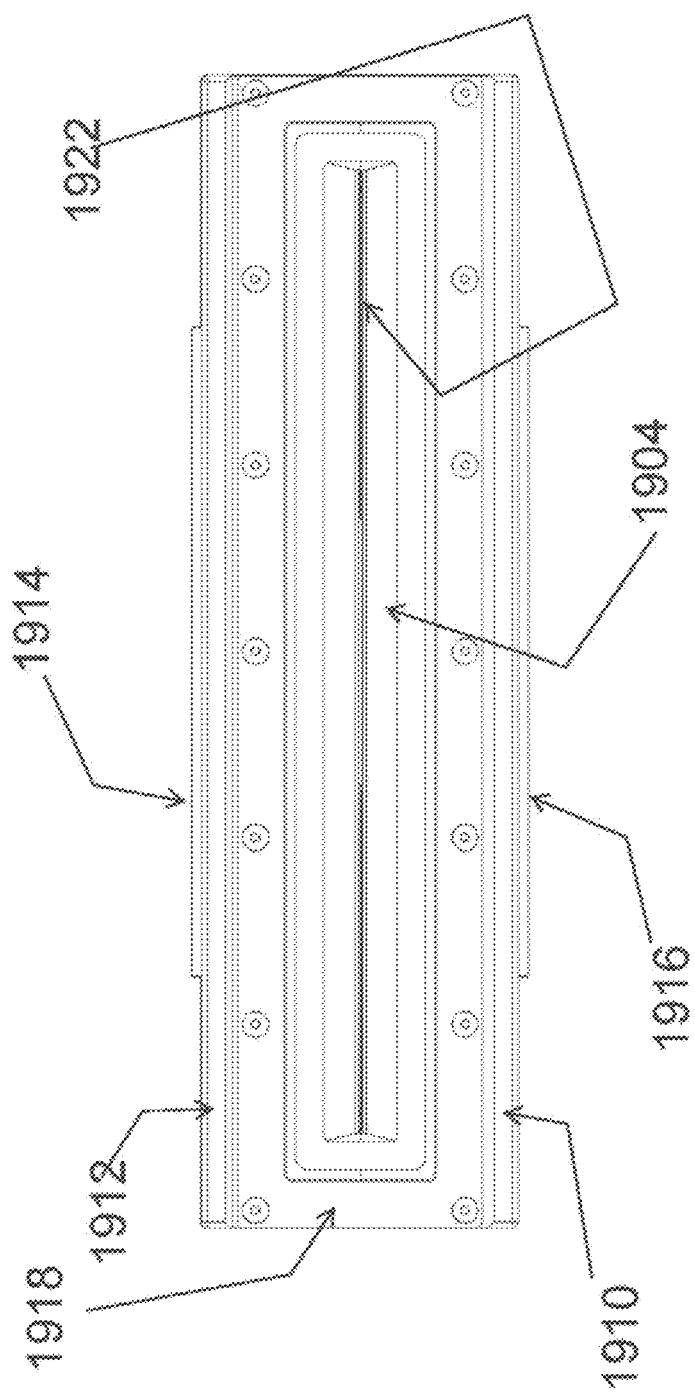
Figure 19C:
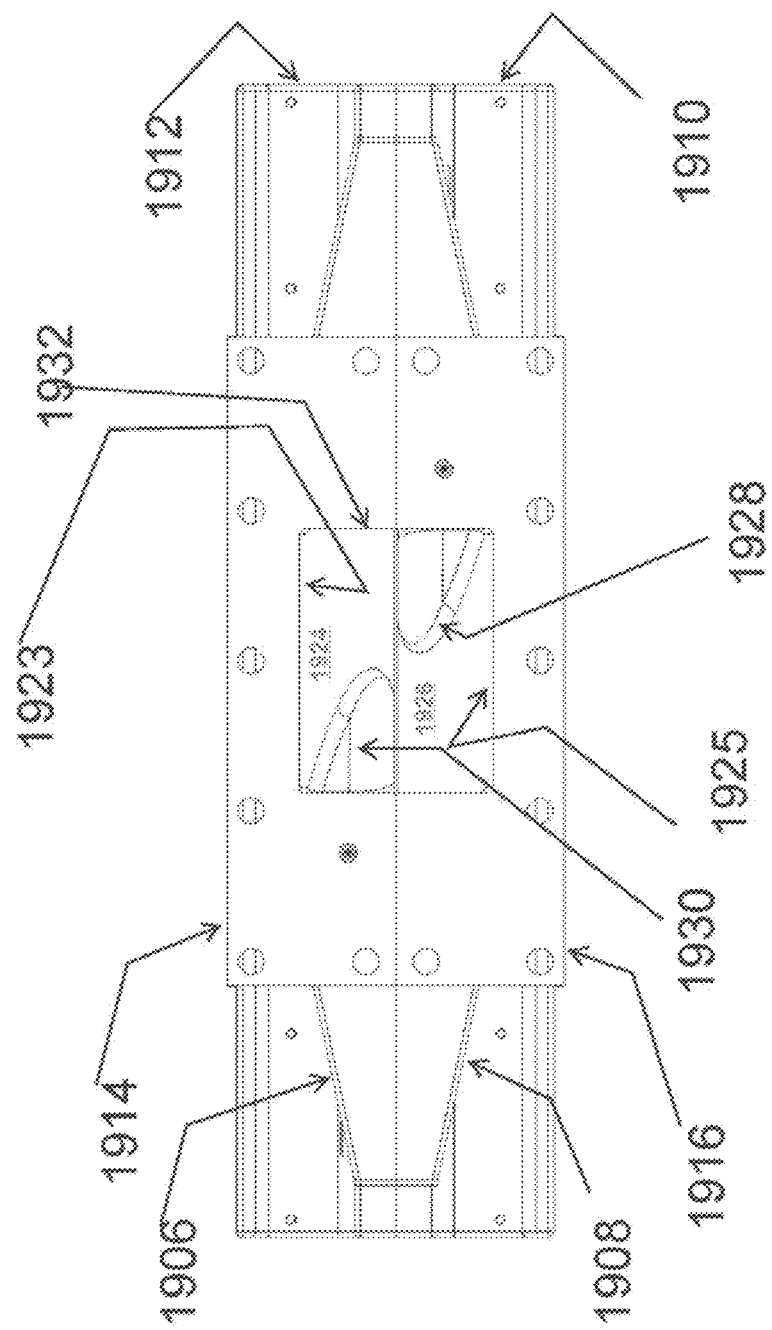
Figure 19E:
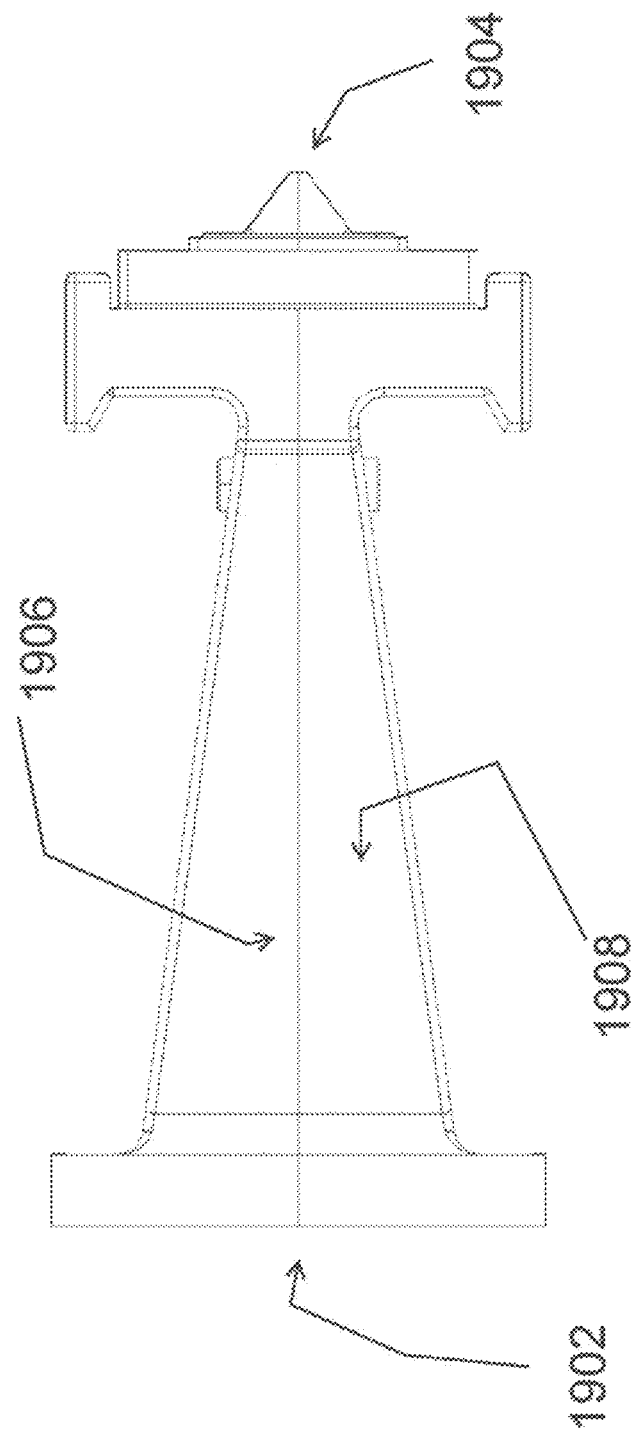
Figure 19F:
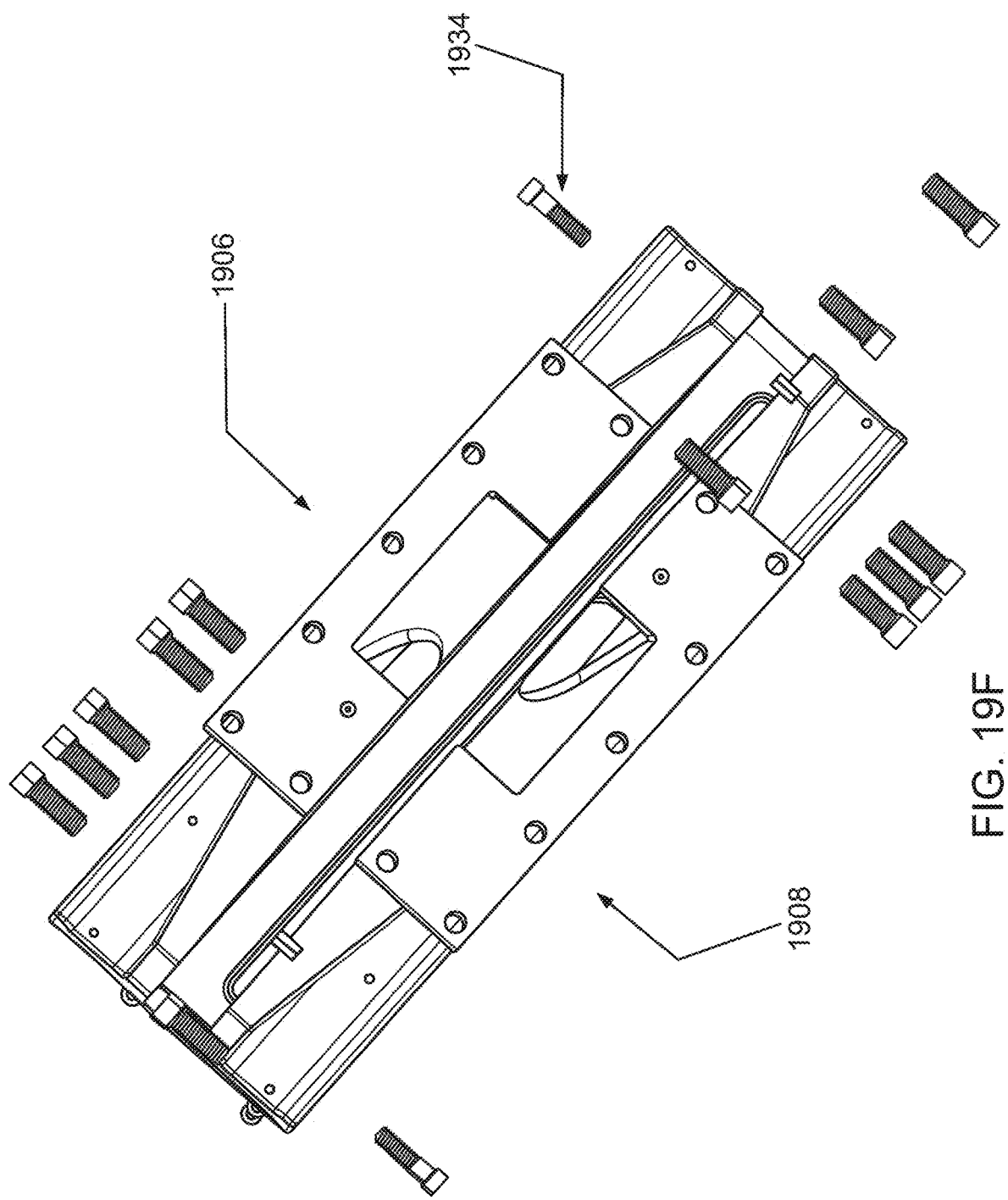
Figure 19G:
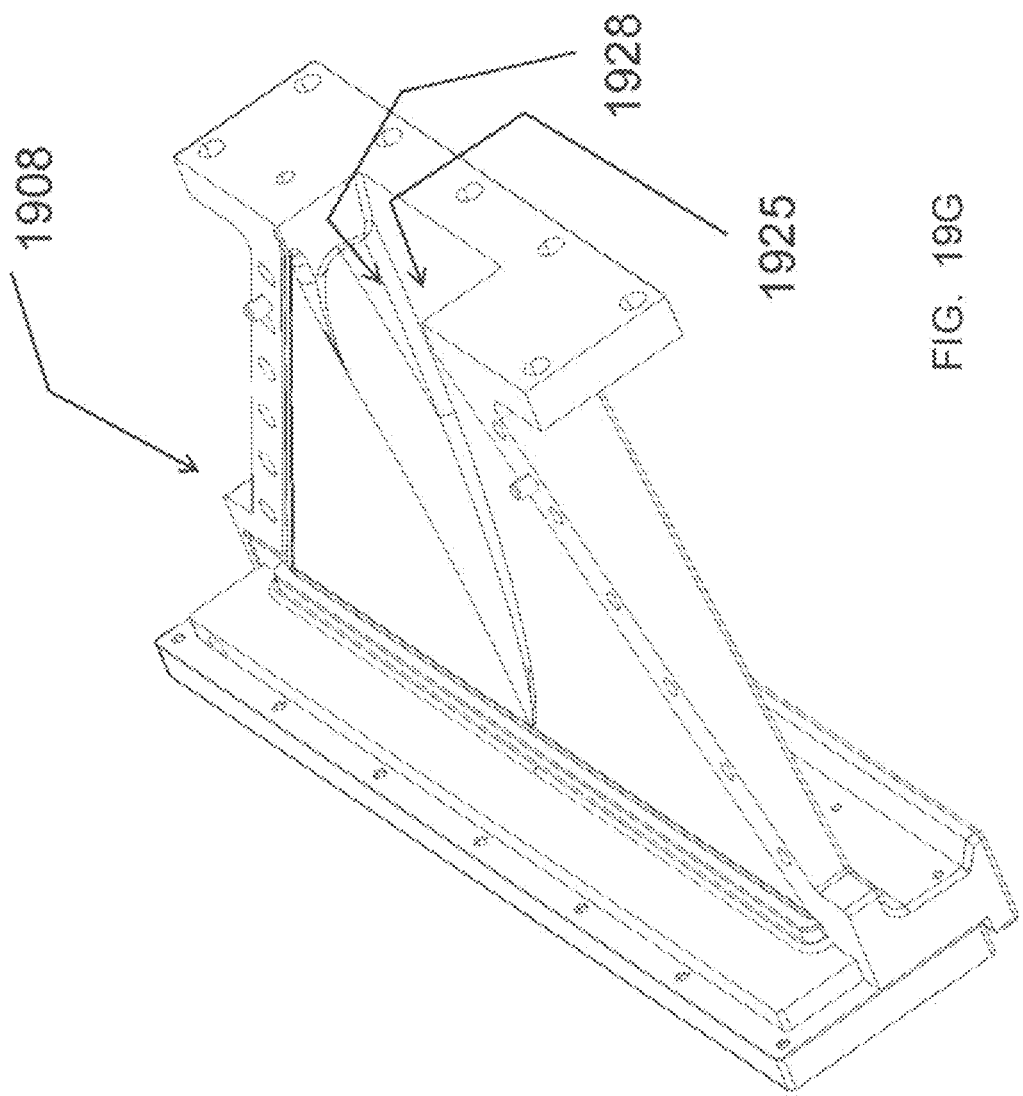
Figure 19H:
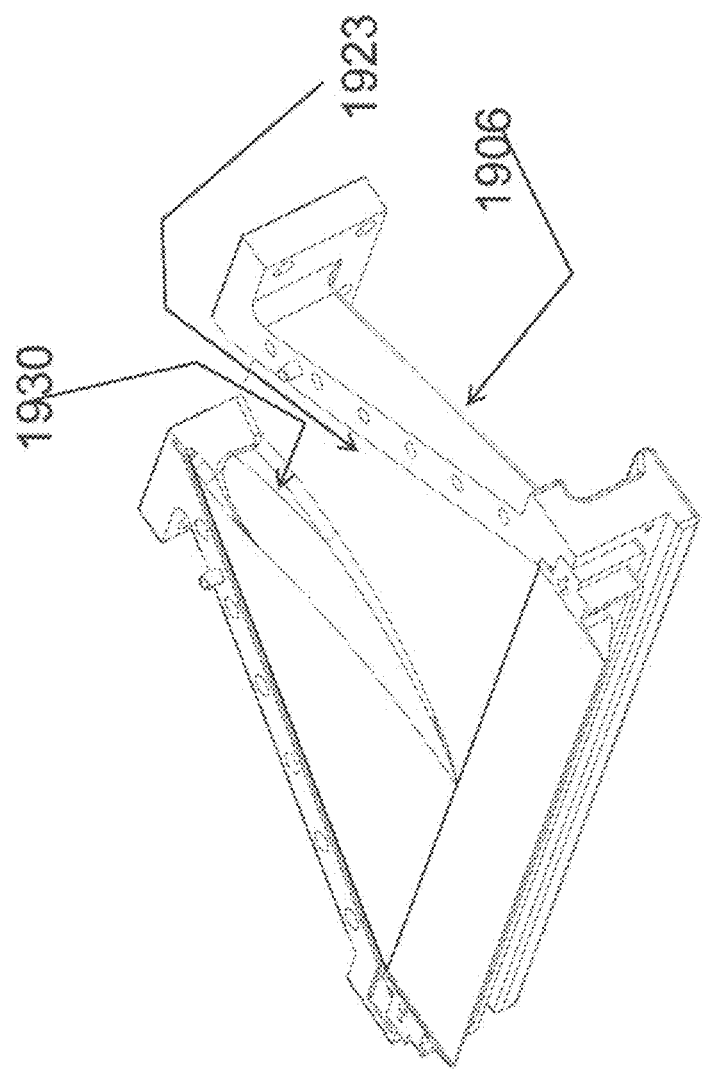

The nozzle head assembly 1918, for one implementation, is positioned at the exit end and has a narrow opening 1922 through which product exits and flows into the induction cooking horn. The entry end 1902 of the cutter transition nozzle includes an entry opening 1932, which opens to an inner channel formed by upper 1923 and lower 1925 cutouts as shown in FIG. 19C. The inner channel has an upper channel portion 1924 formed by the upper component of the 1906 of the cutter transition nozzle, and has a lower channel portion 1926 formed by the lower component 1908 of the cutter transition nozzle. Within the inner channel are upper and lower diffuser baffles 1928 and 1930 that are raised contoured surfaces in the upper and lower portions of the inner upper and lower channel portions 1924 and 1926 respectively. The upper and lower diffuser baffles with their inward facing convex rounded side edges extending from the entry end to the exit end and with their gradually narrowing height from the entry end to the exit end cause further staggering and separation of the sliced layers of product flowing through the inner channel of the cutter transition nozzle. FIG. 19F illustrates an exploded view of the cutter transition nozzle with the upper 1906 and lower 1908 components and how they are assembled using fasteners as illustrated by item 1934. FIGS. 19G and 19H provide further illustration of the upper 1906 and lower 1908 components of the cutter transition nozzle and the upper 1923 and lower 1925 portions of the inner channel formed by the respective cutouts. The diffuser baffles 1928 and 1930 are also further illustrated.

Referring to FIGS. 20A through 20I, an illustration of an adjustable induction coil assembly 2000 is provided. For one implementation, the interior cooking surfaces of the interior channel are heated by induction heating. The cooking plate utilizes electrically conducting coils that generate eddy currents that cause the conductive plates to heat up. Induction heating is a non-contact method of heating a conductive body (i.e. plates) by utilizing a strong magnetic field from the specially designed coils. The coils do not contact the conductive plates. The conductive plates heat up responsive to its proximity to the strong magnetic field. The heated plates contact and heat up the meat. The advantage of an inductive heating system and method is that the heating temperature of the plates can reach a very high temperature (approximately 500 degrees F.) ins a short period of time and the surface temperature of the plates can be controlled by adjusting the power output to the coils. An induction heater consists of an electromagnet, and an electronic oscillator that passes a high-frequency alternating current (AC) through the electromagnet. The rapidly alternating magnetic field penetrates the object, generating electric currents inside a conductor called eddy currents. The eddy currents flowing through the resistance of the material heat it by Joule heating. In ferromagnetic (and ferromagnetic materials like iron, heat may also be generated by magnetic hysteresis losses. The frequency of current used depends on the object size, material type, coupling (between the work coil and the object to be heated) and the penetration depth. An important feature of the induction heating process is that the heat is generated inside the object itself, instead of by an external heat source via heat conduction. Therefore, objects can be heated very rapidly. In addition there need not be any external contact.

Figure 20A:
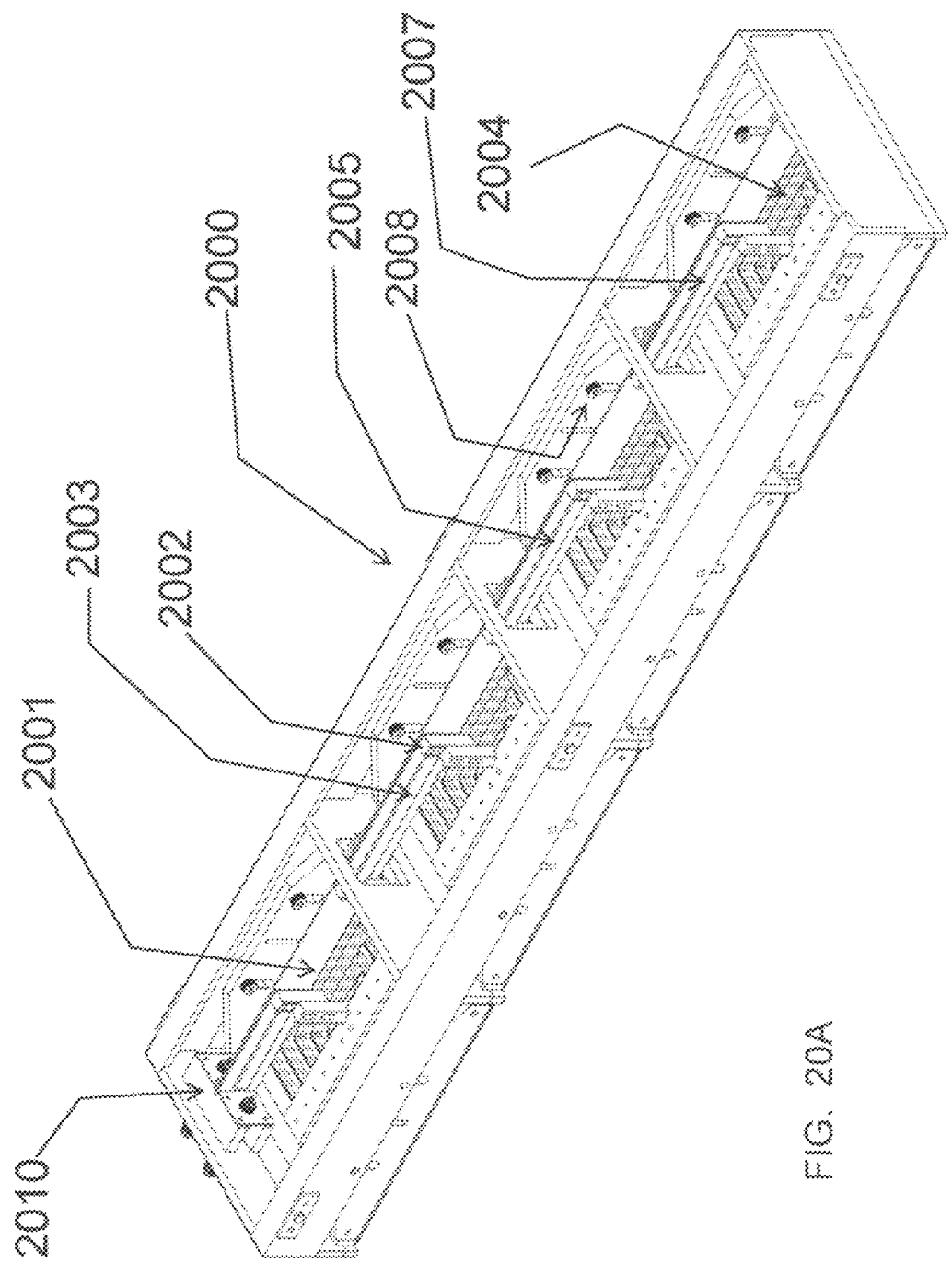
Figure 20B:
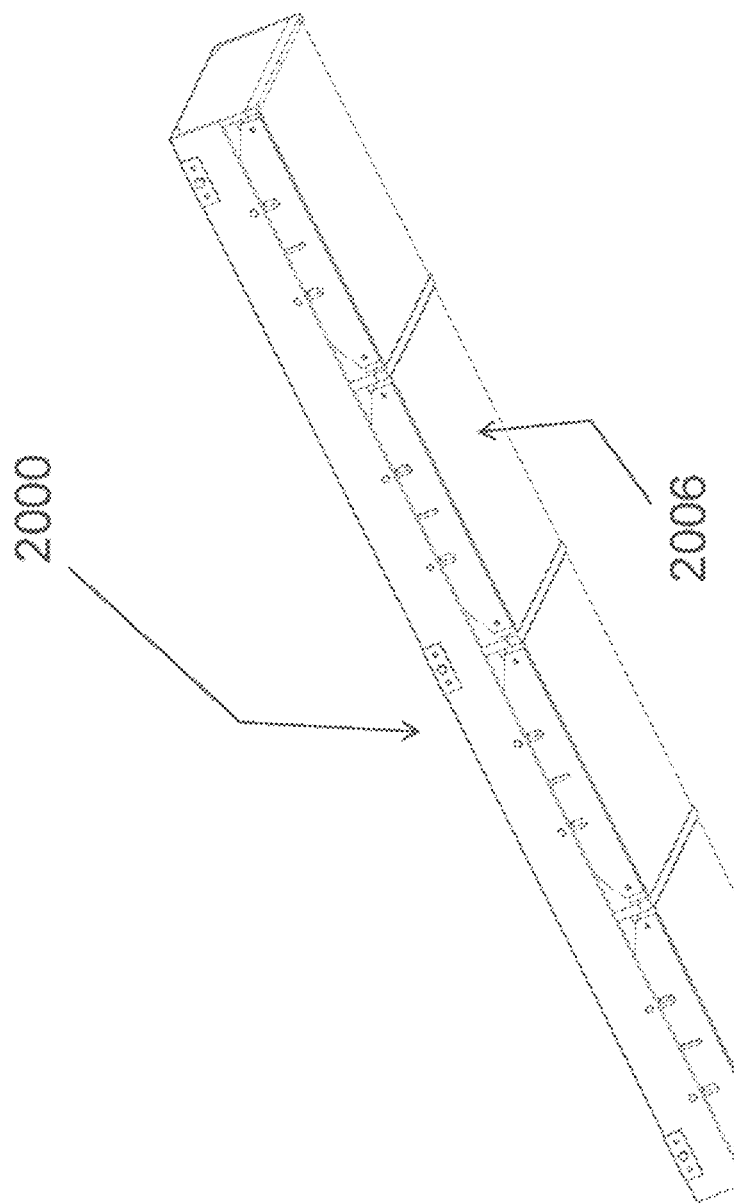
Figure 20C:
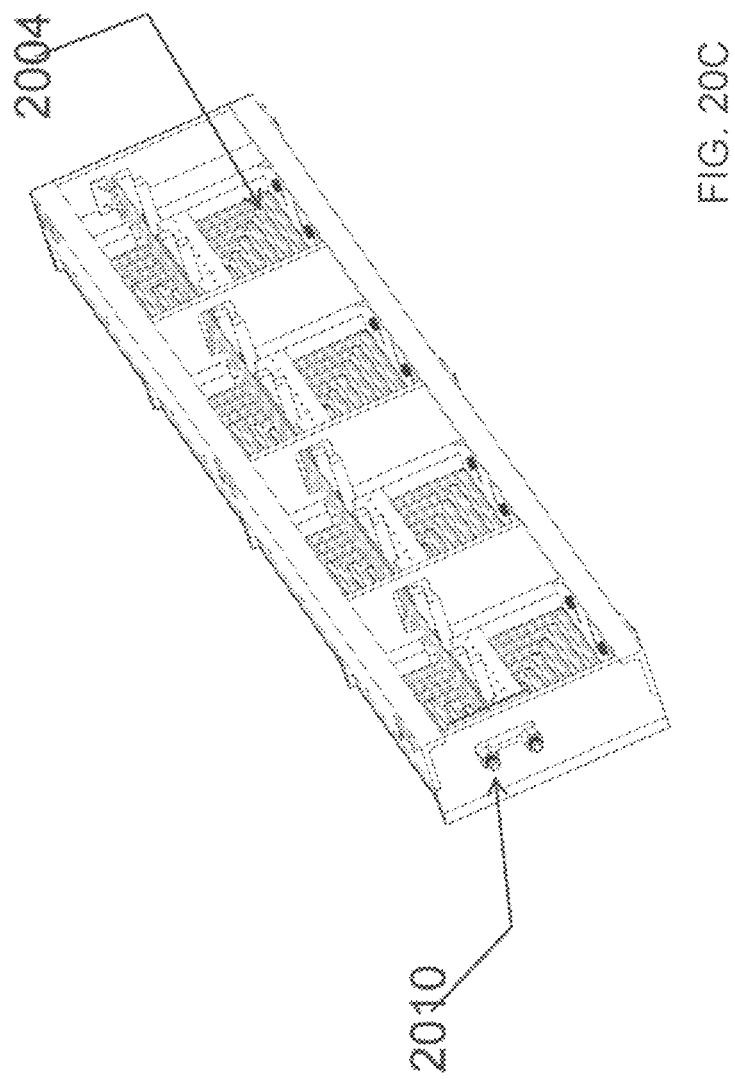
Figure 20E:
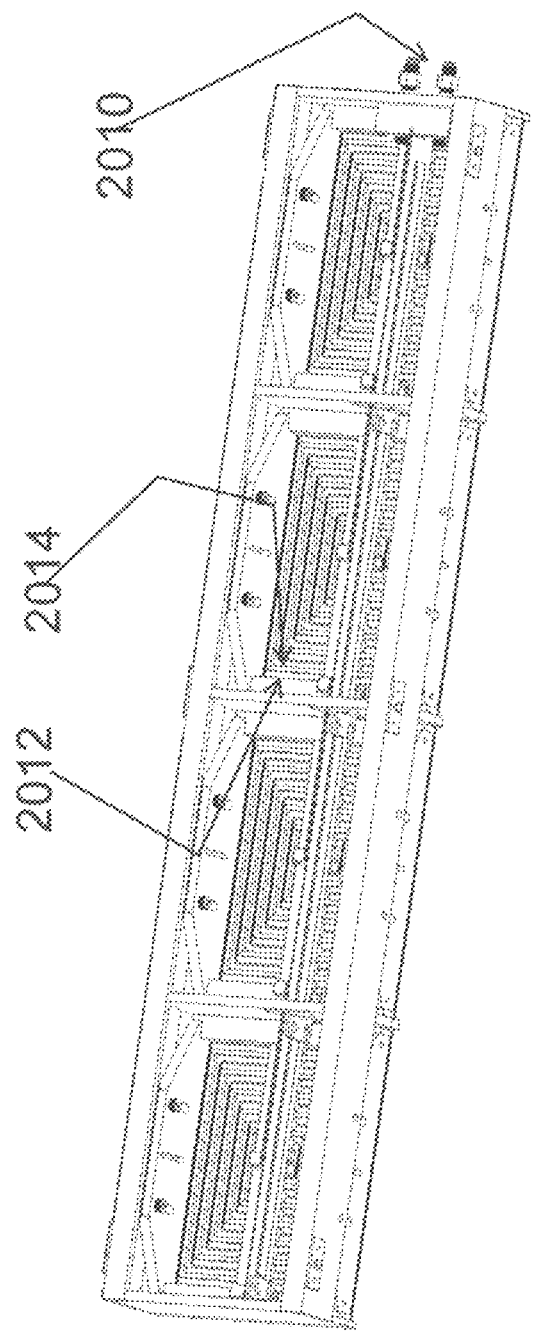
Figure 20F:
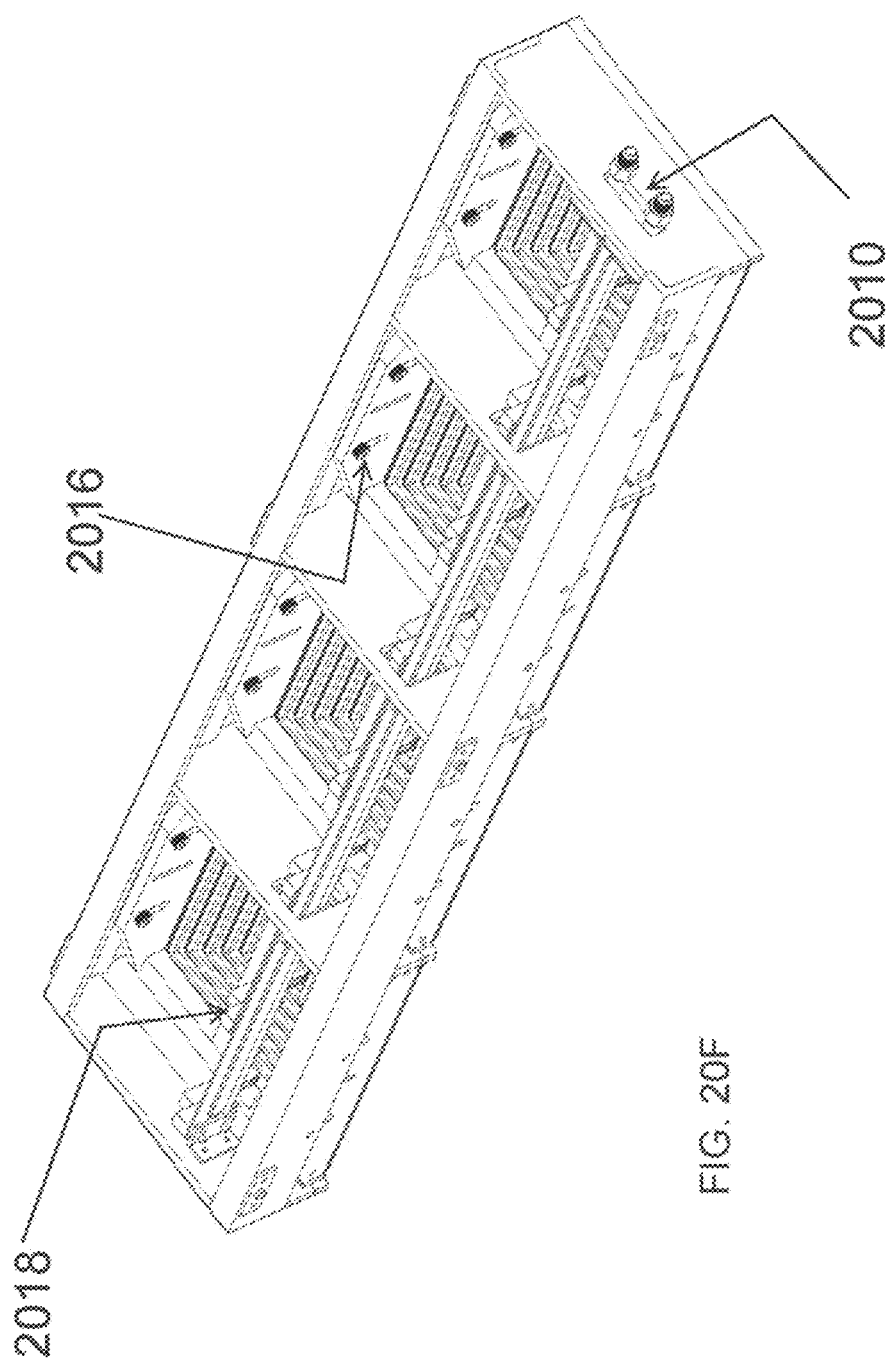
Figure 20G:
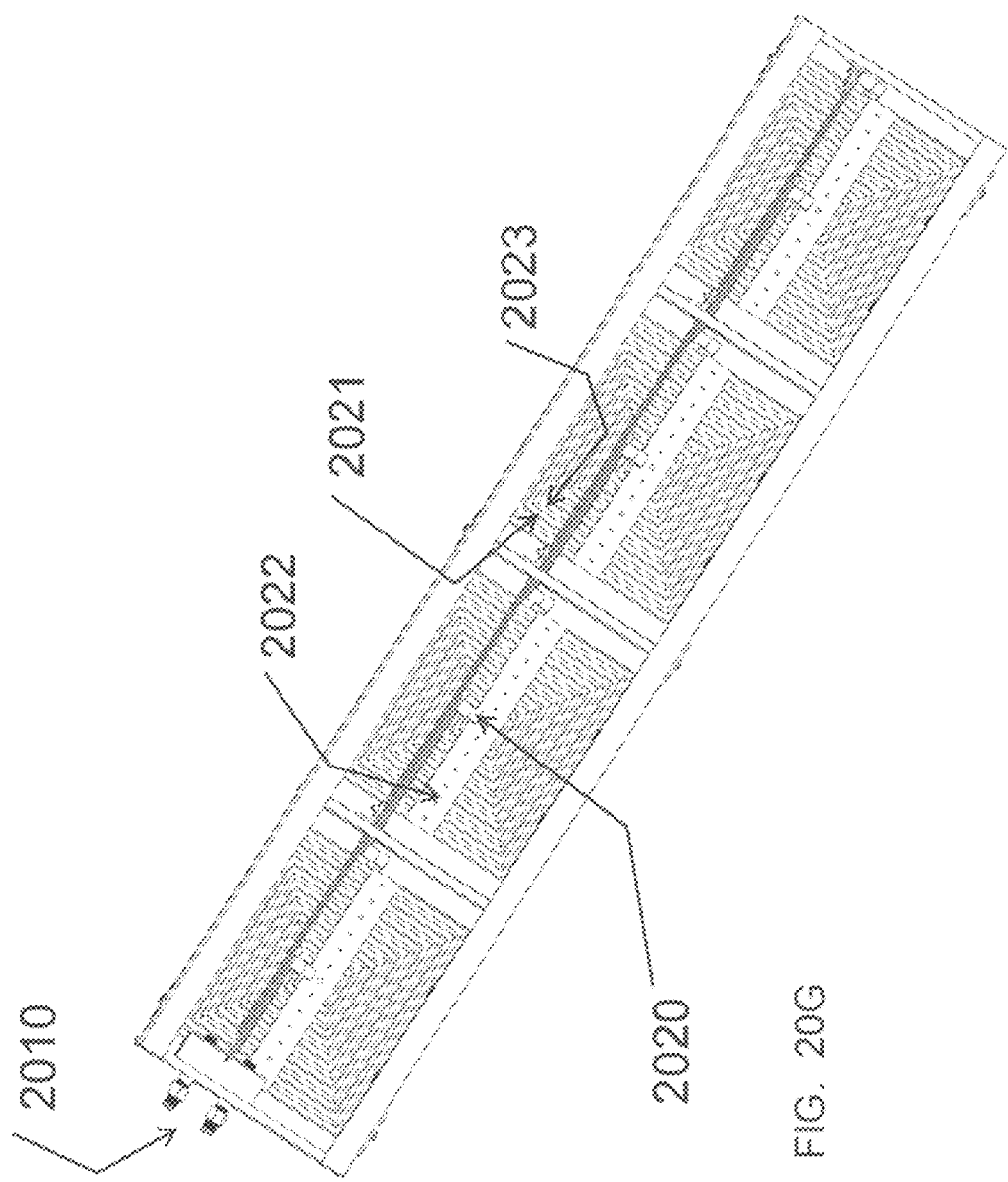
Figure 20H:
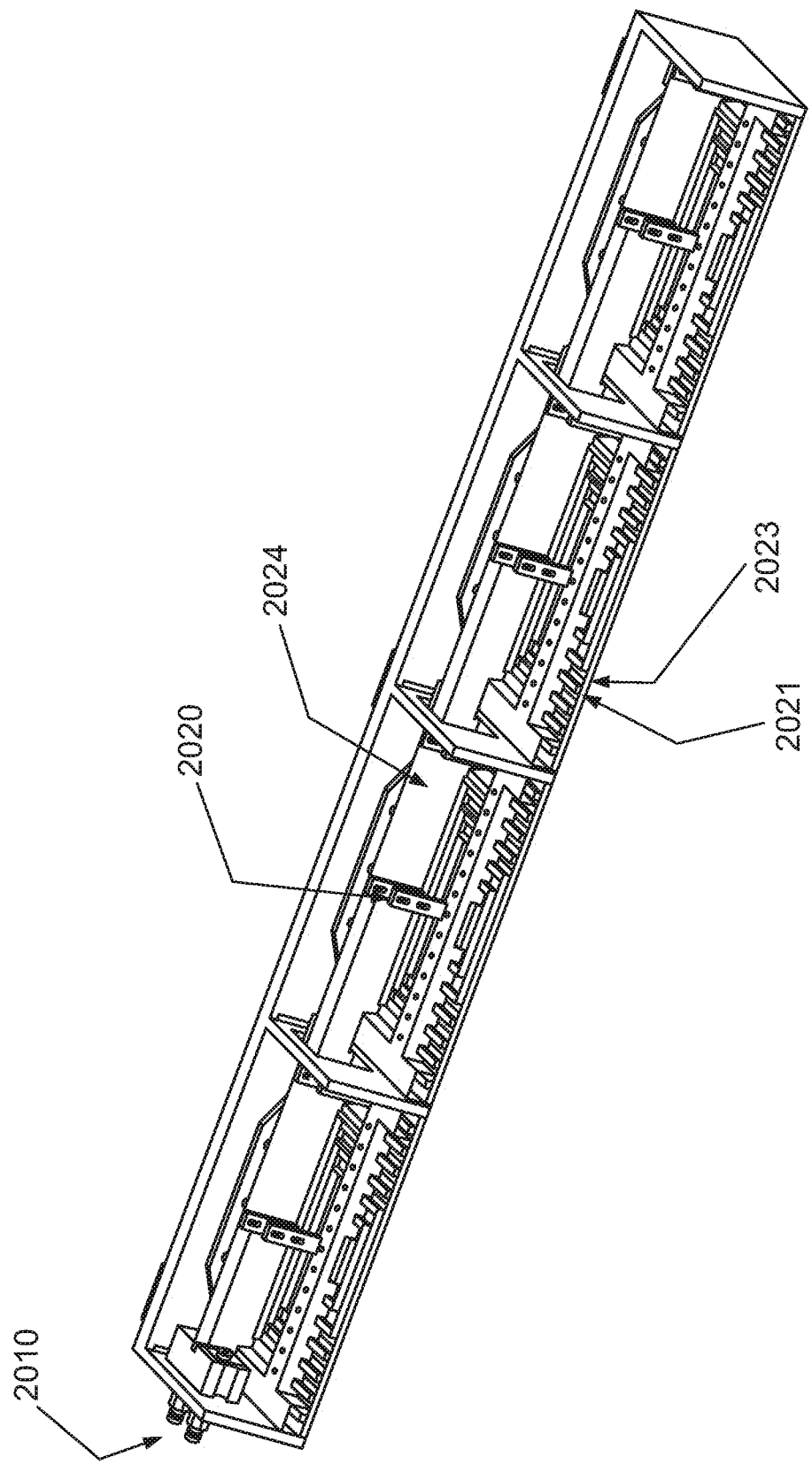

For one implementation of the cooking horn, the induction coil heating system 2000 as illustrated includes four independently powered and controlled heating zones 2001, 2003, 2005 and 2007 with four independent induction coils like that of item 2004 and powered in parallel. Each heating coil has an adjustable bracket 2002 for raising and lowering the heating coil. Raising the heating coiling increases the distance between the coil and the heating plate thereby lowering the temperature of the heating plate. Lowering the induction heating coil, decreases the distance between the coil and the heating plate, thereby increasing the temperature of the heating plate. The slot and fastener 2008 configuration of the coil assembly allows the coil assembly to be adjustably raised and lowered and fixed at the desired adjusted position. The heating plate 2006 applies heat to product traveling through the horn. The adjustable induction heating coil assembly 2000 is combined with a second induction heating coil assembly where the two heating coil assemblies are mounted together with the cooking plates inwardly facing one with respect to the other such that product traveling through the horn is seared on both sides. The power input 2010, when powered, powers in parallel each of the four independent heating coils, one of which is represented by item 2004. The heating coil includes two components, the induction coils 2009, 2012 and the adjacent heat transfer components 2011, 2014. The power input provides power to the induction coils in parallel. FIGS. 20F and 20G provide further illustration of the adjustable brackets 2018, 2020 and an adjustable slot and fastener, 2016 and a support member 2022. The heating coil includes two components, the induction coil 2021 and the adjacent heat transfer component 2023. FIG. 20H provides a sectional view of the induction heating coil system including the support beam member 2024 that supports the vertical adjustment mechanism 2020. FIG. 20I provides a view of the heating plate 2041.

Figure 21A:
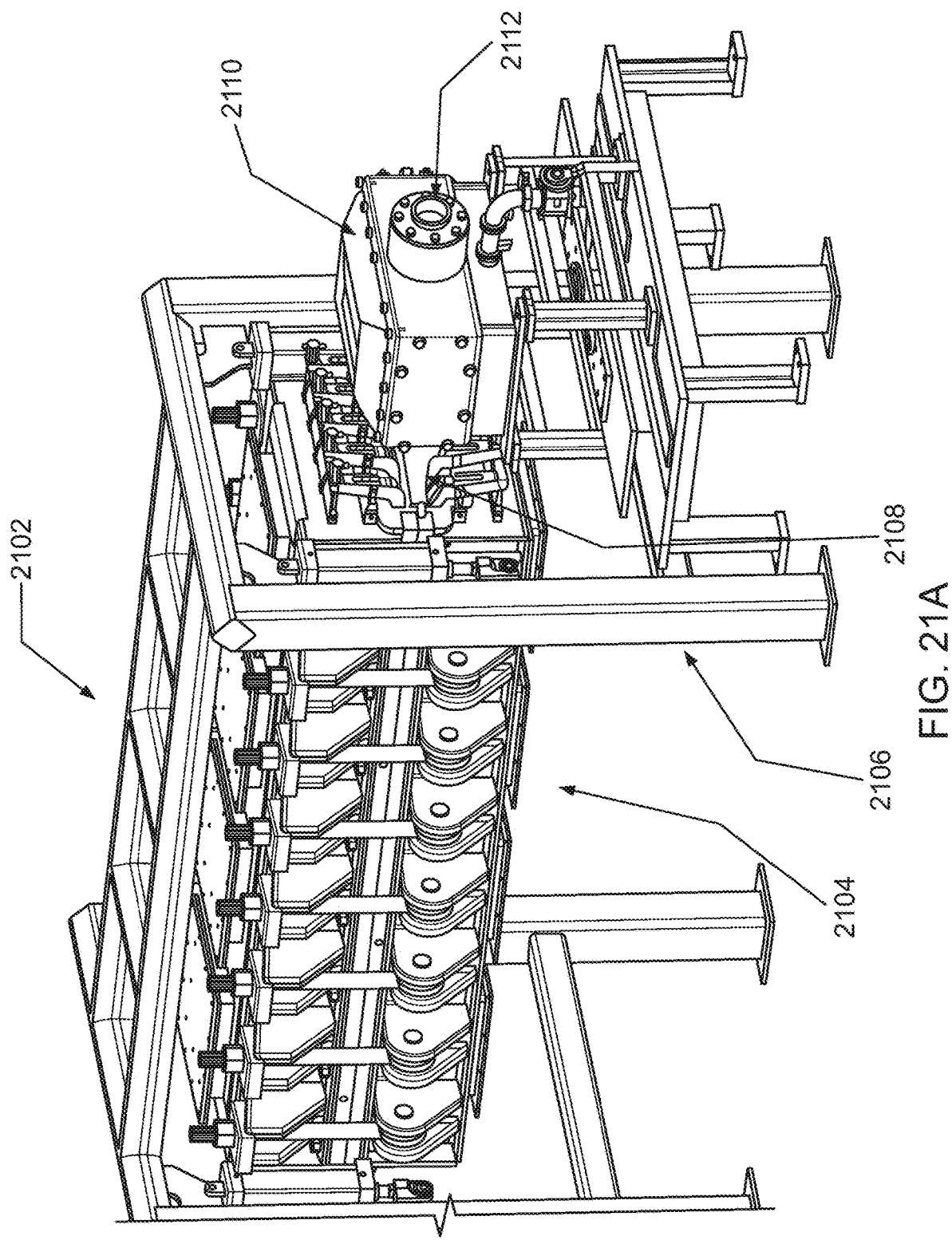
FIGS. 21A through 21E are an illustration of the induction horn assembly.
Figure 21B:
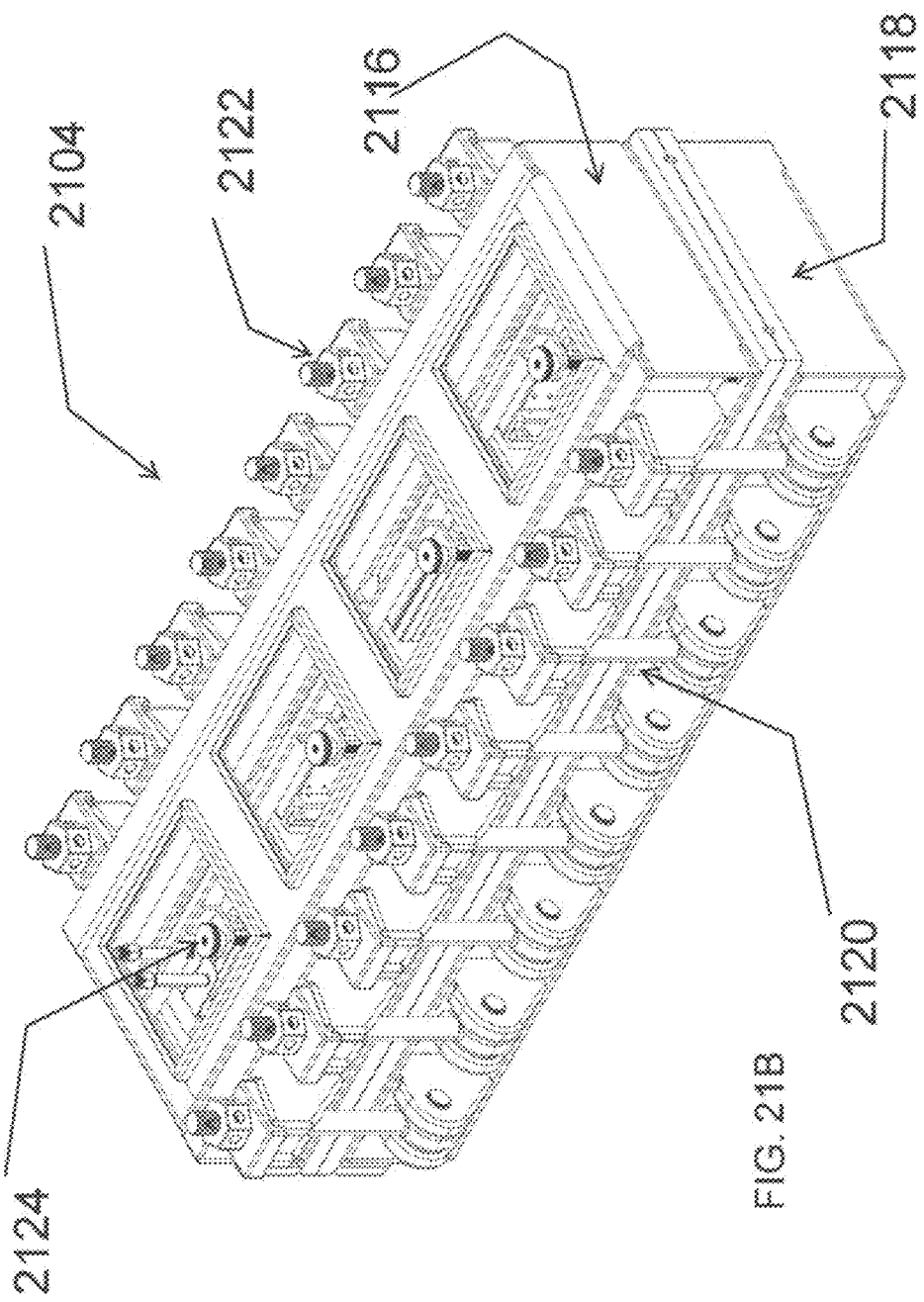
Figure 21C:
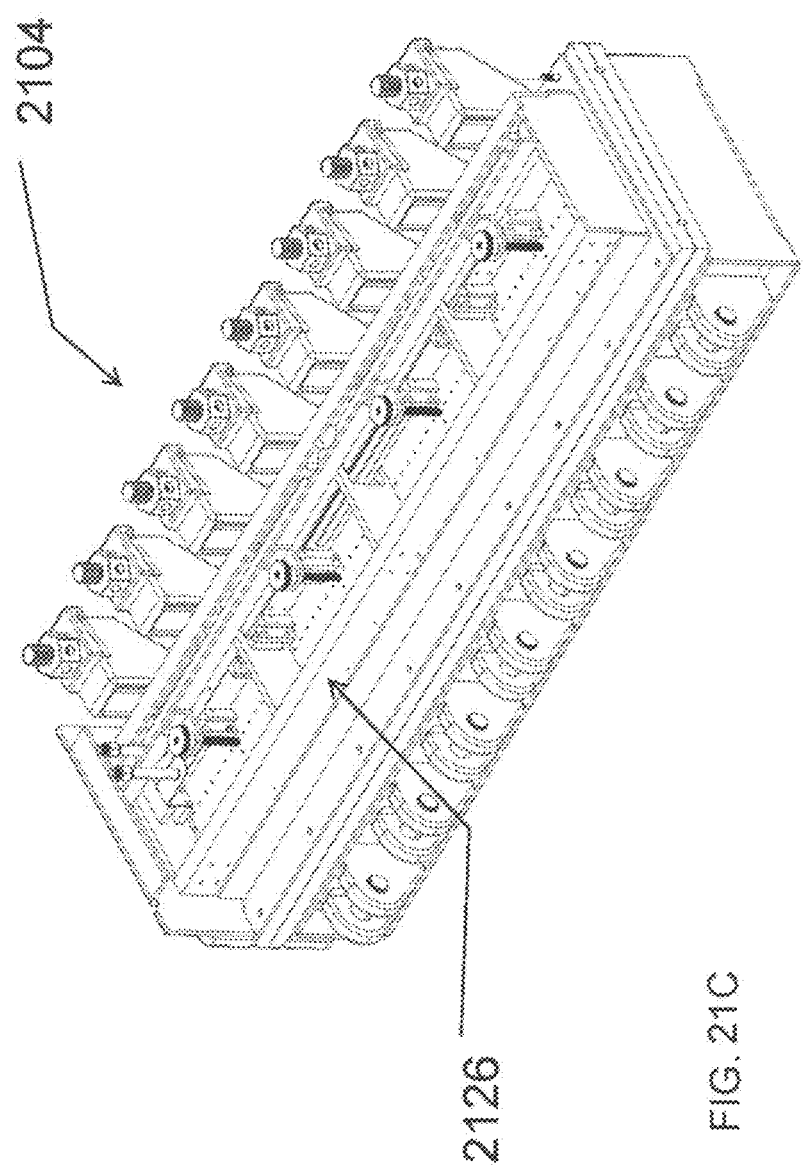
Figure 21D:
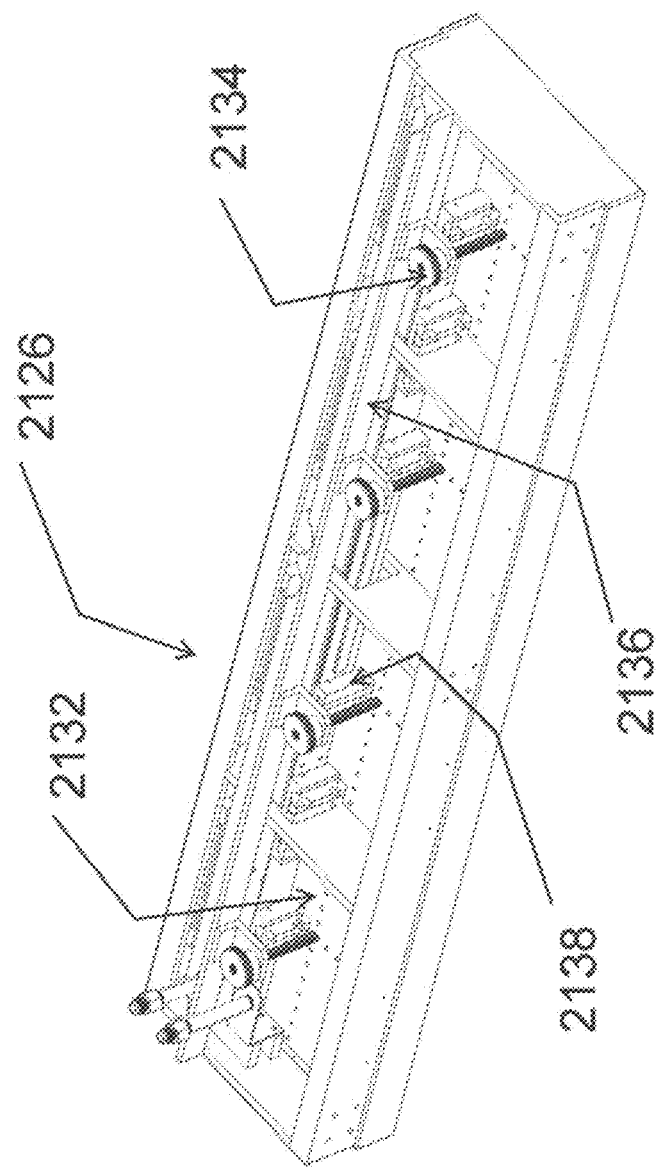
Figure 21E:
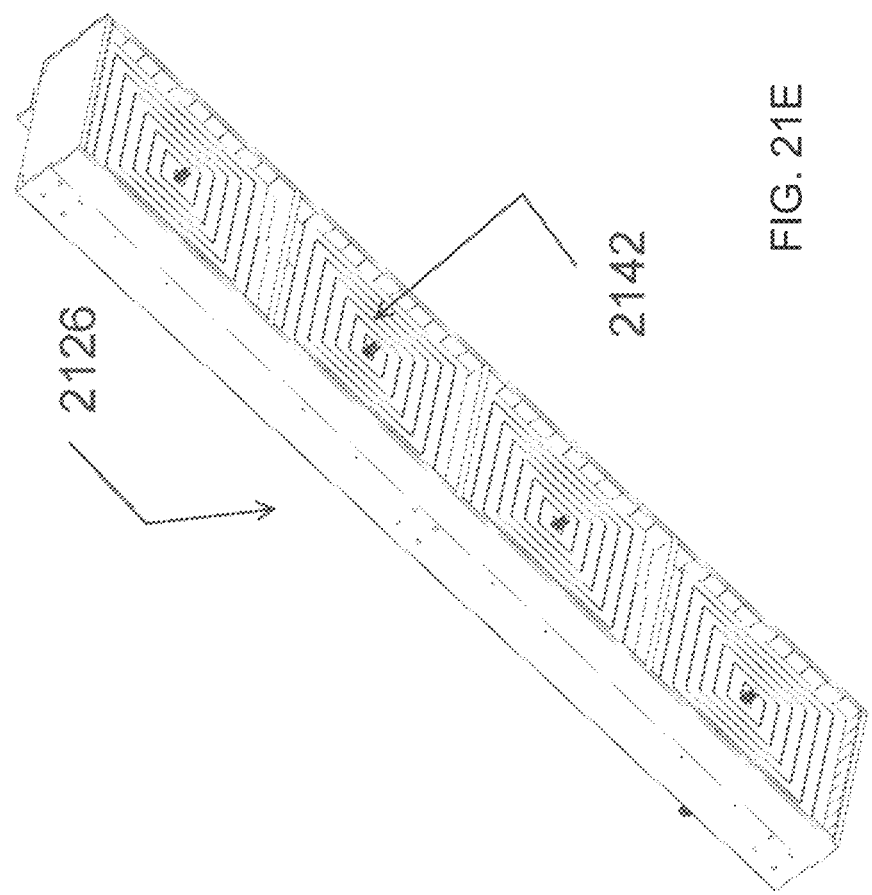

Referring to FIGS. 21A through 21D, an illustration of the induction horn assembly 2102 is provided. An illustration of a cooking horn 2104 is provided, which is shown being supported by a frame 2106. The product flows from an extrusion system to a slicer 2110 through the slicer input 2112. A cutter transition nozzle 2108 is also shown between the slicer and the cooking horn 2104. FIGS. 21B and 21C provide an illustration of the cooking horn 2104 with top portions removed to have an improved view of the induction heating assemblies. The cooking horn includes upper 2116 and lower 2118 induction heating assemblies. The upper and lower portions are interlocked using a latch, illustrated by item 2120, and fastener, illustrated by item 2122, configuration. Referring to FIG. 21C, illustrating the cooking horn 2104 having portions of the assembly removed for clarity, item 2126 provides an illustration of an induction heating assembly 2126. FIGS. 21D and 21E provide further illustration of the induction heating assembly 2125, with the adjustable brackets 2138 and the support bracket member 2136. The coils 2132 for one implementation are adjusted up and down using a jack screws 2124, 2134. The induction coils are not in view in FIG. 21D. The induction coils 2142 are illustrated in FIG. 21E.

Referring to FIGS. 21F through 21I, an illustration of a transformer controlled induction coil is shown, which provide multiple heating zones. The upper cooking assembly 2150 is illustrated in FIG. 21F as having four separate and independent heating zones 2155, 2157, 2159 and 2169. However, 2 to 3 heating zones or 5 or more heating zones could be implemented without departing from the scope of the technology. The four heating zones are powered by separate induction coil windings as illustrated by items 2160 and 2152. Power is transferred to the induction coil windings and controlled by separate and independent transformers as illustrated by items 2156 and 2154. Current is provided to the transformers by separate and independent power cables as illustrated by items 2164 and 2153. The transformers transfer electrical energy to the induction coil windings. A varying current conducted through the power cables will vary the electrical energy provided to the induction coil windings to thereby vary the heat in a given heat zone independent of any other heat zone of the cooking assembly. The current to the transformers can be varied to change the AC voltage levels to increase or decrease the electrical energy provided to the induction coil windings. The separate and independent transformers will also provide isolation between the induction coil windings thereby independently controlling the temperature of the cooling plate 2158. ****The lower cooking assembly 2151 is illustrated in FIG. 21F as having four separate and independent heating zones 2171, 2173, 2175 and 2177. However, 2 to 3 heating zones or 5 or more heating zones could be implemented without departing from the scope of the technology. The four heating zones are powered by separate induction coil windings as illustrated by items 2180 and 2181. Power is transferred to the induction coil windings and controlled by separate and independent transformers as illustrated by items 2183 and 2162. Current is provided to the transformers by separate and independent power cables as illustrated by items 2185 and 2187. The transformers transfer electrical energy to the induction coil windings. An alternating current applied to the primary winding induces an alternating magnetic flux in the iron core. Most of this flux stays within the core and only a small percentage of it travels through the air. The alternating magnetic flux in the iron core then links the turns of the secondary windings inducing a voltage. A varying current conducted through the power cables will vary the electrical energy provided to the induction coil windings to thereby vary the heat in a given heat zone independent of any other heat zone of the cooking assembly thereby having correlating varying heat zones at the cooking plate 2155. The current to the transformers can be varied to change the AC voltage levels to increase or decrease the electrical energy provided to the induction coil windings. The separate and independent transformers will also provide isolation between the induction coil windings thereby independently controlling the temperature of the cooking plate 2155. A cooking zone of the upper cooking assembly for one implementation can be controlled to have the same temperature as the corresponding counterpart cooking zone of the lower cooking assembly or for one implementation the temperatures are different. A small transformer coil assembly as illustrated in FIG. 21H for one implementation is used to power the smaller induction coil windings where the current provided to the transformer over power cable 2168 and is coupled 2167 to the induction coil winding. A large transformer coil assembly as illustrated in FIG. 21H for one implementation is used to power the smaller induction coil windings where the current provided to the transformer over power cable 2163 and is coupled 2165 to the induction coil winding. FIG. 21I illustrates a side view of the assembly.

One implementation of the technology as disclosed and claimed herein is a method for processing whole muscle animal meat including size reducing a whole muscle portion of animal meat to produce a size reduced whole muscle product; and pumping the size reduced whole muscle product through an inline rotary cutter to engage a plurality of stacked and vertically spaced apart rotary blades with a plurality of uniform gaps between adjacent vertically space apart rotary blades. One implementation of the method includes stabilizing the plurality of stacked and vertically spaced apart rotary blades by extending a plurality of teeth-like members into the plurality of uniform gaps from an exterior perimeter of the inline rotary cutter inward toward a center axis of the inline rotary cutter and interlacing with adjacent rotary blades thereby resisting vertical deflection of the plurality of stacked and vertically spaced apart rotary blades. The implementation includes rotating the stacked spaced apart rotary blades thereby slicing the size reduced whole muscle product as the size reduced whole muscle product engages the plurality of stacked space apart rotary blades to thereby produce a sliced size reduced whole muscle product.

One implementation for the method for processing whole muscle animal meat as discussed above includes extruding the sliced size reduced whole muscle product from the inline rotary cutter to a cooking horn and pumping the sliced size reduced whole muscle product through an interior channel of the cooking horn. The implementation includes heating with induction heating interior cooking plates that form the interior channel of the cooking horn, where heating the interior cooking plates includes induction heating utilizing two or more independent transformers coupled to two or more induction coil windings thereby powering and controlling two or more independently adjustable induction heating zones of the interior cooking plates, thereby cooking the sliced size reduced whole muscle product. The implementation further includes extruding the cooked sliced size reduced whole muscle product through the cooking horn and out of the cooking horn formed as thin sheets of cooked sliced size reduced whole muscle product.

One implementation of the technology as disclosed and claimed is a method for processing whole muscle animal meat, including extruding a sliced size reduced whole muscle product from an inline rotary cutter to a cooking horn and pumping the sliced size reduced whole muscle product through an interior channel of the cooking horn. One implementation includes heating with induction heating interior cooking plates that form the interior channel of the cooking horn, where heating the interior cooking plates includes induction heating utilizing two or more independent transformers coupled to two or more induction coil windings thereby powering and controlling two or more independently adjustable induction heating zones of the interior cooking plates, thereby cooking the sliced size reduced whole muscle product. The technology includes extruding the cooked sliced size reduced whole muscle product through the cooking horn and out of the cooking horn formed as thin sheets of cooked sliced size reduced whole muscle product. One implementation is the method for processing whole muscle animal meat as disclosed above including extruding the sliced size reduced whole muscle product from the inline rotary cutter and through an inline sheeter.

Figure 22:
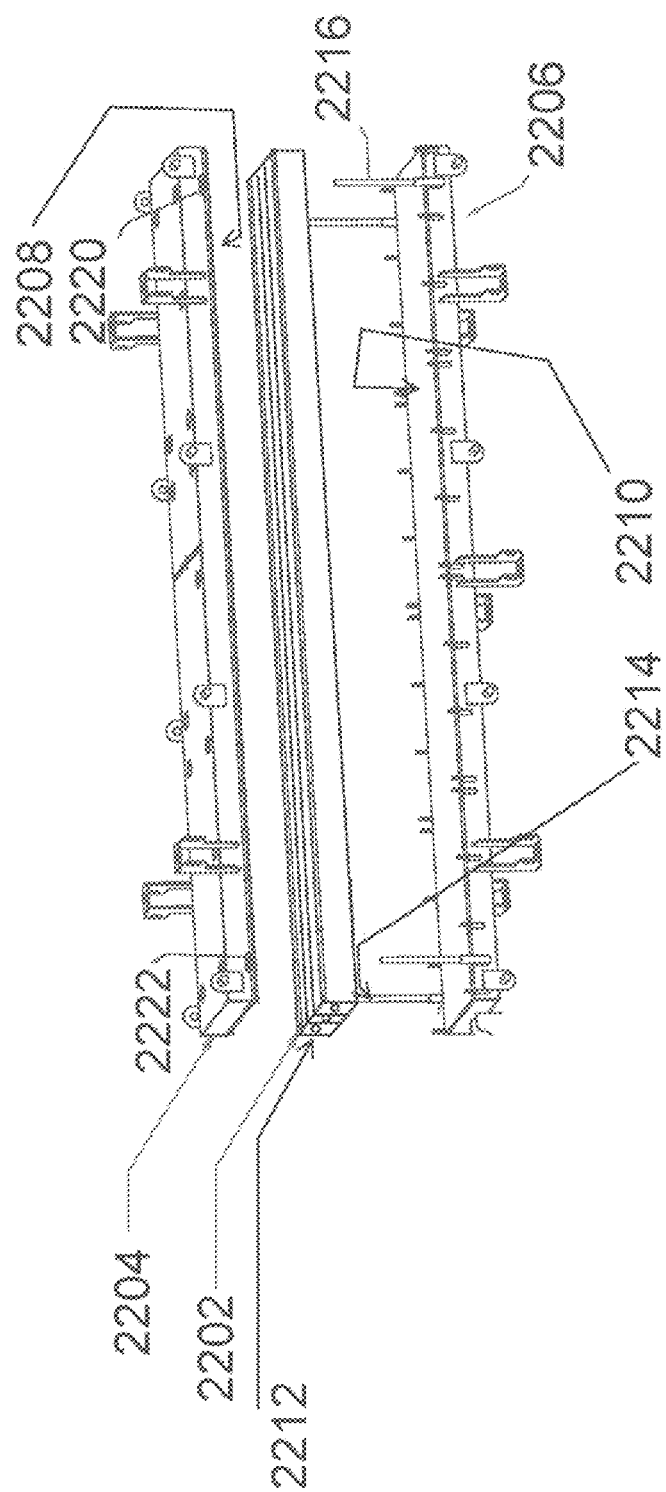
FIG. 22 is an illustration of an induction cooking horn having tubular inserts.

Referring to FIG. 22, for yet another implementation of the technology, an exploded view illustration of laterally oriented side by side elongated tubular inserts 2202 positioned between the upper and lower induction heating assemblies 2204 and 2206 is illustrated. For one implementation of the cooking horn, the tubular inserts extend through the channel between the cooking plates 2208 and 2210. Each tubular insert 2202 includes an axial hollow channel 2212 extending lengthwise through the structure through which product flows. When the upper 2204 and lower 2204 are assembled together, for one implementation, alignment rods 2214 and 2216 are aligned through eyelets as represented by items 2222 and 2220. The tubular inserts 2202 are constructed of heat conducting material to transfer heat from the cooking plates to the interior wall of the axial channel such that product traveling through the axial hollow channel is at least partially cooked or seared as the product travels through the channel. Rods of the product will exit the axial hollow channel and cut to the desired length. The tubular inserts provide a product having a tubular cross section rather than a sheeted product.

The various implementations and examples shown above illustrate a method and system for processing whole muscle. A user of the present method and system may choose any of the above implementations, or an equivalent thereof, depending upon the desired application. In this regard, it is recognized that various forms of the subject whole muscle processing method and system could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the and scope of the present implementation(s). Accordingly, the specification and drawings are to be regarded in an illustrative rather than a restrictive sense.

Other aspects, objects and advantages of the present technology as disclosed can be obtained from a study of the drawings, the disclosure and the appended claims.

What is claimed is:

1. A system for processing whole muscle animal meat comprising:
   an inline rotary cutter having a plurality of stacked vertically spaced apart rotary blades having a plurality of uniform gaps there between said plurality of stacked vertically spaced apart rotary blades, where the inline rotary cutter has an input communicably coupled to a size reduced meat output of a size reduction apparatus;
   a plurality of teeth-like members extending into the plurality of uniform gaps from an exterior
   perimeter of the inline rotary cutter inward toward a center axis of the inline rotary cutter and interlacing with adjacent rotary blades thereby resisting vertical deflection of the plurality of stacked and vertically spaced apart rotary blades;
   an extrusion conduit coupling the inline rotary cutter with a sheeter coupling; and
   a cooking horn coupled to the sheeter coupling, where the cooking horn is an induction heated cooking horn utilizing two or more independent transformers coupled to two or more induction coil windings thereby powering and controlling two or more independently adjustable induction heating zones of the cooking horn.

2. The system for processing whole muscle animal meat as recited in claim 1, where the cooking horn has an interior channel through which product travels, where the interior channel has a reverse taper.

3. The system for processing whole muscle animal meat as recited in claim 1, where the plurality of spaced apart rotary blades are separated by a shim spacer.

* * * * *